(12) United States Patent
Kodama et al.

(10) Patent No.: US 9,094,879 B2
(45) Date of Patent: Jul. 28, 2015

(54) HANDOVER METHOD OF WIRELESS COMMUNICATION SYSTEM, AND WIRELESS BASE STATION AND WIRELESS TERMINAL OF THE SAME SYSTEM

(75) Inventors: Takeshi Kodama, Kawasaki (JP); Tetsumei Tsuruoka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 1493 days.

(21) Appl. No.: 12/476,480

(22) Filed: Jun. 2, 2009

(65) Prior Publication Data
US 2009/0239541 A1 Sep. 24, 2009

Related U.S. Application Data

(63) Continuation of application No. PCT/JP2006/326215, filed on Dec. 28, 2006.

(51) Int. Cl.
*H04W 80/04* (2009.01)
*H04W 36/00* (2009.01)
*H04W 28/22* (2009.01)

(52) U.S. Cl.
CPC .......... *H04W 36/0083* (2013.01); *H04W 28/22* (2013.01)

(58) Field of Classification Search
CPC .................................................. H04W 88/04
USPC ................... 370/229–231, 331, 254; 455/436
See application file for complete search history.

(56) References Cited

U.S. PATENT DOCUMENTS

| 6,754,200 B1 | 6/2004 | Nishimura et al. | |
| 2002/0141353 A1* | 10/2002 | Ludwig et al. | 370/254 |
| 2003/0022628 A1 | 1/2003 | Mamiya et al. | |
| 2005/0070246 A1* | 3/2005 | Qazi et al. | 455/347 |

(Continued)

FOREIGN PATENT DOCUMENTS

| JP | 11243419 | 9/1999 |
| JP | 2000253096 | 9/2000 |
| JP | 2005328500 | 11/2005 |
| JP | 2006025450 | 1/2006 |
| WO | 02056632 | 7/2002 |

OTHER PUBLICATIONS

International Search Report dated Feb. 6, 2007.

(Continued)

*Primary Examiner* — Patrick Edouard
*Assistant Examiner* — Michael Irace
(74) *Attorney, Agent, or Firm* — Smith, Gambrell & Russell, LLP

(57) ABSTRACT

To prevent throughput reduction during handover, the wireless communication system includes a wireless terminal and a plurality of wireless base stations communicating wirelessly with the wireless terminal and performs control to lower the speed at which the wireless terminal communicates with a communication party upon time-out of a timer value generated in accordance with the time required for transmission/reception of a signal between the wireless terminal and a communication party, wherein the wireless base station performs the control to lower the speed of the communication with the wireless terminal so as to increase the timer value when the wireless base station decides execution of the handover of the communication with the wireless terminal to another wireless base station autonomously or in response to a request from the wireless terminal, and subsequently, executes the handover.

13 Claims, 29 Drawing Sheets

(56) References Cited

U.S. PATENT DOCUMENTS

2006/0092838 A1* 5/2006 Lee ............................ 370/229
2006/0176854 A1* 8/2006 Jang et al. .................... 370/331

OTHER PUBLICATIONS

IEEE Standard for Local and metropolitan area networks Part 16: Air Interface for Fixed and Mobile Broadband Wireless Access Systems; Amendment 2: Physical and Medium Access Control Layers for Combined Fixed and Mobile Operation in Licensed Bands and Corrigendum 1 IEEE Computer Society and the IEEE Microwave Theory and Techniques Society IEEE Std 802.16e-2005 and IEEE Std 802.16-2004/Cor1-2005.

IEEE Std 802.16-2004 (Revision of IEEE Std 802.16-2001) IEEE Standard for Local and metropolitan area networks Part 16: Air Interface for Fixed Broadband Wireless Access Systems; IEEE Computer Society and the IEEE Microwave Theory and Techniques Society, Oct. 1, 2004.

\* cited by examiner

FIG. 5

| MESSAGE TYPE | CID VALUE | TYPE VALUE | DATA |
|---|---|---|---|
| HO EXECUTION NOTIFICATION | CID#01 | TYPE#00 | MS IDENTIFIER <MS#01> |
| | | | BS IDENTIFIER <BS#02> |
| RTO ACQUISITION | | TYPE#03 | NO PARTICULAR VALUE |
| RTO TRANSMISSION | | TYPE#04 | RTO VALUE |
| LINE SPEED REGULATION | | TYPE#01 | THE NUMBER OF CHANNELS → 1 THE NUMBER OF SYMBOLS → 1 |
| HO EXECUTION CONFIRMATIO | | TYPE#02 | <HO_OK> or <HO_NG> |

FIG. 6

| MS IDENTIFIER | CID VALUE | CHANNEL CAPACITY | | MS CAPABILITY | | |
|---|---|---|---|---|---|---|
| | | THE NUMBER OF SYMBOLS | THE NUMBER OF CHANNELS | SECURITY | RETRANS-MISSION FUNCTION | MIMO |
| MS#01 | CID#01 | 10 | 5 | SUPPORTED | SUPPORTED | NOT SUPPORTED |

FIG. 7

| BS IDENTIFIER | USAGE FREQUENCY | RADIO FIELD STRENGTH | BS CAPABILITY | | | THE NUMBER OF MSS IN CHARGE |
| --- | --- | --- | --- | --- | --- | --- |
| | | | SECURITY | RETRANSMIS- SION FUNCTION | MIMO | |
| BS#02 | F#02 | HIGH | SUPPORTED | SUPPORTED | NOT SUPPORTED | 20 |
| BS#03 | F#03 | MEDIUM | NOT SUPPORTED | SUPPORTED | SUPPORTED | 40 |
| BS#04 | F#04 | LOW | SUPPORTED | SUPPORTED | SUPPORTED | 10 |

FIG. 8

| SECURITY | RETRANSMISSION FUNCTION | MIMO |
|---|---|---|
| 20ms | 30ms | 10ms |

FIG. 15

| RTO VALUE (ms) | CHANNEL CAPACITY | |
|---|---|---|
| | THE NUMBER OF SYMBOLS | THE NUMBER OF CHANNELS |
| 20 | 4 | 5 |
| 50 | 10 | 5 |
| 100 | 10 | 10 |
| 200 | 20 | 20 |

HANDOVER METHOD OF WIRELESS COMMUNICATION SYSTEM, AND WIRELESS BASE STATION AND WIRELESS TERMINAL OF THE SAME SYSTEM

CROSS-REFERENCE TO RELATED APPLICATION

This application is a continuation Application of a PCT international application No. PCT/JP2006/326215 filed on Dec. 28, 2006 in Japan, the entire contents of which are incorporated by reference.

FIELD

The present invention relates to a handover method of a wireless communication system, a wireless base station, and a wireless terminal of the same system. For example, it relates to a technology preferably used for a mobile communication system that includes a wireless terminal (MS: Mobile Station) that can establish a mobile communication and a plurality of wireless base stations (BS: Base Station) that communicate with the MS and has a function of handover (HO) to switch BSs to be communicated with as the MS moves.

BACKGROUND

In a wireless communication system including wireless terminals (MSs) and wireless base stations (BSs) that provide wireless communication zones, each MS can communicate with another MS via one of those BSs if the MS is in a range (namely, service area) where the MS can communicate wirelessly with that BS.

In such a wireless communication system, the communication breaks down generally when an MS moves out of the area where the radio wave of the communicating BS can reach (namely, out of the service area of that BS). Therefore, the wireless communication system generally has handover (HO) function, with which the communicating BS is switched to another as the MS moves.

During the above-mentioned handover process, the link-layer communication between the MS and the BS momentarily breaks down, and therefore, the MS can not transmit packets to the communication-party MS temporarily. Such packets that can not be transmitted to the communication party are generally dropped in the course of their transmission.

For example when an MS communicates with a communication party according to TCP (Transmission Control Protocol), the MS measures time (namely, RTT: Round Trip Time) between the transmission of a packet and the reception of the ACK (ACKnowledgement) with respect to that packet and calculates the time-out value (RTO: Retransmission TimeOut) of the data-retransmission timer at the time of the retransmission control on the basis of that RTT. When the ACK is not received in a communicating process even after the timer exceeds the present RTO value (namely, time-out), a congestion control is (for example, a control to lower the communication speed considerably at which the MS communicates with a communication party) exercised between the MS and a communication party. Therefore, in such a case, the throughput may probably be lowered because of slow-start algorithm after completion of the handover process.

In this regard, Non-Patent Documents 1 (IEEE Std 802.16e.-2005 and IEEE Std 802.16.-2004/Cor 1-2005 (Amendment and Corrigendum to IEEE Std 802.16-2004)) and 2 (IEEE Std 802.16.-2004 (Revision of IEEE Std 802.16.-2001)) listed below disclose, for example, a method to inhibit drop of the packets during a handover process by buffering the packets transmitted from the communication party during the handover in the BS and transmitting the packets to the MS after completion of the handover process.

However, in the above-mentioned method, the ACKs with respect to the packets transmitted from the MS are also buffered, and therefore, the arrivals of the ACKs to the MS delay regularly. In such a case, there is a high probability that the above-mentioned ACK response is received when the timer exceeds the RTO value (namely, probability that the time-out of the packet-retransmission timer occurs). In the result, the throughput is lowered by the above-mentioned slow-start algorithm after completion of the handover process.

In order to prevent such a lowering of throughput caused by arrival delays of ACKs, the communication party may delay transmissions of ACKs even in normal times so as to prolong the above-mentioned time to the time-out sufficiently for executing the handover processes, for example. However, in such a case, the MS is forced to be in an extra ACK-waiting mode regularly, which leads to the throughput lowering even in normal times.

SUMMARY

In a certain aspect, an object of the invention is to prevent the lowering of throughput before and after handover processes in a wireless communication system including a wireless terminal and wireless base stations.

In a certain aspect, the following handover method of a wireless communication system, wireless base station, and wireless terminal of the same system.

(1) A handover method of a wireless communication system, the wireless communication system including a wireless terminal and a plurality of wireless base stations which communicate wirelessly with the wireless terminal and performing control to lower the speed at which the wireless terminal communicates with a communication party upon the time-out of a timer value generated in accordance with the time required for transmission/reception of a signal between the wireless terminal and a communication party, wherein the wireless base station performs the control to lower the speed at which the wireless base station communicates with the wireless terminal so as to increase the timer value when the wireless base station decides execution of the handover of the communication with the wireless terminal to another wireless base station autonomously or in response to a request from the wireless terminal, and subsequently, executes the handover.

(2) In this case, it is possible that the wireless terminal transmits a request for handover execution, and, when the wireless base station receives the execution request, the wireless base station decides the handover execution and transmits an enabling acknowledgement of the handover to the wireless terminal.

(3) In addition, it is possible that the wireless base station judges whether the handover can be executed or not on the basis of information about the execution condition of the handover, and, when judging that it can be executed, decides the handover execution and transmits an enabling acknowledgement of the handover to the wireless terminal.

(4) Moreover, it is possible that the wireless base station acquires the present timer value from the wireless terminal, estimates the time required for the handover, and performs control to lower the communication speed on the condition that the present timer value is smaller than the estimated time at the time of the handover-execution decision.

(5) In addition, it is possible that the wireless base station records history information about the communication speed at the time of generation of the timer value or acquisition thereof from the wireless terminal, calculates the lowering value of the communication-speed lowering control on the basis of the history information, and performs control to lower the communication speed by the lowering value.

(6) Moreover, it is possible that the wireless base station reacquires the present timer value from the wireless terminal while performing control to lower the communication speed, and performs control to lower the communication speed until the estimated time falls below the reacquired, present timer value.

(7) Moreover, it is possible that the wireless terminal postpones the handover when the wireless terminal does not receive the enabling acknowledgement of the handover from the wireless base station with respect to the request for handover execution within a predetermined period of time.

(8) In a certain aspect of the invention, a wireless base station of a wireless communication system, the wireless communication system including a wireless terminal and a plurality of the wireless base stations which communicate wirelessly with the wireless terminal and performing control to lower the speed at which the wireless terminal communicates with a communication party upon the time-out of a timer value generated in accordance with the time required for transmission/reception of a signal between the terminal and a communication party, the wireless base station including: handover decision means which decides execution of the handover of the communication with the wireless terminal to another wireless base station autonomously or in response to a request from the wireless terminal; communication-speed control means which increases the timer value by performing control to lower the speed at which the wireless base station communicates with the wireless terminal when the handover decision means decides execution of the handover; and handover execution means which executes the handover after the control to lower the communication speed performed by the communication-speed control means.

(9) In this case, it is possible that the handover decision means includes a handover-execution-request receiver which receives the handover execution request from the wireless terminal and decides execution of the handover when the handover-execution-request receiver receives the request for execution.

(10) In addition, it is possible that the handover decision means includes an execution-condition storage which stores information about the execution condition of the handover and a handover judgment unit which judges whether the handover can be executed or not on the basis of the information stored in the execution-condition storage, and decides execution of the handover when the handover judgment unit judges that the handover can be executed.

(11) Moreover, it is possible that the communication-speed control means includes: a timer-value acquisition unit which acquires the present timer value from the wireless terminal; a handover-time estimator which estimates handover time, which is time required for the handover; and a handover-time judgment unit which judges whether the present timer value is smaller than the handover time estimated by the handover-time estimator at the time of the handover-execution decision performed by the handover decision means, and performs control to lower the communication speed on the condition that the handover-time judgment unit judges that the present timer value is smaller than the handover time estimated by the handover-time estimator.

(12) In addition, it is possible that the communication-speed control means includes: a history record unit which records history information about the communication speed at the time of generation of the timer value or acquisition thereof from the wireless terminal; and a lowering-value calculator which calculates the lowering value of the communication-speed lowering control on the basis of the history information recorded in the history record unit, and performs control to lower the communication speed by the lowering value calculated by the lowering-value calculator.

(13) Moreover, it is possible that the communication-speed control means includes a repeat controller which repeatedly performs, while performing control to lower the communication speed, acquisition of the present timer value by the timer-value acquisition unit, estimation by the handover-time estimator, and judgment by the handover-time judgment unit, until the handover-time judgment unit judges that the handover time falls below the present timer value.

(14) In a certain aspect of the invention, a wireless terminal of a wireless communication system, the wireless communication system including the wireless terminal and a plurality of wireless base stations which communicate wirelessly with the wireless terminal and performing control to lower the speed at which the wireless terminal communicates with a communication party upon the time-out of a timer value generated in accordance with the time required for transmission/reception of a signal between the wireless terminal and a communication party, the wireless base station requiring the present timer value from the wireless terminal when performing control to lower the speed at which the wireless terminal communicates with a communication party so as to increase the timer value in the case where the handover execution is decided, the wireless terminal including: timer-value calculation means which calculates the present timer value; a timer-value-requirement receiver which receives the requirement from the wireless base station; and timer-value notification means which notifies the wireless base station of the present timer value calculated by the timer-value calculation means when the requirement is received by the timer-value-requirement receiver.

(15) In a certain aspect of the invention, a wireless terminal of a wireless communication system, the wireless communication system including the wireless terminal and a plurality of wireless base stations which communicate wirelessly with the wireless terminal and performing control to lower the speed at which the wireless terminal communicates with a communication party upon the time-out of a timer value generated in accordance with the time required for transmission/reception of a signal between the wireless terminal and a communication party, the wireless base station enabling control to lower the communication speed at which the wireless terminal communicates with a communication party so as to increase the timer value by receiving a handover execution request, the wireless terminal including: handover-execution judgment means which judges whether the handover will be executed or not on the basis of a signal received from the wireless base station; handover-execution-time decision means which decides the execution time of the handover when the handover-execution judgment means judges that the handover will be executed; handover-execution-request transmission means which transmits the handover execution request to the wireless base station when the handover-execution judgment means judges that the handover will be executed; enabling-acknowledgement reception means which receives an enabling acknowledgement with respect to the handover execution request from the wireless base station; and handover-execution control means which postpones the handover execution until after the execution time decided by the handover-execution-time decision means when the enabling acknowledgement is not received by the enabling-acknowledgement reception means within a predetermined period of time after the transmission of the handover execution request by the handover-execution-request transmission means.

BRIEF DESCRIPTION OF THE DRAWINGS

FIG. 5 illustrates an example of each value of the control message depicted in FIG. 4.

FIG. 6 illustrates an example of MS information stored in the MS information storage depicted in FIG. 1 and FIG. 3.

FIG. 7 illustrates an example of adjacent BS information stored in the adjacent BS information storage depicted in FIG. 1 to FIG. 3.

FIG. 8 illustrates an example of a table of the time required for the negotiation process according to the first embodiment, which is specified function-by-function.

FIG. 15 illustrates an example of the value stored in the NW information storage depicted in FIG. 12 and FIG. 14.

Figure 1:
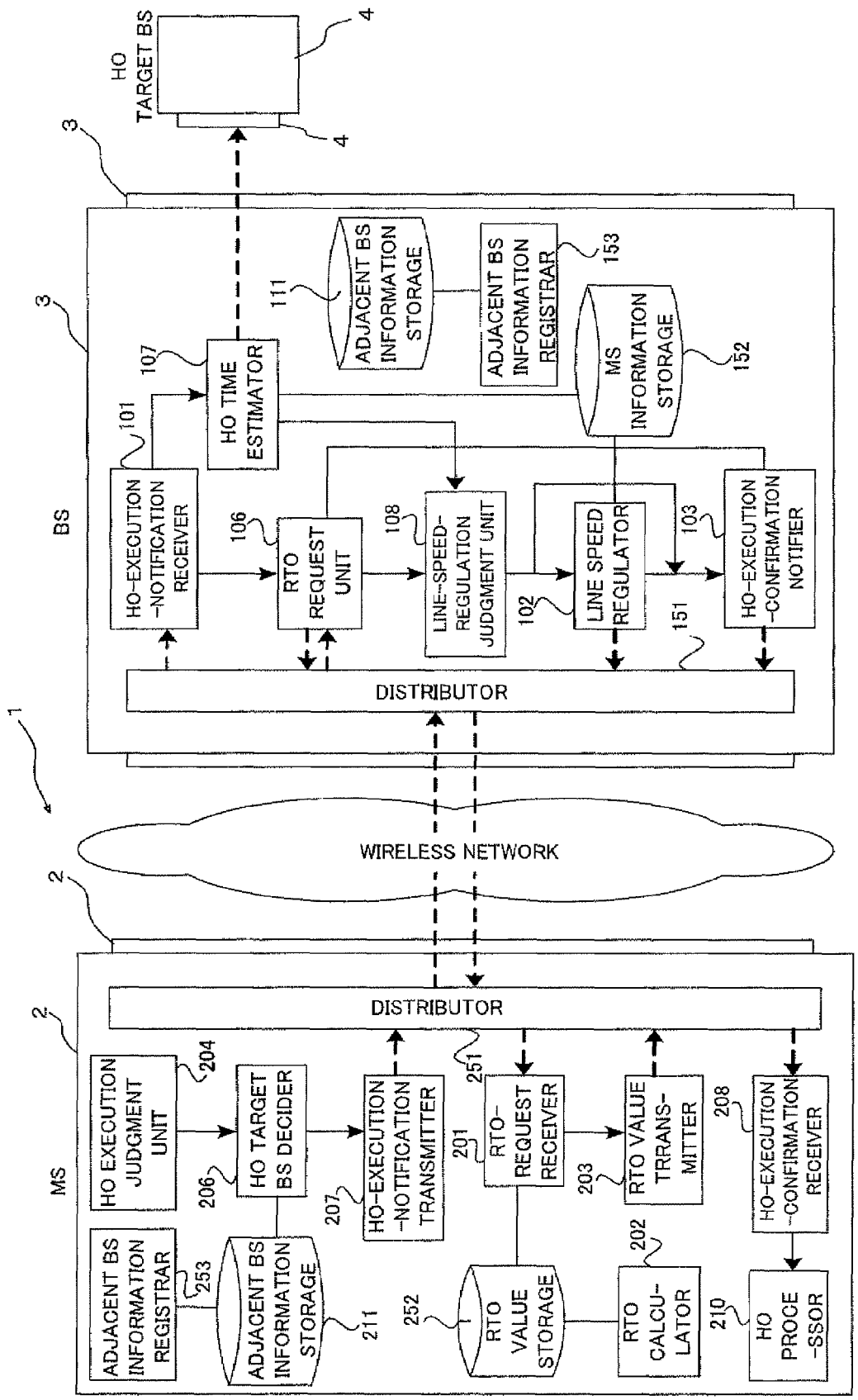
FIG. 1 is a block diagram illustrating the construction of the substantial part of the wireless communication system according to the first embodiment of the present invention.

DESCRIPTION OF REFERENCE CHARACTERS 1, 1*a* to 1*f* WIRELESS COMMUNICATION SYSTEM
2, 2*a* to 2*f* WIRELESS TERMINAL (MS)
3, 3*a* to 3*f* WIRELESS BASE STATION (BS)
4, 4*a* to 4*f* HO-TARGET WIRELESS BASE STATION (HO-TARGET BS)
101, 101*b*, 101*d*, 101*f* HO-EXECUTION-NOTIFICATION RECEIVER
102, 102*a* to 102*f* LINE SPEED REGULATOR
103, 103*a* to 103*f* HO-EXECUTION-CONFIRMATION NOTIFIER
104*a*, 104*c*, 104*e*, 204, 204*b*, 204*d*, 204*f* HO EXECUTION JUDGMENT UNIT (HANDOVER-EXECUTION JUDGMENT MEANS)
105*a*, 105*c*, 105*e*, 206, 206*b*, 206*d*, 206*f* HO TARGET BS DECIDER
106, 106*a* to 106*f* RTO REQUEST UNIT
107, 107*a* to 107*f* HO TIME ESTIMATOR
108, 108*a* to 108*f* LINE-SPEED-REGULATION JUDGMENT UNIT
109*b*, 109*c* RANGE-OF-LOWERING CALCULATOR
110*b*, 110*c* NW INFORMATION STORAGE
111, 111*a* to 111*f*, 211, 211*a* to 211*f* ADJACENT BS INFORMATION STORAGE
151, 151*a* to 151*f*, 251, 251*a* to 251*f* DISTRIBUTOR
152, 152*a* to 152*f* MS INFORMATION STORAGE
153, 153*a* to 153*f*, 253, 253*a* to 253*f* ADJACENT BS INFORMATION REGISTRAR
201, 201*a* to 201*f* RTO-REQUEST RECEIVER (TIMER-VALUE-REQUEST RECEIVER)
202, 202*a* to 202*f* RTO CALCULATOR (TIMER-VALUE CALCULATOR)
203, 203*a* to 203F RTO VALUE TRANSMITTER (TIMER-VALUE NOTIFICATION MEANS)
205*f* HO-EXECUTION-TIME DECIDER 207, 207*b*, 207*d*, 207*f* HO-EXECUTION-NOTIFICATION TRANSMITTER (HANDOVER-EXECUTION-REQUEST TRANSMISSION MEANS)
208, 208*a* to 208*f* HO-EXECUTION-CONFIRMATION RECEIVER (ENABLING-ACKNOWLEDGEMENT RECEPTION MEANS)
209*f* HO START JUDGMENT UNIT
210, 210*a* to 210*f* HO PROCESSOR
252, 252*a* to 252*f* RTO VALUE STORAGE

DESCRIPTION OF EMBODIMENT

In the following, embodiments of the present invention will be described with reference to drawings. However, it is to be understood that the present invention is not limited to the embodiments and their variations to be described below and various modifications can be added thereto so long as they do not depart from the scope of the present invention.

[A] Description of the First Embodiment

FIG. 1 is a block diagram illustrating the construction of the substantial part of the wireless communication system according to the first embodiment of the present invention. In the wireless communication system 1 illustrated in FIG. 1, at least one wireless terminal (MS) 2 and a plurality of wireless base stations (BS) 3 are connected to each other via a wireless network (wireless link), and they can communicate wirelessly with each other. In FIG. 1, the reference numeral 4 represents one of the above-mentioned BSs 3 that is a handover-target wireless base station (HO-target BS) of the MS 2. In addition, it is assumed that, in the wireless communication system 1 of this example, the communication speed (hereinafter, also referred to as "line speed") at which the MS 2 communicates with a communication party is controlled to be lowered upon the time-out of RTO value, which is a timer value generated in accordance with the time required for transmission/reception of a signal between the MS 2 and a communication party. In this regard, the control (regulation) of the communication speed is carried out by means of, for example, specification (assignment) of number of channels used and symbol number for the MS 2, as described later.

Moreover, in this example, not the BS 3 but the MS 2 can judge the necessity of HO execution, and the HO-origin BS 3 can increase the RTO value upon reception of an HO execution request from the MS 2 by performing control to lower the speed of the communication with the MS 2 so as to simulate a line congestion of the wireless network.

(Description of MS 2)

Therefore, the MS 2 of the present example comprises, for example, an HO execution judgment unit 204, an HO-target BS decider 206, an adjacent BS information storage 211, an adjacent BS information registrar 253, an HO-execution-notification transmitter 207, an RTO-request receiver 201, an RTO calculator 202, an RTO value storage 252, an RTO value transmitter 203, an HO-execution-confirmation receiver 208, an HO processor 210, and a distributor 251.

The HO execution judgment unit 204 collects information about the execution condition of an HO and judges whether the HO will be executed or not. In the present example, it functions as the handover-execution judgment means which judges whether an HO will be executed or not on the basis of a signal received from the BS 3. In this context, the above-mentioned information about the execution condition of an HO includes, for example, information about the radio field strength of the presently-communicating BS (this will be referred to as the "serving BS") 3. In this case, the HO execution judgment unit 204 measures the radio field strength of the BS that is currently communicating with the MS 2 regularly or irregularly and decides an HO execution when it is judged that the radio field strength is lower than the value preset by the administrator. In addition, when the HO is executed, the HO execution judgment unit 204 notifies the HO-target BS decider 206 of the HO execution, as well as requests it to decide the HO-target BS 4.

The adjacent BS information registrar 253 registers (stores), in the adjacent BS information storage 211, various kinds of information (namely, adjacent BS information) (for example, BS identifier, frequency used by the BS, radio field strength of the BS, capability types supported, number of MS 2 processed currently, etc.) about adjacent, one or more of other BSs 3, which is preset or collected through communication with each corresponding BS 3. The adjacent BS information registrar 253 is composed of a shared or dedicated memory, for example.

The adjacent BS information storage 211 stores various information of BSs, which is registered by the above-mentioned adjacent BS information registrar 253. FIG. 7 illustrates an example of the adjacent BS information to be stored in the adjacent BS information storage 211. In the example illustrated in FIG. 7, information of three BSs 3 (whose BS identifiers are BS#02, BS#03, and BS#04) including the frequency used, the radio field strength, and the BSs capabilities (capability types supported including: security function; retransmission function; and MIMO (Multiple Input Multiple Output), and the number of MSs in charge) is specified for each BS 3 (for each BS identifier). Concerning the BS 3 whose BS identifier is BS#02, its frequency used is "F#02", radio field strength is "HIGH", security is "SUPPORTED", retransmission function is "SUPPORTED", MIMO function is "NOT SUPPORTED", and the number of MSs in charge is "20".

The HO-target BS decider 206 decides the HO-target BS 4 by selecting from the BSs registered in the adjacent BS information storage 211 with the reception of the HO execution notification from the HO execution judgment unit 204 as a trigger. For example, the HO-target BS decider 206 can select (decide) the BS whose "radio field strength" information in the adjacent BS information illustrated in FIG. 7 is higher than those of the other BSs 3 as the HO-target BS 4. In addition, the HO-target BS decider 206 requests the HO-execution-notification transmitter 207 to transmit an HO execution notification after the HO-target BS 4 is decided.

The HO-execution-notification transmitter 207 transmits the HO execution notification received from the HO-target BS decider 206 to the BS 3 via the distributor 251. The HO-execution-notification transmitter 207 functions as the handover-execution-request transmission means which transmits the handover execution request to the BS 3 when the above-mentioned HO execution judgment unit 204 judges (decides) that the handover will be executed. For that purpose, the HO-execution-notification transmitter 207 has a function of, for example, creating a control message used for the HO execution notification and transmitting it to the distributor 251.

The RTO-request receiver (timer-value-request receiver) 201 receives a request (RTO value request notification) for the present RTO value from the BS 3. The RTO-request receiver 201 requests the RTO calculator 202 to calculate the present RTO value with the reception of the RTO value request notification as a trigger, and acquires the calculated value stored in the RTO value storage 252, which is the newest (present)

RTO value, so as to transmit it to the RTO value transmitter 203 (namely, so as to request the RTO value transmitter 203 to send it).

The RTO calculator (timer-value calculation means) 202 measures the time (RTT: Round Trip Time) between the transmission of the upload data (TCP data) to a communication party via the serving BS 3, and the return of the ACK, with the RTO calculation request from the RTO-requirement receiver 201 as a trigger, and calculates the present RTO value on the basis of the measured RTT. The result of the calculation (namely, RTO value) is stored in the RTO storage 252 at all times. Specifically, in the present example, the RTO value is calculated from the RTT with the following formulae (1) to (3), for example.

$$SRTT=7/8SRTT+1/8RTT \quad (1)$$

$$v=v+1/8(|RTT-SRTT|-v) \quad (2)$$

$$RTO=SRTT+4\times v \quad (3)$$

In the above formulae, the left-hand side of each formula (1) to (3) represents the renewed value, SRTT represents the smoothed RTT, and v represents the average deviation of RTT. In addition, the RTO calculator 202 also has a function of performing retransmission control on the basis of the calculated RTO value.

The RTO value storage 252 stores the RTO value calculated by the RTO calculator 202, as described above. The RTO value storage 252 is composed of a shared or dedicated memory, for example.

The RTO value transmitter 203 transmits the present RTO value that is transmitted from the RTO-request receiver 201 to the BS 3. In the present example, the RTO value transmitter 203 creates a control message containing the RTO value and transmits the control message to the distributor 251, with the RTO-value notification from the RTO-request receiver 201 as a trigger. Namely, the RTO value transmitter 203 functions as the timer-value notification means which notifies the BS 3 of the present RTO value calculated by the RTO calculator 202 when the RTO-value request is received by the RTO-request receiver 201.

The HO-execution-confirmation receiver (enabling-acknowledgement reception means) 208 receives, from the BS 3, an HO-execution-confirmation notification (enabling acknowledgement) with respect to the HO execution notification (execution request) sent from the HO-execution-notification transmitter 207. In the present example, the HO-execution-confirmation receiver 208 notifies the HO processor 210 of an HO execution, with the reception of the above-mentioned HO-execution-confirmation notification as a trigger.

The HO processor 210 executes an HO process, with which the communication process is handed over from the serving BS 3 to the HO-target BS 4, with the reception of the HO execution notification from the HO-execution-confirmation receiver 208 as a trigger.

The distributor 251 controls the connection identifiers (CID: Connection IDentifier), which represent the communication paths to the serving BS 3, and outputs control messages to appropriate targets in accordance with the information (TYPE value) about the message types (such as HO execution notification, HO-execution-confirmation notification, RTO request (acquisition), RTO notification (transmission), and line speed regulation to be described later) contained in the header of each control message. In the present example, a format illustrated in FIG. 4 is used for the control message, for example.

Figure 4:
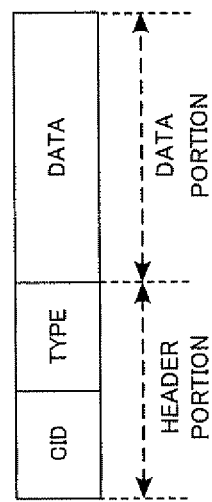
FIG. 4 illustrates an example of the format of the control message according to the first embodiment.

The format of the control message illustrated in FIG. 4 is composed of a header portion and a data portion. In the header portion, the above-mentioned CID and TYPE values are contained. In the data portion, contents (namely, DATA values) of the data (message) corresponding to each TYPE value (namely, message type) is contained. In FIG. 5, examples of the CID, the TYPE value, and the DATA value are illustrated.

As illustrated in FIG. 5, the TYPE values which are corresponding to each message type are defined for each communication path (CID). Therefore, the distributor 251 can identify the communication path and the message type by referring to the CID and the TYPE value contained in the header portion of the received control message.

For example, in a control message expressing an "HO execution notification" addressed to the BS 3, "TYPE#00" is designated as the message type (TYPE value), and the identifier (MS#01, in the example of FIG. 5) of the MS that is the HO-request origin, and the identifier (BS#02, in the example of FIG. 5) of the BS 4, which is the HO-target, are designated as the message content (DATA value). In a control message expressing an "HO execution confirmation" addressed to the MS 2, which is a reply to the above message, "TYPE#02" is designated as the message type (TYPE value), and information indicating enabling (OK) or disabling (NG) of HO is designated as the message content (DATA value).

In a control message expressing an "RTO request (acquisition)" addressed to the MS 2, "TYPE#03" is designated as the message type (TYPE value) (and no particular value is designated as the message content (DATA value)). In a control message expressing an "RTO transmission" addressed to the MS 3[sic], which is a reply to the above message, "TYPE#04" is designated as the message type (TYPE value), and the present RTO value is designated as the message content (DATA value).

In the same way, in a control message expressing a "line speed regulation" addressed to the MS 2, "TYPE#01" is designated as the message type (TYPE value), and the number of channels used and the symbol number (both are "1" in the example of FIG. 5) are designated as the message content (DATA value)).

With the above-mentioned structure, the MS 2 according to the first embodiment of the present invention can decide HO execution and request the BS 3 to perform HO upon reception of a signal from the BS 3, as well as can transmit the RTO value which is calculated by the RTO calculator 202 to the BS 3 in accordance with a request from the BS 3. In addition, the MS 2 can perform congestion control (communication speed control) to lower the line speed of the communication with the communication party upon time-out of the RTO value.

(Description of BS 3)

On the other hand, the BS 3 comprises, for example, an HO-execution-notification receiver 101, an RTO request unit 106, an HO time estimator 107, a line-speed-regulation judgment unit 108, an adjacent BS information registrar 153, an adjacent BS information storage 111, an MS information storage 152, a line speed regulator 102, an HO-execution-confirmation notifier 103, and a distributor 151, as illustrated in FIG. 1.

The HO-execution-notification receiver 101 receives HO execution notifications transmitted from the MS 2. In the present example, the HO-execution-notification receiver 101 notifies the HO time estimator 107 of information (BS identifier: refer to FIG. 5) about the HO-target BS 4 which is contained in the HO execution notification so as to request the HO time estimator 107 to estimate the HO processing time, and also requests the RTO requirement unit 108[sic] to acquire the RTO value, for example.

Namely, the HO-execution-notification receiver 101 performs the function of the handover-execution-request receiver which receives the HO execution request from the MS 2, as well as performs one of the functions of the handover decision means which decides execution of HO of the communication with the MS 2 to another BS 3 (HO-target BS 4).

The HO time estimator (handover-time estimator) 107 estimates time required for the HO process from the serving BS 3 to the HO-target BS 4 in accordance with a predetermined HO procedure, with the reception of the estimation request from the HO-execution-notification receiver 101 as a trigger. Specifically, the HO time estimator 107 estimates HO processing time according to, for example, time required for negotiation between the MS 2 and the HO-target BS 4 during the function-by-function HO process, which is preset by the administrator, after acquiring information about the HO-target BS 4 from the adjacent BS information storage 111 on the basis of the BS identifier of the HO-target BS 4, which was sent from the HO-execution-notification receiver 101, and information about the MS 2, which is the communication-origin, from the MS information storage 152. The HO time estimator 107 can notify the line-speed-regulation judgment unit 108 of the estimated HO processing time.

Namely, the HO time estimator 107 estimates the HO processing time with, for example, a table of times required for negotiation processes specified for each function, such as illustrated in FIG. 8, which is stored in the MS information storage 152. In the example illustrated in FIG. 8, the above-mentioned HO processing time can be estimated so that 20 ms+10 ms=30 ms, in the case where the MS 2 and the BS 3 support the security function and the MIMO function.

The adjacent BS information registrar 153 registers various information about one or more of the BSs 3 with the adjacent BS information storage 111, in the same way as the adjacent BS information registrar 253 of the MS 2 side. For example, the adjacent BS information registrar 153 registers (stores) information (adjacent BS information) about one or more of the BSs 3 that are geographically neighboring on the serving BS 3 in the adjacent BS information storage 211[sic] in advance or by acquiring it through communication. The adjacent BS information includes, for example, the BS identifier, the frequency used by the BS, the radio field strength of the BS, the capability types supported, the number of MS processed currently and the like, as described earlier.

The adjacent BS information storage 111 stores the adjacent BS information registered by the adjacent BS information registrar 153, and thereby, the same adjacent BS information is shared with the MS 2 (adjacent BS information storage 211). The adjacent BS information storage 111 is also composed of a shared or a dedicated memory.

The MS information storage 152 contains (stores) information about the MSs 2 that are communicating with the BS 3. The MS information storage 152 can store, for example, MS information, which is specified for each MS identifier, including: the aforementioned CID; the channel capacity (symbol number and channel number) of the communication path, which can be distinguished by the CID; and the functions supported by the corresponding MS 2 (namely, MS capabilities), as illustrated in FIG. 6.

In summary, the above-mentioned adjacent BS information registrar 153, adjacent BS information storage 111, and MS information storage 152 perform function of the execution-condition storage which stores information about the execution condition of HO.

The RTO request unit (timer-value acquisition unit) 106 requests the MS 2 to send the RTO value and acquires the present RTO value from the MS 2, with the reception of the RTO-value acquisition request from the HO-execution-notification receiver 101 as a trigger. The RTO request unit 106 can request the MS 2 to send RTO by creating a control message (refer to FIG. 5) expressing an "RTO request" and transmitting the control message to the distributor 151. Also, the RTO request unit 106 can acquire the RTO value from the MS 2 by receiving a control message (refer to FIG. 5) expressing an "RTO transmission", which is the reply to the above-mentioned transmitted control message, from the MS 2.

The line-speed-regulation judgment unit 108 judges whether an HO can be executed or not on the basis of the information (information about the execution condition) stored in the adjacent BS information storage 111 and the MS information storage 152 and judges whether an HO can be executed or not also on the basis of the RTO value sent by the RTO requirement unit 106 and the HO processing time estimated by the HO time estimator 107. When the HO can be executed, the line-speed-regulation judgment unit 108 decides the HO execution and judges whether the line speed will be regulated or not.

Specifically, the line-speed-regulation judgment unit 108 requests the line speed regulator 102 to perform a lowering control of the speed of the communication with the MS 2 when it is judged that the above-mentioned present RTO value is smaller than the HO time estimated by the above-mentioned HO time estimator 107. On the other hand, when the present RTO value is larger than the estimated HO time, the line-speed-regulation judgment unit 108 does not request the lowering control but requests the HO-execution-confirmation notifier 103 to transmit an HO-execution-confirmation notification.

Namely, the line-speed-regulation judgment unit 108 of the present example performs functions both of the handover judgment unit which judges whether an HO can be executed or not on the basis of the information about the above-mentioned execution condition which is stored in the above-mentioned execution-condition storage 111, 152 and of the handover-time judgment unit which judges whether the above-mentioned present RTO value is smaller than the handover time estimated by the above-mentioned HO time estimator 107 at the time of the HO-execution decision which is made when the HO can be executed.

The line speed regulator 102 regulates the speed of the communication with the MS 2 via the wireless network. The line speed regulator 102 performs control to lower the speed of the communication with the MS 2 via the wireless network to a preset value, with the reception of the speed-lowering-control request from the above-mentioned line-speed-regulation judgment unit 108 as a trigger. Namely, the line speed regulator 102 creates a control message (refer to FIG. 5) expressing a "line speed regulation" and transmits the control message to the MS 2 via the distributor 151. When the control of communication speed is completed, the line speed regulator 102 requests the HO-execution-confirmation notifier 103 to transmit an HO-execution-confirmation notification.

Concerning the speed control of the communication with the MS 2, it can be performed by, for example, assigning the frequency range (namely, the channel number) and the time for which the range can be occupied (namely, the symbol number) to the MS 2 using a control message. Specifically, it can be performed by transmitting a control message to the target MS 2, in which the CID acquired from the MS information storage 152 and the message type are specified at the header portion and the channel number and the symbol number are specified at the data portion, as described earlier for FIG. 5. Incidentally, the line speed regulator 102 of the HO-target BS 4 can assign an arbitrary speed of the communication with the MS 2 using a similar control message, and therefore, it can perform control to increase the communication speed, which was lowered before the execution of the HO.

From the above description, it is evident that the above-mentioned RTO request unit 106, HO time estimator 107, line-speed-regulation judgment unit 108, and line speed regulator 102 function in cooperation as the communication-speed control means which increases the RTO value by performing control to lower the speed of the communication with the MS 2 when the above-mentioned HO-execution-notification receiver 101 decides the above-mentioned HO execution, and that they can perform control to increase the above-mentioned communication speed after completion of the HO execution.

The HO-execution-confirmation notifier 103 transmits an HO-execution-confirmation notification (enabling acknowledgement), which expresses an HO-execution enabling, to the MS 2 using a control message (refer to FIG. 5), with the notification (request) sent from the line speed regulator 102 as a trigger. In the present example, the HO-execution-confirmation notifier 103 functions as the handover execution means which executes an HO process after the control to lower the communication speed, which is performed by the line speed regulator 102. Specifically, the HO-execution-confirmation notifier 103 creates a control message in which the CID acquired from the MS information storage 152 and the message type are specified at the header portion and the HO-execution enabling (OK) information is specified at the data portion, as described earlier for FIG. 5, with the notification sent from the line speed regulator 102 as a trigger, and transmits it to the distributor 151.

The distributor 151 controls the CIDs with respect to the communicating MSs 2 and outputs control messages to appropriate targets in accordance with the information (TYPE value) about the message types (such as HO execution notification, HO-execution-confirmation notification, RTO request (acquisition), RTO notification (transmission), and line speed regulation to be described later) contained in the header of each control message.

With the above-mentioned structure, the BS 3 according to the first embodiment of the present invention estimates time required for an HO process upon receiving an HO execution notification from the MS 2, compares the estimated result and the present RTO value which was acquired by sending a request to the MS 2, regulates (performs control to lower) the line speed on the basis of the comparison result, and then executes the HO. In this way, the BS 3 can execute an HO process with the RTO value increased in order for the timer not to exceed the RTO value by creating simulated line congestion through a control to lower the speed of the communication with the MS 2, if it is necessary.

(Description of Entire Operation of Wireless Communication System 1)

Figure 2:
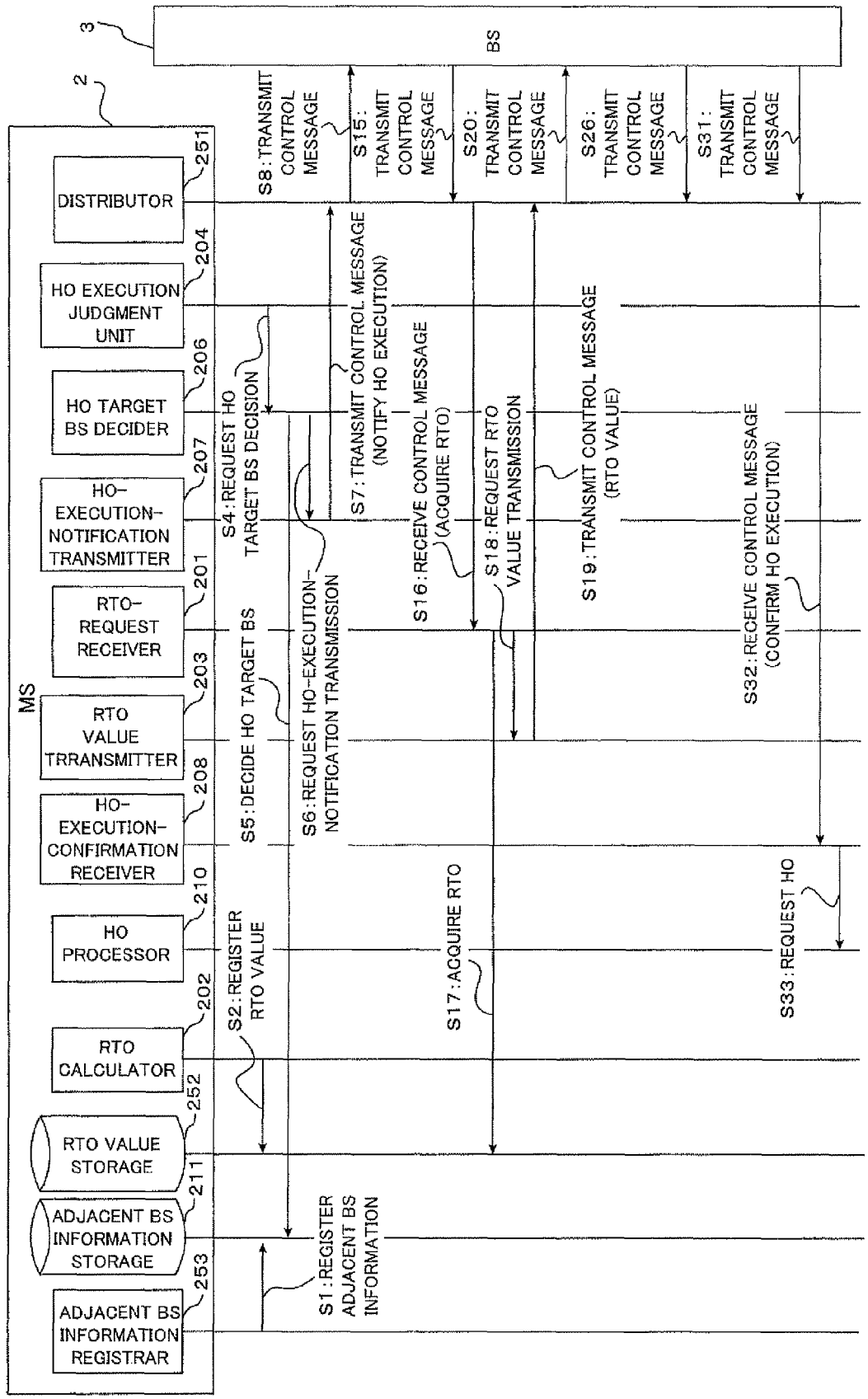
FIG. 2 is a sequence diagram illustrating an operation (handover process) of the wireless communication system depicted in FIG. 1.
Figure 3:
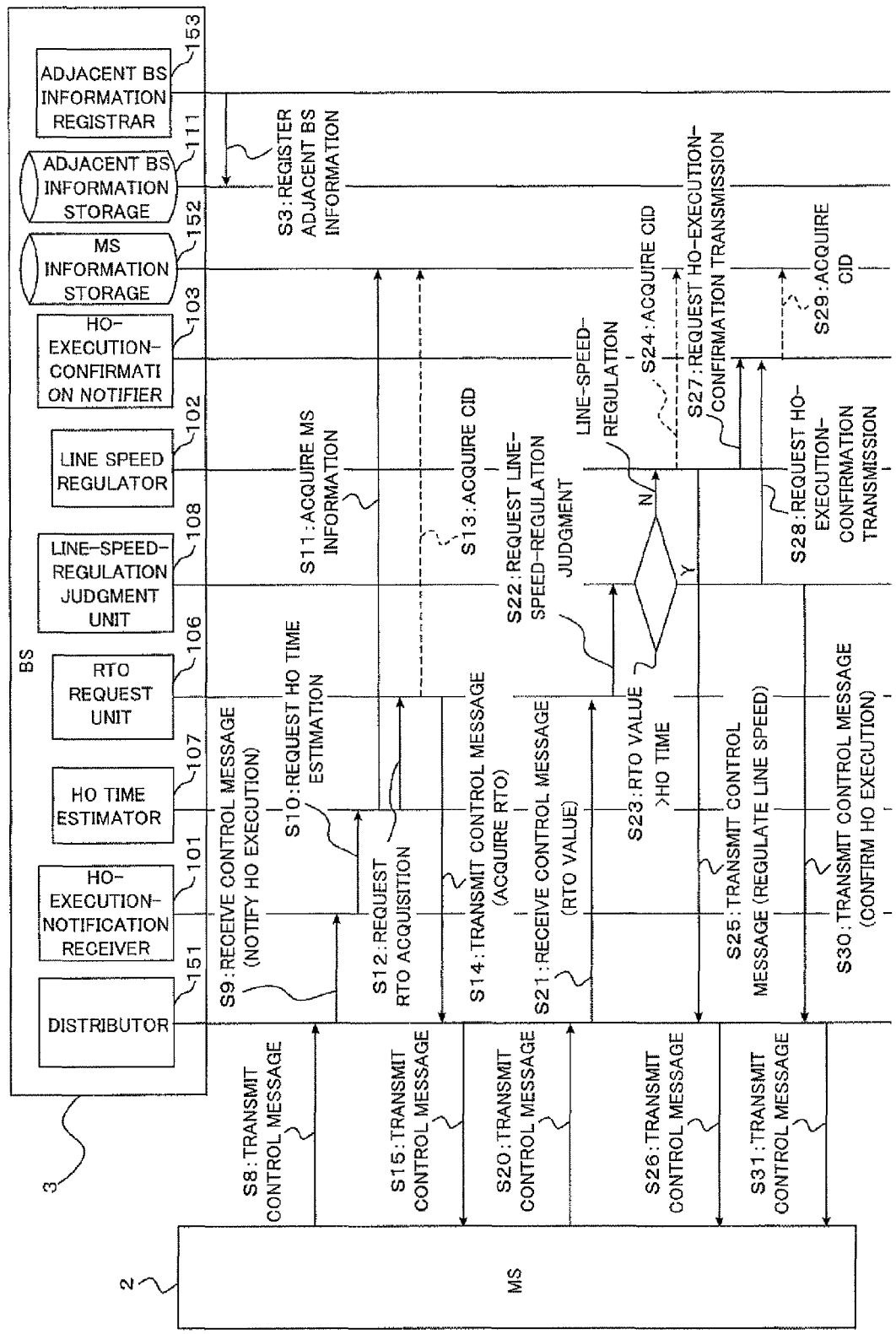
FIG. 3 is a sequence diagram illustrating an operation (handover process) of the wireless communication system depicted in FIG. 1.

Next, an example of the entire operation of the wireless communication system 1 having the above-mentioned structure will be described with reference to FIG. 2 and FIG. 3. FIG. 2 is a sequence diagram illustrating an operation (handover process) of the wireless communication system (especially, the MS 2) illustrated in FIG. 1. FIG. 3 is a sequence diagram illustrating an operation (handover process) of the wireless communication system (especially, the BS 3) illustrated in FIG. 1.

First, the MS 2 acquires the CID (for example, CID#01) of the connection to the serving BS 3 in advance. The CID (CID#01) is controlled by the distributor 251.

In addition, in the MS 2, the adjacent BS information registrar 253 acquires information (adjacent BS information) about the BSs 3 (including the HO-target BS 4) that are geographically neighboring on the serving BS 3, such as their frequencies used, capability types supported (typically including security function, packet retransmission function, MIMO function, etc.), radio field strengths, and the number of MSs in charge, and registers it in the adjacent BS information storage 211 (step S1). The MS 2 can acquire that adjacent BS information by, for example, receiving it when it is transmitted (reported) from the BS 3.

Moreover, in the MS 2, the RTO calculator 202 measures the RTTs of the TCP data that are transmitted/received to/from the communication parties (namely, other MSs and Bss 3) regularly or irregularly and calculates the RTO values from those RTTs so as to store them in the RTO value storage 252 (step S2).

On the other hand, the BS 3 acquires information (MS information) about the MS 2 such as MS 2 identifier (for example, MS#01) and capability types supported by the MS 2 (typically including security function, packet retransmission function, MIMO function, etc.), and registers it in the MS information storage 152. That MS information can be acquired by, for example, transmission of necessary information also from the MS 2 at the phase when the MS 2 starts to communicate with the BS 3.

Next, in the BS 3, the adjacent BS information registrar 153 acquires information (adjacent BS information) about the geographically neighboring BSs 3 (including the HO-target BS 4) in advance, such as the frequency used and the capability types supported, and registers it in the adjacent BS information storage 111 (step S3). That adjacent BS information can be acquired by, for example, exchanging information with the neighboring BSs 3 (including the HO-target BS 4) regularly or irregularly with the above-mentioned CIDs to be used for exchanging BS information.

After the above-mentioned preliminary processes such as registration of information in the MS 2 and the BS 3, the MS 2 checks whether an HO should be executed or not by measuring the radio field strength of the serving BS 3 regularly or irregularly by the HO execution judgment unit 204. When the radio field strength is lower than the value that was preset by the administrator with a command, the HO execution judgment unit 204 judges that an HO execution is necessary and requests the HO-target BS decider 206 to decide the HO-target BS 4 (step S4).

The HO-target BS decider 206 refers to the adjacent BS information storage 211, with the above-mentioned request from the HO execution judgment unit 204 as a trigger, and determines the HO-target BS 4 on the basis of the adjacent BS information (step S5). For example, the BS 3 of which radio field strength is the highest of the neighboring BSs 3 is determined to be the HO-target BS 4. Then, the HO-target BS decider 206 notifies the HO-execution-notification transmitter 207 of the BS identifier (for example, BS#02) of the determined HO-target BS 4, and also, requests the HO-execution-notification transmitter 207 to transmit an HO execution notification (step S6).

The HO-execution-notification transmitter 207 creates a control message, upon reception of the above-mentioned request from the HO-target BS decider 206, in which the message type (TYPE#00) expressing an "HO execution notification" is specified at the header portion and the BS identifier (BS#02) of the HO-target BS 4 and the MS identifier (MS#01) of the MS 2, of which communication process is going to be handed over, are specified at the data portion and transmits the control message to the distributor 251 (step S7).

The distributor 251 specifies the CID (CID#01) at the header portion of that control message and transmits that control message to the BS 3 via the wireless network (step S8).

In the BS 3, the HO-execution-notification receiver 101 receives that control message (HO execution notification) via the distributor 151, which is transmitted from the MS 2 (step S9), acquires the MS identifier (MS#01) and the BS identifier (BS#02) contained in the data portion of that HO execution notification, and then sends a request for estimation of the HO processing time to the HO time estimator 107 together with the BS identifier (step S10). In addition, the HO-execution-notification receiver 101 acquires the MS identifier (MS#01) from the data portion of that control message and notifies the HO time estimator 107 of the MS identifier (MS#01).

The HO time estimator 107 acquires the MS information, from the MS information storage 152, about the MS 2 that transmitted the HO execution notification on the basis of the above-mentioned MS identifier (MS#01) (step S11), and transmits information about the functions supported by the MS 2 to the BS 3 (HO-target BS 4) of which identifier is the above-mentioned BS identifier (BS#02). In addition, the HO time estimator 107 estimates time (HO processing time) required for negotiation between the MS 2 and the BS 3 at the time of HO process on the basis of the information about the negotiation which is stored in the adjacent BS information storage 111, and transmits the estimated HO processing time to the line speed regulator 108. Moreover, the HO time estimator 107 notifies the RTO request unit 106 of an RTO acquisition request in order to acquire the RTO value of the MS 2 corresponding to the MS identifier that is acquired from the HO-execution-notification receiver 101 (step S12).

The RTO request unit 106 creates a control message expressing "RTO acquisition" when the RTO request unit 106 receives the above-mentioned RTO-value acquisition request from the HO time estimator 107. For example, the RTO request unit 106 searches the MS information storage 152 using the above-mentioned MS identifier (MS#01) as a search key so as to acquire the CID (CID#01) of the corresponding MS 2 (step S13), and specifies that CID at the header portion of the control message, as well as specifies a message type (TYPE#03) expressing "RTO acquisition" at the header portion. Then the RTO request unit 106 transmits the control message to the distributor 151 (step S14).

Upon receiving it, the distributor 151 transmits that control message to the MS 2 via the wireless network (step S15).

In the MS 2, the RTO-request receiver 201 receives the above-mentioned control message expressing "RTO acquisition" from the BS 3 via the distributor 251 (step S16), acquires the present RTO value from the RTO value storage 252 (step S17), and requests the RTO value transmitter 203 to transmit the RTO value while notifying it of the RTO value (step S18).

The RTO value transmitter 203 creates a control message by specifying the RTO value sent from the RTO-requirement receiver 201 at the data portion and specifying a message type (TYPE#04) expressing "RTO transmission" at the header portion, and transmits that control message to the distributor 251 (step S19).

Upon receiving it, the distributor 251 adds the CID (CID#01) at the header portion of that control message and transmits that control message to the BS 3 via the wireless network (step S20).

Next, in the BS 3, the RTO request unit 106 receives the above-mentioned control message expressing "RTO transmission" (step S21), acquires the RTO value specified at the data portion of the message, and transmits the acquired RTO value to the line-speed-regulation judgment unit 108 (step S22).

The line-speed-regulation judgment unit 108 compares the RTO value acquired from the RTO request unit 106 with the HO processing time estimated by the HO time estimator 107 (step S23). When the RTO value is larger than the HO processing time (see Y route of step S23), the line-speed-regulation judgment unit 108 judges that the line speed regulation is not necessary and requests the HO-execution-confirmation notifier 103 to transmit an HO-execution-confirmation notification by notifying it of the above-mentioned MS identifier (MS#01) (step S28).

On the other hand, when the RTO value is equal to or smaller than the HO processing time (see N route of step S23), the line-speed-regulation judgment unit 108 judges that the line speed regulation (lowering control) is necessary, because the timer will exceed the RTO value during the HO process without it, and requests the line speed regulator 102 to regulate (perform control to lower) the line speed by notifying it of the above-mentioned MS identifier (MS#01).

Upon the reception of the above-mentioned request for line speed regulation, the line speed regulator 102 creates a control message in which, as described earlier for FIG. 5, the symbol number and channel number (both of which are "1" in the present example, for example) are specified at the data portion and a message type (TYPE#01) expressing "line speed regulation" and the CID (CID#01) of the corresponding MS 2, which is acquired from the MS information storage 152 using the above-mentioned MS identifier (MS#01) as the search key, are specified at the header portion, and transmits that control message to the distributor 151 (steps S24, S25).

Upon receiving it, the distributor 151 transmits that control message to the MS 2 via the wireless network (step S26).

Subsequently, the line speed regulator 102 requests the HO-execution-confirmation notifier 103 to transmit an HO-execution-confirmation notification by notifying it of the above-mentioned MS identifier (MS#01) (step S27).

Upon the reception of the above-mentioned request for transmission of the HO-execution-confirmation notification from the line-speed-regulation judgment unit 108 or the line speed regulator 102, the HO-execution-confirmation notifier 103 creates a control message in which, as described earlier for FIG. 5, the information expressing "HO execution enabling" is specified at the data portion and a message type (TYPE#02) expressing "HO execution confirmation" and the CID (CID#01) of the corresponding MS 2, which is acquired from the MS information storage 152, are specified at the header portion, and transmits that control message to the distributor 151 (steps S29, S30).

Upon receiving it, the distributor 151 transmits that control message to the MS 2 via the wireless network (step S31).

Next, in the MS 2, the HO-execution-confirmation receiver 208 receives the above-mentioned control message expressing "HO execution confirmation" via the distributor 251 (step S32) and requests the HO processor 210 to perform HO process (step S33), and thereby, the HO process to the HO-target BS 4 is executed.

Incidentally, the line speed, which was controlled to be lowered by the aforementioned procedure before executing the HO, is reassigned to the MS 2 by the HO-target BS 4 independently of the state before the HO execution after completion of the HO. Concerning the reassignment method and the line speed, it is possible that, for example, the HO-target BS 4 determines the line speed to be reassigned to the MS 2 in accordance with the number of the currently-processed MSs and notifies the MS 2 of the determined line speed using a control message (TYPE#01) when the MS 2 communicates with the HO-target BS 4.

As described above, according to the first embodiment of the present invention, when an HO execution is decided by the MS 2 and the requirement for it is sent to the BS 3, the BS 3 performs control to lower the line speed of the communication with the MS 2 before executing the HO, which causes a simulated congestion of the line. This can increase the RTO value to the degree that the RTO value is longer than the time that is necessary for completion of the HO process. Therefore, the time-out of the RTO value (retransmission timer) during the HO can be prevented, which makes it possible to inhibit the throughput reduction caused by a slow-start algorithm originating from the above-mentioned time-out without inducing throughput reduction in normal times.

[A1] Description of the Variation of the First Embodiment

In the above-mentioned first embodiment, explanation was given on the case where the necessities of HO processes are checked and decided by the MS 2, in other words, the MS 2 takes the initiative to execute HO processes. However, the BS 3 may take the initiative to execute HO processes. Such an embodiment will be described in the explanation of the present variation example with reference to FIG. 9 to FIG. 11.

Figure 9:
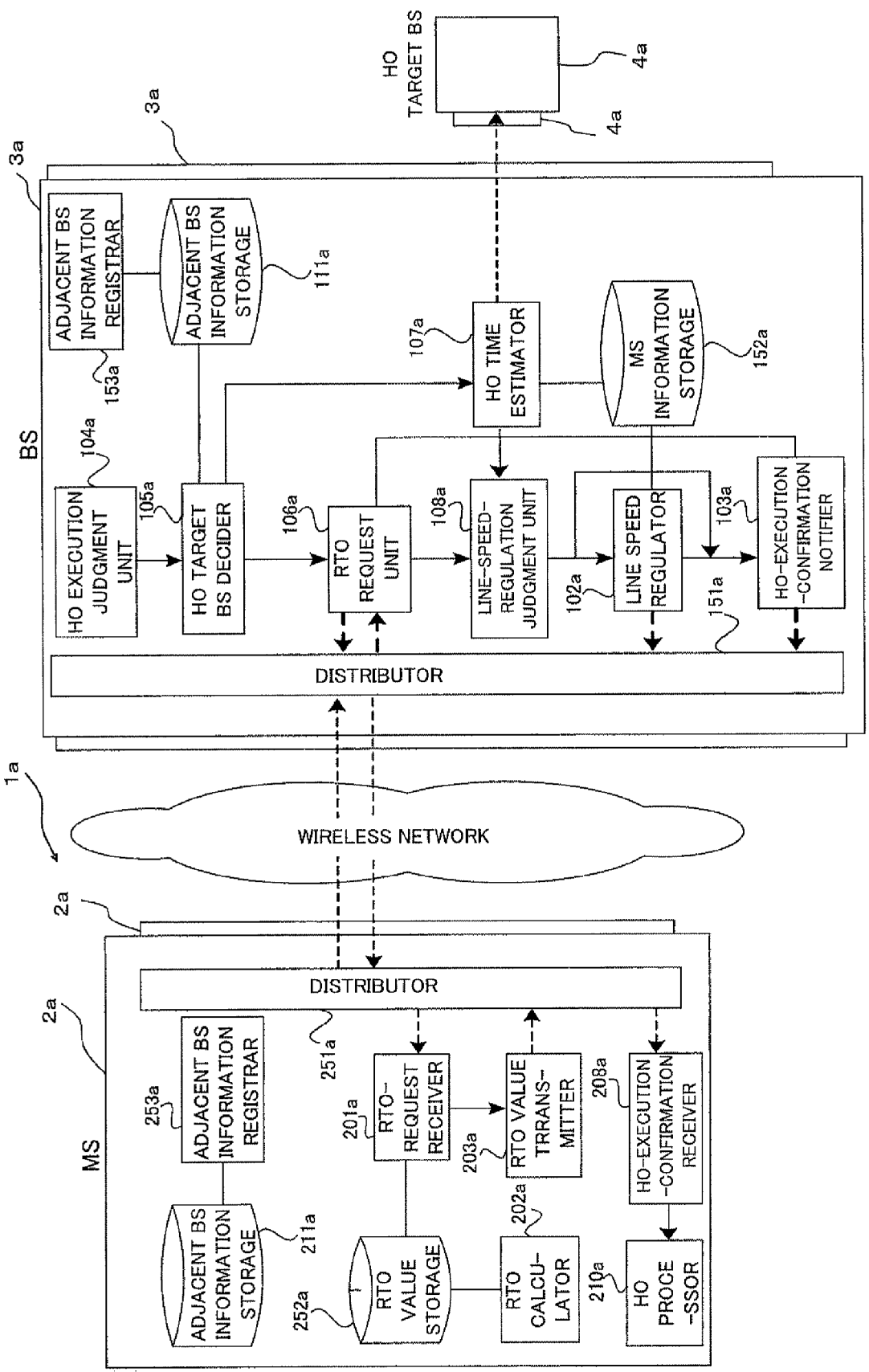
FIG. 9 is a block diagram illustrating the construction of the substantial part of the wireless communication system according to the variation of the first embodiment.
Figure 10:
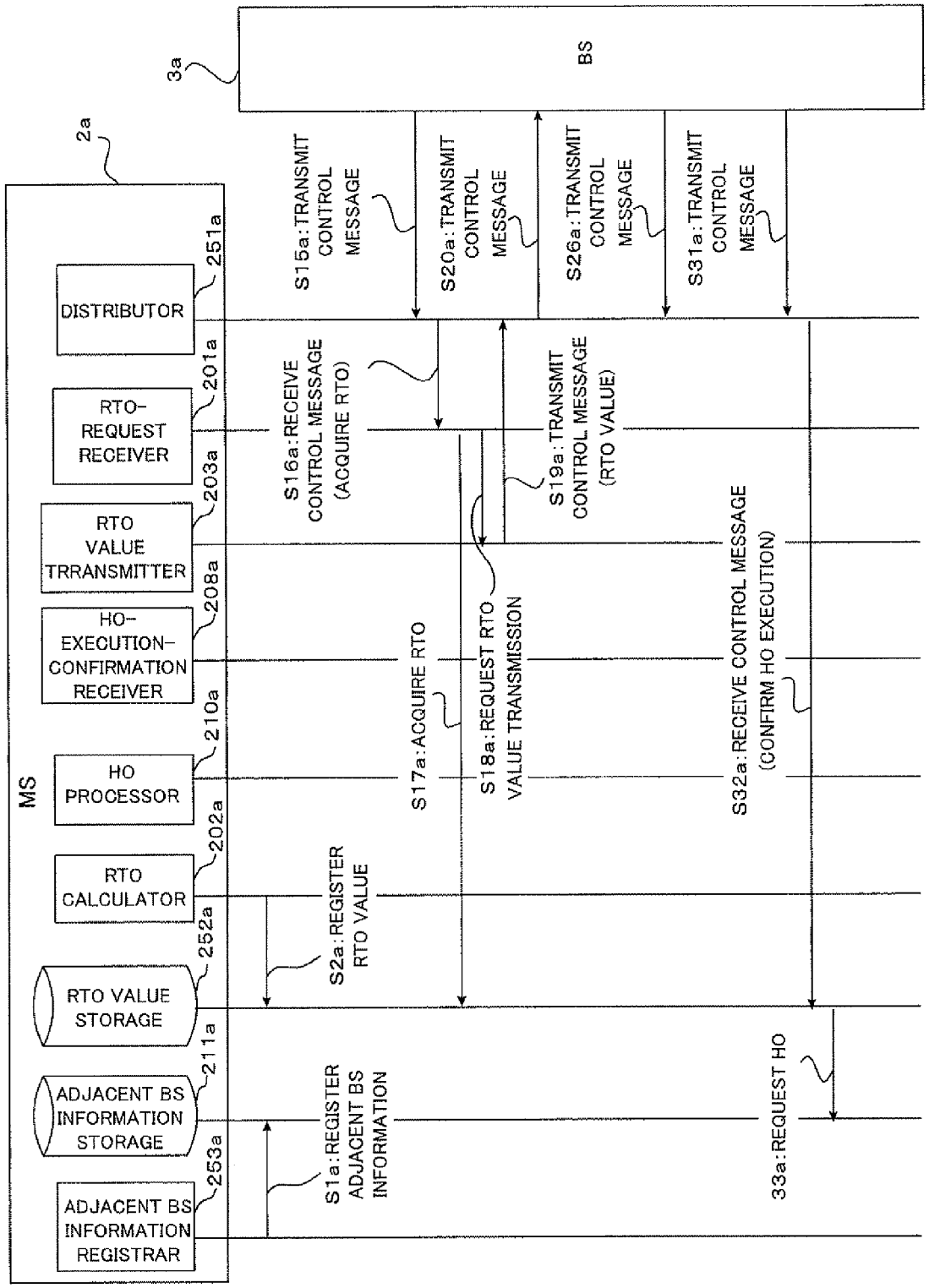
FIG. 10 is a sequence diagram illustrating an operation (handover process) of the wireless communication system depicted in FIG. 9.
Figure 11:
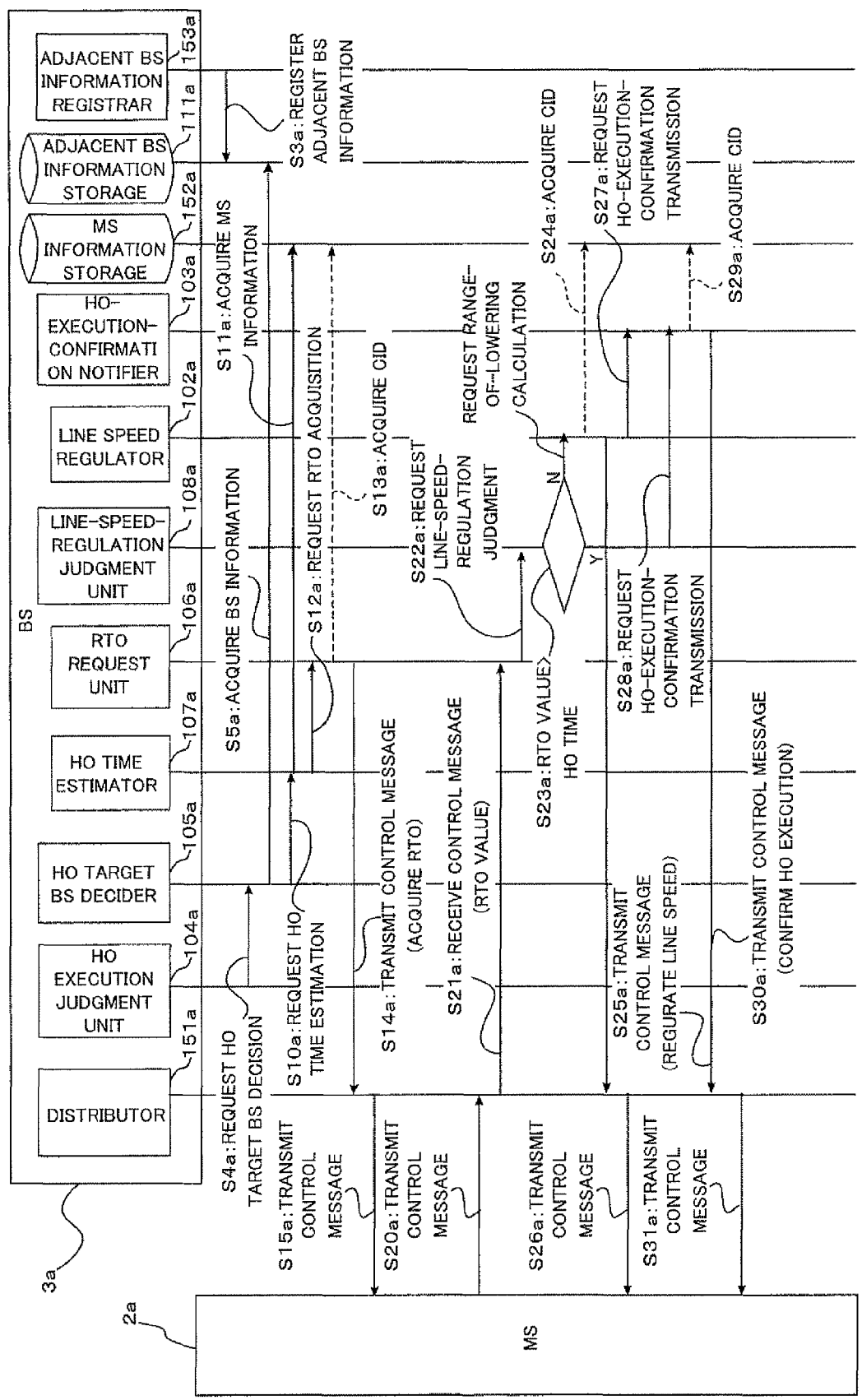
FIG. 11 is a sequence diagram illustrating an operation (handover process) of the wireless communication system depicted in FIG. 9.

FIG. 9 is a block diagram illustrating the construction of the substantial part of the wireless communication system according to the variation of the above-mentioned first embodiment. FIG. 10 is a sequence diagram illustrating an operation (handover process) of the wireless communication system (especially, the MS 2a) illustrated in FIG. 9. FIG. 11 is a sequence diagram illustrating an operation (handover process) of the wireless communication system (especially, the BS 3a) illustrated in FIG. 9.

Namely, in the wireless communication system 1a illustrated in FIG. 9, at least one MS 2a and a plurality of BSs 3a (including the HO-target BS 4a) are connected to each other via a wireless network, in the same way as the wireless communication system 1 of the first embodiment. However, it differs from the wireless communication system 1 of the first embodiment in that the BS 3a decides whether HO processes will be executed or not.

(Description of MS 2a)

Therefore, the MS 2a of the present example comprises an adjacent BS information storage 211a, an adjacent BS information registrar 253a, an RTO-request receiver 201a, an RTO calculator 202a, an RTO value storage 252a, an RTO value transmitter 203a, an HO-execution-confirmation receiver 208a, an HO processor 210a, and a distributor 251a, which are of the same or similar functions as or to each corresponding units 211, 253, 201, 202, 252, 203, 208, 210 and 251 described earlier for FIG. 1 to FIG. 3, and it may not need the functions of the HO execution judgment unit 204 and the HO-target BS decider 206, which were illustrated in FIG. 1.

(Description of BS 3a)

On the other hand, the BS 3a of the present example comprises an RTO request unit 106a, an HO time estimator 107a, a line-speed-regulation judgment unit 108a, an adjacent BS information registrar 153a, an adjacent BS information storage 111a, an MS information storage 152a, a line speed regulator 102a, an HO-execution-confirmation notifier 103a, and a distributor 151a, which are of the same or similar functions as or to each corresponding units described earlier for FIG. 1, and also comprises an HO execution judgment unit 104a and an HO-target BS decider 105a, in place of the above-mentioned HO-execution-notification receiver 101 described earlier for FIG. 1.

The HO execution judgment unit 104a of the BS 3a collects information about the execution condition of HO processes and judges whether the HO processes will be executed or not. When the HO is executed, the HO execution judgment unit 104a notifies the HO-target BS decider 105a of the HO execution and requests the HO-target BS decider 105a to decide the HO-target BS 4a. Namely, the HO execution judgment unit 104a performs one of the functions of the handover decision means which autonomously decides execution of HO of the communication with the MS 2a to another BS 3a (HO-target BS 4a).

The HO-target BS decider 105a decides the HO-target BS 4a on the basis of the adjacent BS information stored in the adjacent BS information storage 111a by selecting from the adjacent BSs 3a that are already registered, with the reception of the request for decision of the HO-target BS 4a from the HO execution judgment unit 104a as a trigger. Concerning the criterion of deciding (selecting) the BS, the BS 3a whose radio field strength is higher than those of the other BSs 3a can be selected (decided) as the HO-target BS 4a, for example, also in the present variation.

(Description of Entire Operation of Wireless Communication System 1a)

In the following, an example of the entire operation of the wireless communication system 1a of which construction is such as described above is illustrated in FIG. 10 and FIG. 11.

First, the MS 2a acquires the CID (for example, CID#01) of the connection to the serving BS 3a in advance. The CID (CID#01) is controlled by the distributor 251a.

In addition, in the MS 2a, the adjacent BS information registrar 253a acquires adjacent BS information about the BSs 3a (including the HO-target BS 4a) that are geographically neighboring on the serving BS 3a, and registers it in the adjacent BS information storage 211a (step S1a), as illustrated in FIG. 10. Moreover, in the MS 2a, the RTO calculator 202a measures the RTTs of the TCP data that are transmitted/received to/from the communication parties (namely, other MSs and Bss 3a) regularly or irregularly and calculates the RTO values from those RTTs so as to store them in the RTO value storage 252a (step S2a).

On the other hand, the BS 3a acquires information (MS information) about the MS 2a, such as the identifier of the MS 2a (for example, MS#01) and capability types supported by the MS 2a (typically including security function, packet retransmission function, MIMO function, etc.), and registers it in the MS information storage 152a. That MS information can be acquired by, for example, transmission of necessary information also from the MS 2a at the phase when the MS 2a starts to communicate with the BS 3a.

Next, in the BS 3a, the adjacent BS information registrar 153a acquires the adjacent BS information about the geographically neighboring BSs 3a (including the HO-target BS 4a) in advance, and registers it in the adjacent BS information storage 111a (step S3a). That adjacent BS information can be acquired by, for example, exchanging information with the neighboring BSs 3a (including the HO-target BS 4a) regularly or irregularly with the above-mentioned CIDs to be used for exchanging BS information.

After the above-mentioned preliminary processes such as registration of information in the MS 2a and the BS 3a, the BS 3a checks whether an HO should be executed or not by measuring the radio field strength of the MS 2a regularly or irregularly by the HO execution judgment unit 104a. When the radio field strength is lower than the value that was preset by the administrator with a command, the HO execution judgment unit 104a judges that an HO execution is necessary and requests the HO-target BS decider 106a[sic] to decide the HO-target BS 4a (step S4a).

The HO-target BS decider unit 106a[sic] refers to the adjacent BS information storage 111a, with the above-mentioned request from the HO execution judgment unit 104a as a trigger, and determines the HO-target BS 4a on the basis of the adjacent BS information (step S5a). For example, the BS 3a of which radio field strength is the highest of the neighboring BSs 3a is determined to be the HO-target BS 4a. Then, the HO-target BS decider 106a[sic] sends a request for estimation of the HO processing time to the HO time estimator 107a together with the BS identifier (BS#02) of the HO-target BS 4a (step S10a). In addition, the HO-target BS decider 106a[sic] notifies the HO time estimator 107a of the MS identifier (MS#01) corresponding to the MS 2a of which communication is going to be handed over.

The HO time estimator 107a acquires the MS information, from the MS information storage 152a, about the corresponding MS 2a on the basis of the above-mentioned MS identifier (MS#01) (step S11a), and transmits information about the functions supported by the MS 2a to the BS 3a (HO-target BS 4a) that possesses the above-mentioned BS identifier (BS#02). In addition, the HO time estimator 107a estimates time (HO processing time) required for negotiation between the MS 2a and the BS 3a at the time of HO process on the basis of the information about the negotiation which is stored in the adjacent BS information storage 111a, and transmits the estimated HO processing time to the line speed regulator 108a.

The RTO request unit 106a creates a control message expressing "RTO acquisition" when the RTO request unit 106a receives the above-mentioned RTO-value acquisition request from the HO time estimator 107a (step S12a). For example, the RTO request unit 106a searches the MS information storage 152a using the above-mentioned MS identifier (MS#01) as a search key so as to acquire the CID (CID#01) of the corresponding MS 2a (step S13a), and specifies that CID at the header portion of the control message, as well as specifies the message type (TYPE#03) expressing "RTO acquisition" at the header portion. Then the RTO request unit 106a transmits the control message to the distributor 151a (step S14a).

Upon receiving it, the distributor 151a transmits that control message to the MS 2a via the wireless network (step S15a).

In the MS 2a, the RTO-request receiver 201a receives the above-mentioned control message expressing "RTO acquisition" from the BS 3a via the distributor 251a (step S16a), acquires the present RTO value from the RTO value storage 252a (step S17a), and requests the RTO value transmitter 203a to transmit the RTO value while notifying it of the RTO value (step S18a).

The RTO value transmitter 203a creates a control message by specifying the RTO value sent from the RTO-request receiver 201a at the data portion and specifying a message type (TYPE#04) expressing "RTO transmission" at the header portion, and transmits that control message to the distributor 251a (step S19a).

Upon receiving it, the distributor 251a adds the CID (CID#01) at the header portion of that control message and transmits that control message to the BS 3a via the wireless network (step S20a).

Next, in the BS 3a, the RTO request unit 106a receives the above-mentioned control message expressing "RTO transmission" (step S21a), acquires the RTO value specified at the data portion of the message, and transmits the acquired RTO value to the line-speed-regulation judgment unit 108a (step S22a).

The line-speed-regulation judgment unit 108a compares the RTO value acquired from the RTO request unit 106a with the HO processing time estimated by the HO time estimator 107a (step S23a). When the RTO value is larger than the HO processing time (refer to Y route of step S23a), the line-speed-regulation judgment unit 108a judges that the line speed regulation is not necessary and requests the HO-execution-confirmation notifier 103a to transmit an HO-execution-confirmation notification by notifying it of the above-mentioned MS identifier (MS#01) (step S28a).

On the other hand, when the RTO value is equal to or smaller than the HO processing time (see N route of step S23a), the line-speed-regulation judgment unit 108a judges that the line speed regulation (lowering control) is necessary, because the timer will exceed the RTO value during the HO process without it, and requests the line speed regulator 102a to regulate (perform control to lower) the line speed by notifying it of the above-mentioned MS identifier (MS#01).

Upon the reception of the above-mentioned request for line speed regulation, the line speed regulator 102a creates a control message in which, as described earlier for FIG. 5, the symbol number and channel number (both of which are "1" in the present example, for example) are specified at the data portion and a message type (TYPE#01) expressing "line speed regulation" and the CID (CID#01) of the corresponding MS 2a, which is acquired from the MS information storage 152a using the above-mentioned MS identifier (MS#01) as the search key, are specified at the header portion, and transmits that control message to the distributor 151a (step S24a, S25a).

Upon receiving it, the distributor 151a transmits that control message to the MS 2a via the wireless network (step S26a).

Subsequently, the line speed regulator 102a requests the HO-execution-confirmation notifier 103a to transmit an HO-execution-confirmation notification by notifying it of the above-mentioned MS identifier (MS#01) (step S27a).

Upon the reception of the above-mentioned request for transmission of the HO-execution-confirmation notification from the line-speed-regulation judgment unit 108a or the line speed regulator 102a, the HO-execution-confirmation notifier 103a creates a control message in which, as described earlier for FIG. 5, the information expressing "HO execution enabling" is specified at the data portion and a message type (TYPE#02) expressing "HO execution confirmation" and the CID (CID#01) of the corresponding MS 2a, which is acquired from the MS information storage 152a, are specified at the header portion, and transmits that control message to the distributor 151a (steps S29a, S30a).

Upon receiving it, the distributor 151a transmits that control message to the MS 2a via the wireless network (step S31a).

Next, in the MS 2a, the HO-execution-confirmation receiver 208a receives the above-mentioned control message expressing "HO execution confirmation" via the distributor 251a (step S32a) and requests the HO processor 210a to perform HO process (step S33a), and thereby, HO process to the HO-target BS 4a is executed.

Incidentally, the line speed, which was controlled to be lowered by the aforementioned procedure before executing the HO, is reassigned to the MS 2a by the HO-target BS 4a independently of the state before the HO execution after completion of the HO. Concerning the reassignment method and the line speed, it is possible that, for example, the HO-target BS 4*a* determines the line speed to be reassigned to the MS 2*a* in accordance with the number of the currently-processed MSs and notifies the MS 2*a* of the determined line speed using a control message (TYPE#01) when the MS 2*a* communicates with the HO-target BS 4*a*.

In this way, the wireless communication system 1*a* of the present variation can also increase the RTO value so as to prevent the timer (retransmission timer) from exceeding the RTO value during the HO process by performing control to lower the line speed of the communication with the MS 2*a* before executing the HO, in the same way as the wireless communication system 1 of the first embodiment. Therefore, it is possible to inhibit the throughput reduction caused by a slow-start algorithm originating from the above-mentioned time-out.

[B] Description of the Second Embodiment

Figure 12:
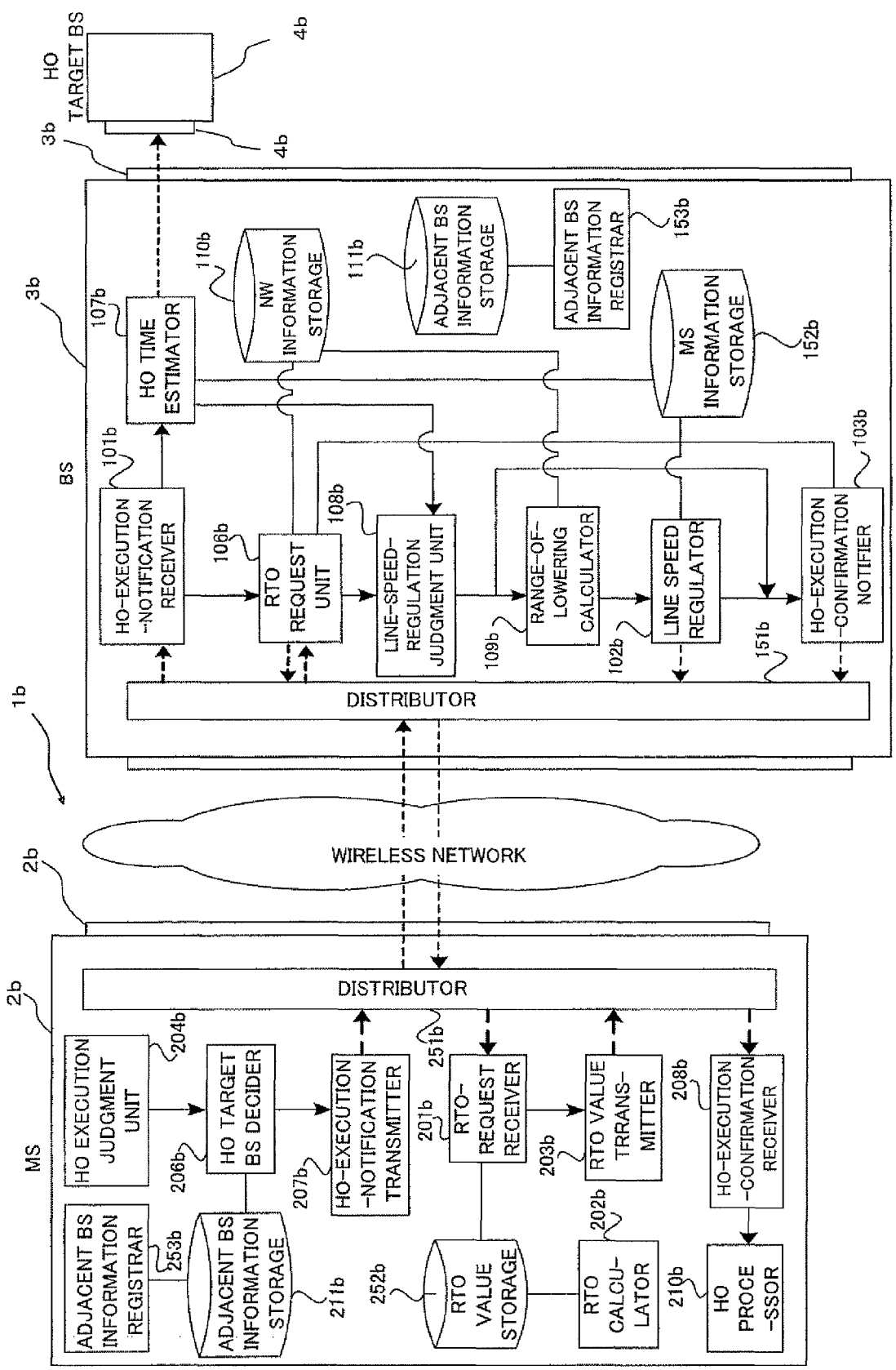
FIG. 12 is a block diagram illustrating the construction of the substantial part of the wireless communication system according to the second embodiment of the present invention.
Figure 13:
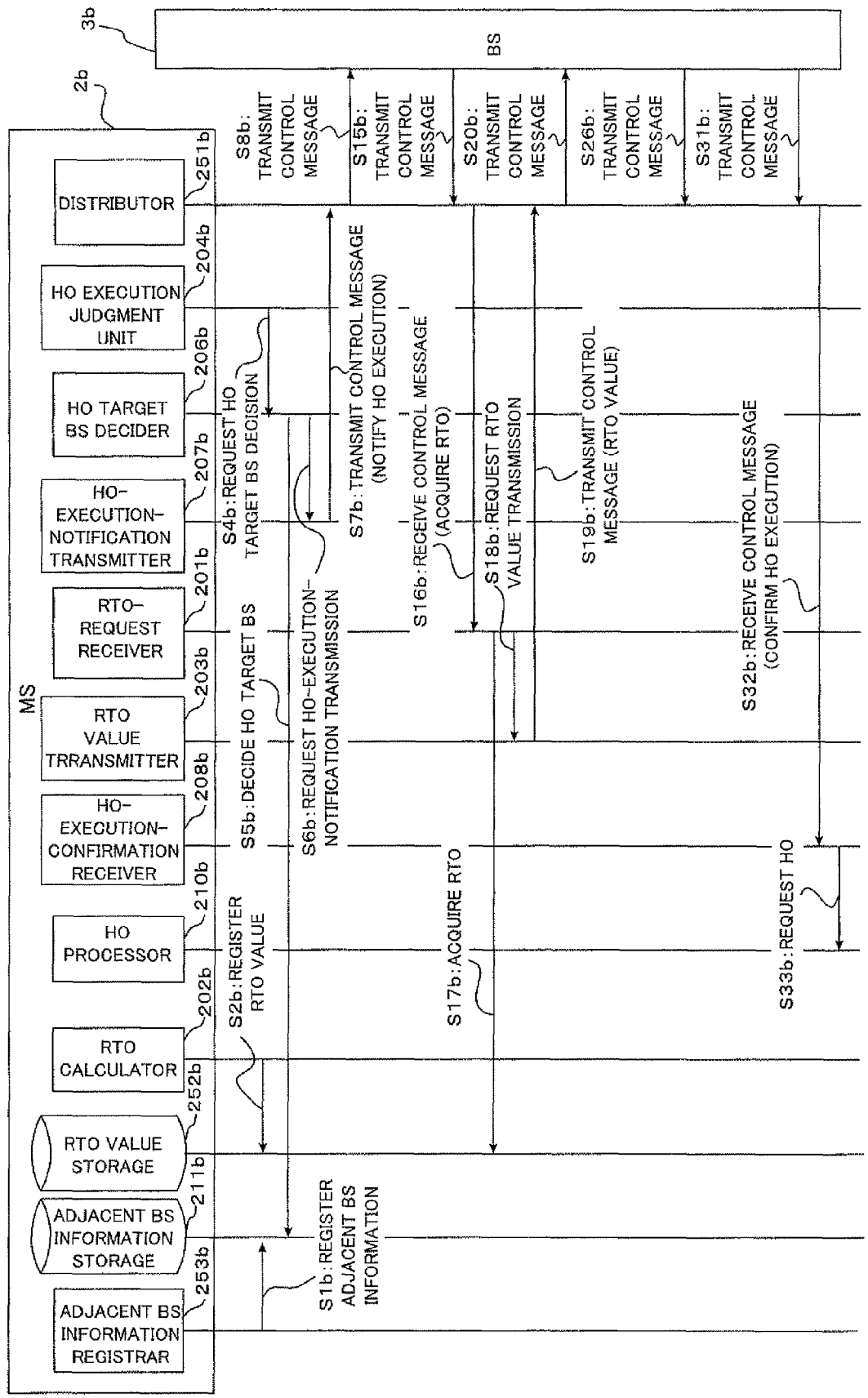
FIG. 13 is a sequence diagram illustrating an operation (handover process) of the wireless communication system depicted in FIG. 12.
Figure 14:
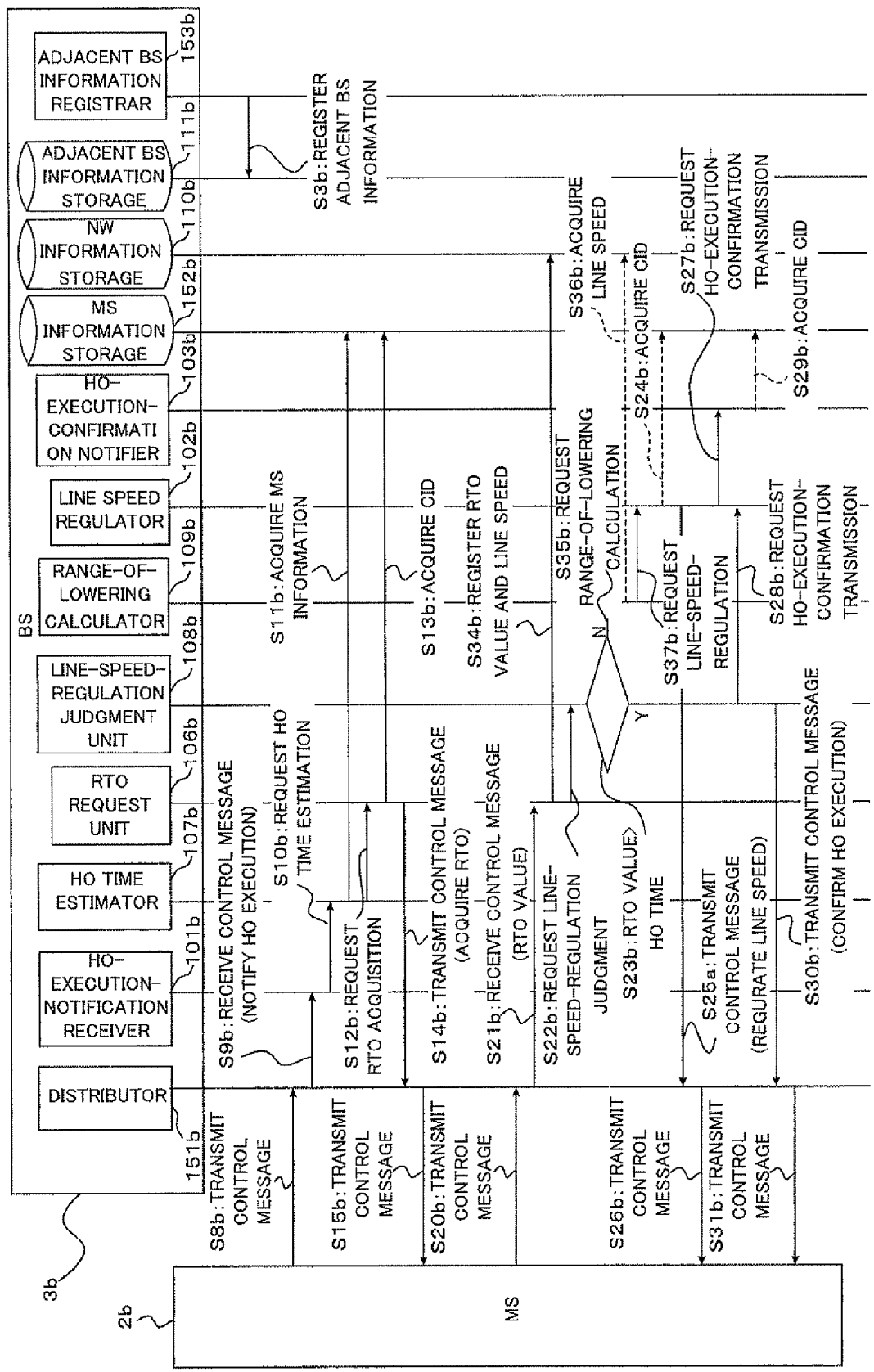
FIG. 14 is a sequence diagram illustrating an operation (handover process) of the wireless communication system depicted in FIG. 12.

FIG. 12 is a block diagram illustrating the construction of the substantial part of the wireless communication system according to the second embodiment of the present invention. FIG. 13 is a sequence diagram illustrating an operation (handover process) of the wireless communication system (especially, MS 2*b*) illustrated in FIG. 12. FIG. 14 is a sequence diagram illustrating an operation (handover process) of the wireless communication system (especially, BS 3*b*) illustrated in FIG. 12. All of these figures illustrate an embodiment in which the MS judges whether HO processes are executed or not, in the same way as the first embodiment.

Therefore, also in the wireless communication system 1*b* illustrated in FIG. 12, at least one MS 2*b* and a plurality of BSs 3*b* (including the HO-target BS 4*b*) are connected to each other via a wireless network. However, the present embodiment differs from the construction illustrated in FIG. 1 mainly in that a range-of-lowering calculator 109*b* and a network (NW) information storage 110*b* are added to the BS 3*b*.

Therefore, the MS 2*b* comprises an HO execution judgment unit 204*b*, an HO-target BS decider 206*b*, an adjacent BS information storage 211*b*, an adjacent BS information registrar 253*b*, an HO-execution-notification transmitter 207*b*, an RTO-request receiver 201*b*, an RTO calculator 202*b*, an RTO value storage 252*b*, an RTO value transmitter 203*b*, an HO-execution-confirmation receiver 208*b*, an HO processor 210*b*, and a distributor 251*b*, which are of the same or similar functions as or to each corresponding units 204, 206, 211, 253, 207, 201, 202, 252, 203, 208, 210 and 251 described earlier for FIG. 1. The BS 3*b* comprises an HO-execution-notification receiver 101*b*, an HO time estimator 107*b*, an RTO request unit 106*b*, a line-speed-regulation judgment unit 108*b*, a line speed regulator 102*b*, an MS information storage 152*b*, an adjacent BS information registrar 153*b*, an adjacent BS information storage 111*b*, an HO-execution-confirmation notifier 103*b*, and a distributor 151*b*, which are of the same or similar functions as or to each corresponding units 101, 106, 107, 108, 102, 152, 153, 111, 103 and 151 described earlier for FIG. 1, and also comprises a range-of-lowering calculator 109*b* and an NW information storage 110*b*.

(Description of MS 2*b*)

In the MS 2*b*, the HO execution judgment unit 204*b*, the HO-target BS decider 206*b*, the adjacent BS information storage 211*b*, the adjacent BS information registrar 253*b*, the HO-execution-notification transmitter 207*b*, the RTO-request receiver 201*b*, the RTO calculator 202*b*, the RTO value storage 252*b*, the RTO value transmitter 203*b*, the HO-execution-confirmation receiver 208*b*, the HO processor 210*b*, and the distributor 251*b* are of the same or similar functions as or to each corresponding units described earlier for FIG. 1.

Therefore, the MS 2*b* according to the second embodiment can also decide HO execution and request the BS 3*b* to perform HO upon reception of a signal from the BS 3*b*, as well as transmit the RTO value which is calculated by the RTO calculator 202*b* to the BS 3*b* in accordance with a request from the BS 3*b*, in the same way as the MS 2 of the first embodiment. In addition, the MS 2*b* of the present example can also perform congestion control (communication speed control) to lower the line speed of the communication with the communication party upon time-out of the RTO value.

(Description of BS 3B)

On the other hand, in the BS 3*b*, the HO-execution-notification receiver 101*b*, the RTO request unit 106*b*, the HO time estimator 107*b*, the line-speed-regulation judgment unit 108*b*, the adjacent BS information registrar 153*b*, the adjacent BS information storage 111*b*, the MS information storage 152*b*, the line speed regulator 102*b*, the HO-execution-confirmation notifier 103*b*, and the distributor 151*b* are of the same or similar functions as or to each corresponding units described earlier for FIG. 1.

The RTO request unit (timer-value acquisition unit) 106*b* has the same function as the RTO request unit 106 described earlier. Namely, the RTO request unit 106*b* requests the MS 2*b* to send the RTO value and acquires the present RTO value from the MS 2*b*, with the reception of the RTO-value acquisition request from the HO-execution-notification receiver 101*b* as a trigger.

Namely, the RTO request unit 106*b* can request the MS 2*b* to send RTO by creating a control message (refer to FIG. 5) expressing an "RTO request" and transmitting the control message to the distributor 151*b* and acquire the RTO value from the MS 2*b* by receiving a control message (refer to FIG. 5) expressing an "RTO transmission", which is the reply to the above-mentioned transmitted control message, from the MS 2*b*. In the present example, the RTO request unit 106*b* has an additional function of registering (storing) the acquired RTO values in the NW information storage 11*b* with those RTO values associated with the line speed (channel capacity) of the communication with the MS 2*b* at the time of acquiring each RTO value.

The NW information storage (history information record unit) 11*b*, which is added to the BS 3*b* in the present example, stores (records) the RTO values received by the RTO request unit 106*b* as the history information about the communication speed with each RTO value associated with the channel capacity of the communication with the MS 2*b* at the time of receiving the RTO value. FIG. 15 illustrates an example of the history information stored in the NW information storage 110*b*. In the example illustrated in FIG. 15, the channel capacities at the time of acquisition of each RTO value are recorded as the corresponding numbers of channels used and symbol numbers, with respect to each RTO value (ms) acquired by the RTO request unit 106*b*. In the case where the RTO value is equal to 50 ms, the symbol number is "10" and the channel number is "5" then.

The range-of-lowering calculator 109*b*, which is also added to the BS 3*b* in the present example, calculates the range of lowering (lowering value) of the speed of the communication with the MS 2*b* via the wireless network at the time of the lowering control. The range-of-lowering calculator 109*b* acquires the line speed (namely, the symbol number and the channel number) corresponding to the RTO value larger than the HO processing time from the NW information storage 110*b* and notifies the line speed regulator 102*b* of those symbol number and channel number, with the reception of the speed-lowering-control request from the line-speed-regulation judgment unit 108b as a trigger. On the other hand, when no RTO value that is larger than the HO processing time is registered in the NW information storage 110b, the range-of-lowering calculator 109b calculates an appropriate RTO value on the basis of the history information that is already registered and notifies the line speed regulator 102b of the calculated symbol number and channel number.

For example when the HO processing time is 230 ms, the range-of-lowering calculator 109b can calculate an appropriate RTO value of 250 ms, by adding the RTO value of 200 ms (whose symbol number is 20 and channel number is 20) and the RTO value of 50 ms (whose symbol number is 10 and channel number is 5), and notify the line speed regulator 102b of the symbol number of 30 and the channel number of 25, which correspond to the calculated RTO value. Namely, the range-of-lowering calculator 109b performs the function of lowering-value calculation unit which calculates the lowering value of the communication speed (line speed) at the time of the lowering control on the basis of the history information recorded in the NW information storage 110b.

The line speed regulator 102b regulates the speed of the communication with the MS 2b via the wireless network. The line speed regulator 102b regulates (performs control to lower) the speed (namely, the symbol number and the channel number) of the communication with the MS 2b via the wireless network on the basis of the symbol number and the channel number that are sent from the above-mentioned range-of-lowering calculator 109b, with the reception of the symbol number and the channel number sent from the above-mentioned range-of-lowering calculator 109b as a trigger. Namely, the line speed regulator 102b creates a control message (refer to FIG. 5) expressing a "line speed regulation" and transmits the control message to the MS 2b via the distributor 151b. When the control of communication speed is completed, the line speed regulator 102b requests the HO-execution-confirmation notifier 103b to transmit an HO-execution-confirmation notification.

In this way, the BS 3b according to the second embodiment of the present invention can create, if necessary, a simulated line congestion through a control to lower the speed (namely, the symbol number and the channel number) of the communication with the MS 2b during the HO processing by an appropriate range of lowering on the basis of the above-mentioned history information.

(Description of Entire Operation of Wireless Communication System 1b)

Next, an example of the entire operation of the wireless communication system 1b having the above-mentioned structure will be described with reference to FIG. 13 and FIG. 14.

First, the MS 2b acquires the CID (for example, CID#01) of the connection to the serving BS 3b in advance. The CID (CID#01) is controlled by the distributor 251b.

In addition, in the MS 2b, the adjacent BS information registrar 253b acquires information (adjacent BS information) about the BSs 3b (including the HO-target BS 4b) that are geographically neighboring on the serving BS 3b, such as their frequencies used, capability types supported (typically including security function, packet retransmission function, MIMO function, etc.), radio field strengths, and the number of MSs in charge, and registers it in the adjacent BS information storage 211b (step S1b). The MS 2b can acquire that adjacent BS information by, for example, receiving it when it is transmitted (reported) from the BS 3b.

Moreover, in the MS 2b, the RTO calculator 202b measures the RTTs of the TCP data that are transmitted/received to/from the communication parties (namely, other MSs and BS 3b) regularly or irregularly and calculates the RTO values from those RTTs so as to store them in the RTO value storage 252b (step S2b).

On the other hand, the BS 3b acquires information (MS information) about the MS 2b such as the identifier of the MS 2b (for example, MS#01) and capability types supported by the MS 2b (typically including security function, packet retransmission function, MIMO function, etc.), and registers it in the MS information storage 152b. That MS information can be acquired by, for example, transmission of necessary information also from the MS 2b at the phase when the MS 2b starts to communicate with the BS 3b.

Next, in the BS 3b, the adjacent BS information registrar 153b acquires information (adjacent BS information) about the geographically neighboring BSs 3b (including the HO-target BS 4b) in advance, such as the frequency used and the capability types supported, and registers it in the adjacent BS information storage 111b (step S3b). That adjacent BS information can be acquired by, for example, exchanging information with the neighboring BSs 3b (including the HO-target BS 4b) regularly or irregularly with the above-mentioned CIDs to be used for exchanging BS information.

After the above-mentioned preliminary processes such as registration of information in the MS 2b and the BS 3b, the MS 2b checks whether an HO should be executed or not by measuring the radio field strength of the serving BS 3b regularly or irregularly by the HO execution judgment unit 204b. When the radio field strength is lower than the value that was preset by the administrator with a command, the HO execution judgment unit 204b judges that an HO execution is necessary and requests the HO-target BS decider 206b to decide the HO-target BS 4b (step S4b).

The HO-target BS decider 206b refers to the adjacent BS information storage 211b, with the above-mentioned request from the HO execution judgment unit 204b as a trigger, and determines the HO-target BS 4b on the basis of the adjacent BS information (step S5b). For example, the BS 3b of which radio field strength is the highest of the neighboring BSs 3b is determined to be the HO-target BS 4b. Then, the HO-target BS decider 206b notifies the HO-execution-notification transmitter 207b of the BS identifier (for example, BS#02) of the determined HO-target BS 4b, and also, requests the HO-execution-notification transmitter 207b to transmit an HO execution notification (step S6b).

The HO-execution-notification transmitter 207b creates a control message, upon reception of the above-mentioned request from the HO-target BS decider 206b, in which the message type (TYPE#00) expressing an "HO execution notification" is specified at the header portion and the BS identifier (BS#02) of the HO-target BS 4b and the MS identifier (MS#01) of the MS 2b, of which communication process is going to be handed over, are specified at the data portion and transmits the control message to the distributor 251b (step S7b).

The distributor 251b specifies the CID (CID#01) at the header portion of that control message and transmits that control message to the BS 3b via the wireless network (step S8b).

In the BS 3b, the HO-execution-notification receiver 101b receives that control message (HO execution notification) via the distributor 151b, which is transmitted from the MS 2b (step S9b), acquires the MS identifier (MS#01) and the BS identifier (BS#02) contained in the data portion of that HO execution notification, and then sends a request for estimation of the HO processing time to the HO time estimator 107b together with the BS identifier (step S10b). In addition, the HO-execution-notification receiver 101b acquires the MS identifier (MS#01) from the data portion of that control message and notifies the HO time estimator 107b of the MS identifier (MS#01).

The HO time estimator 107b acquires the MS information, from the MS information storage 152b, about the MS 2b that transmitted the HO execution notification on the basis of the above-mentioned MS identifier (MS#01) (step 11b), and transmits information about the functions supported by the MS 2b to the BS 3b (HO-target BS 4b) of which identifier is the above-mentioned BS identifier (BS#02). In addition, the HO time estimator 107b estimates time (HO processing time) required for negotiation between the MS 2b and the BS 3b at the time of HO process on the basis of the information about the negotiation which is stored in the adjacent BS information storage 111b, and transmits the estimated HO processing time to the line speed regulator 108b. Moreover, the HO time estimator 107b notifies the RTO request unit 106b of an RTO acquisition request in order to acquire the RTO value of the MS 2b corresponding to the MS identifier that is acquired from the HO-execution-notification receiver 101b (step S12b).

The RTO request unit 106b creates a control message expressing "RTO acquisition" when the RTO request unit 106b receives the above-mentioned RTO-value acquisition request from the HO time estimator 107b. For example, the RTO request unit 106b searches the MS information storage 152b using the above-mentioned MS identifier (MS#01) as a search key so as to acquire the CID (CID#01) of the corresponding MS 2b (step S13b), and specifies that CID at the header portion of the control message, as well as specifies a message type (TYPE#03) expressing "RTO acquisition" at the header portion. Then the RTO request unit 106b transmits the control message to the distributor 151b (step S14b).

Upon receiving it, the distributor 151b transmits that control message to the MS 2b via the wireless network (step S15b).

In the MS 2b, the RTO-requirement receiver 201b receives the above-mentioned control message expressing "RTO acquisition" from the BS 3b via the distributor 251b (step S16b), acquires the present RTO value from the RTO value storage 252b (step S17b), and requests the RTO value transmitter 203b to transmit the RTO value while notifying it of the RTO value (step S18b).

The RTO value transmitter 203b creates a control message by specifying the RTO value sent from the RTO-requirement receiver 201b at the data portion and specifying a message type (TYPE#04) expressing "RTO transmission" at the header portion, and transmits that control message to the distributor 251b (step S19b).

Upon receiving it, the distributor 251b adds the CID (CID#01) at the header portion of that control message and transmits that control message to the BS 3b via the wireless network (step S20b).

Next, in the BS 3b, the RTO request unit 106b receives the above-mentioned control message expressing "RTO transmission" (step S21b), acquires the RTO value specified at the data portion of the message, registers (stores) the acquired RTO value in the NW information storage 110b by associating it with the speed (channel capacity) of the communication with the MS 2b at the time of acquisition of it (step S34b), and transmits the acquired RTO value to the line-speed-regulation judgment unit 108b (step S22b).

The line-speed-regulation judgment unit 108b compares the RTO value acquired from the RTO request unit 106b with the HO processing time estimated by the HO time estimator 107b (step S23b). When the RTO value is larger than the HO processing time (see Y route of step S23b), the line-speed-regulation judgment unit 108b judges that the line speed regulation is not necessary and requests the HO-execution-confirmation notifier 103b to transmit an HO-execution-confirmation notification by notifying it of the above-mentioned MS identifier (MS#01) (step S28b).

On the other hand, when the RTO value is equal to or smaller than the HO processing time (see N route of step S23b), the line-speed-regulation judgment unit 108b judges that the line speed regulation (lowering control) is necessary, because the timer will exceed the RTO value during the HO process without it, and requests the range-of-lowering calculator 109b to calculate the regulation value (range of lowering) of the line speed by notifying it of the above-mentioned MS identifier (MS#01) (step S35b).

Upon receiving the above-mentioned request for calculation, the range-of-lowering calculator 109b acquires (or calculates) the symbol number and the channel number that correspond to the smallest RTO value of those larger than the HO processing time estimated by the HO time estimator 107b from the NW information storage 110b (step S36b). Then, the range-of-lowering calculator 109b requests the line speed regulator 102b to regulate (perform control to lower) the line speed by notifying it of the above-mentioned MS identifier (MS#01) and the above-mentioned symbol number and channel number (step S37b).

Upon the reception of the above-mentioned request for line speed regulation, the line speed regulator 102b creates a control message in which, as described earlier for FIG. 5, the symbol number and channel number (the symbol number and channel number sent from the range-of-lowering calculator 109b, in the present example) are specified at the data portion and a message type (TYPE#01) expressing "line speed regulation" and the CID (CID#01) of the corresponding MS 2b, which is acquired from the MS information storage 152b using the above-mentioned MS identifier (MS#01) as the search key, are specified at the header portion, and transmits that control message to the distributor 151b (steps S24b, S25b).

Upon receiving it, the distributor 151b transmits that control message to the MS 2b via the wireless network (step S26b).

Subsequently, the line speed regulator 102b requests the HO-execution-confirmation notifier 103b to transmit an HO-execution-confirmation notification by notifying it of the above-mentioned MS identifier (MS#01) (step S27b).

Upon the reception of the above-mentioned request for transmission of the HO-execution-confirmation notification from the line-speed-regulation judgment unit 108b or the line speed regulator 102b, the HO-execution-confirmation notifier 103b creates a control message in which, as described earlier for FIG. 5, the information expressing "HO execution enabling" is specified at the data portion and a message type (TYPE#02) expressing "HO execution confirmation" and the CID (CID#01) of the corresponding MS 2b, which is acquired from the MS information storage 152b, are specified at the header portion, and transmits that control message to the distributor 151b (steps S29b, S30b).

Upon receiving it, the distributor 151b transmits that control message to the MS 2b via the wireless network (step S31b).

Next, in the MS 2b, the HO-execution-confirmation receiver 208b receives the above-mentioned control message expressing "HO execution confirmation" via the distributor 251b (step S32b) and requests the HO processor 210b to perform HO process (step S33b), and thereby, HO process to the HO-target BS 4b is executed.

Incidentally, the line speed, which was controlled to be lowered by the aforementioned procedure before executing the HO, is reassigned to the MS 2b by the HO-target BS 4b independently of the state before the HO execution after completion of the HO. Concerning the reassignment method and the line speed, it is possible that, for example, the HO-target BS 4b determines the line speed to be reassigned to the MS 2b in accordance with the number of the currently-processed MSs and notifies the MS 2b of the determined line speed using a control message (TYPE#01) when the MS 2b communicates with the HO-target BS 4b.

As described above, according to the second embodiment of the present invention, when an HO execution is decided by the MS 2b and the requirement for it is sent to the BS 3b, the BS 3b calculates an appropriate line speed (calculates the range of lowering) so that the RTO value is larger than the HO processing time then, on the basis of the history information about the communication speed, and performs control to lower the line speed of the communication with the MS 2b appropriately, before executing the HO. This can create a simulated congestion of the line and increase the RTO value to the degree that the RTO value is longer than the time that is necessary for completion of the HO process.

Therefore, in addition to the operation and effect that are the same as those of the first embodiment, it is possible to prevent the timer (retransmission timer) from exceeding the RTO value without enlarging the RTO value unnecessarily, because the RTO value is controlled to be the smallest of those larger than the time required for completion of the HO by calculating the range of lowering.

[B1] Description of the Variation of the Second Embodiment

In the above-mentioned second embodiment, explanation was given on the case where the necessities of HO processes are checked and decided by the MS 2b, in other words, the MS 2b takes the initiative to execute HO processes. However, the BS 3b may take the initiative to execute HO processes. Such an embodiment will be described in the explanation of the present variation example with reference to FIG. 16 to FIG. 18.

Figure 16:
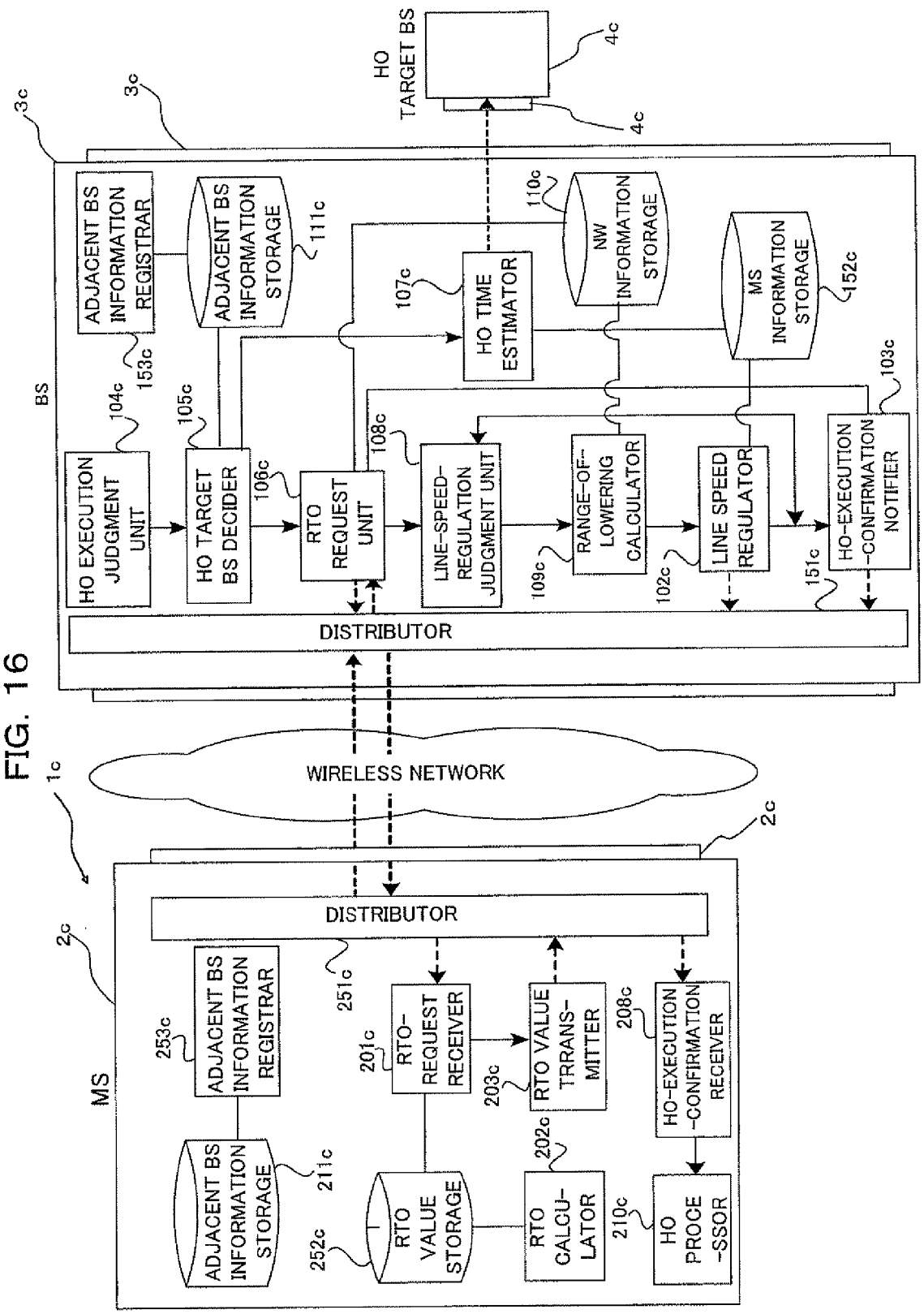
FIG. 16 is a block diagram illustrating the construction of the substantial part of the wireless communication system according to the variation of the second embodiment.
Figure 17:
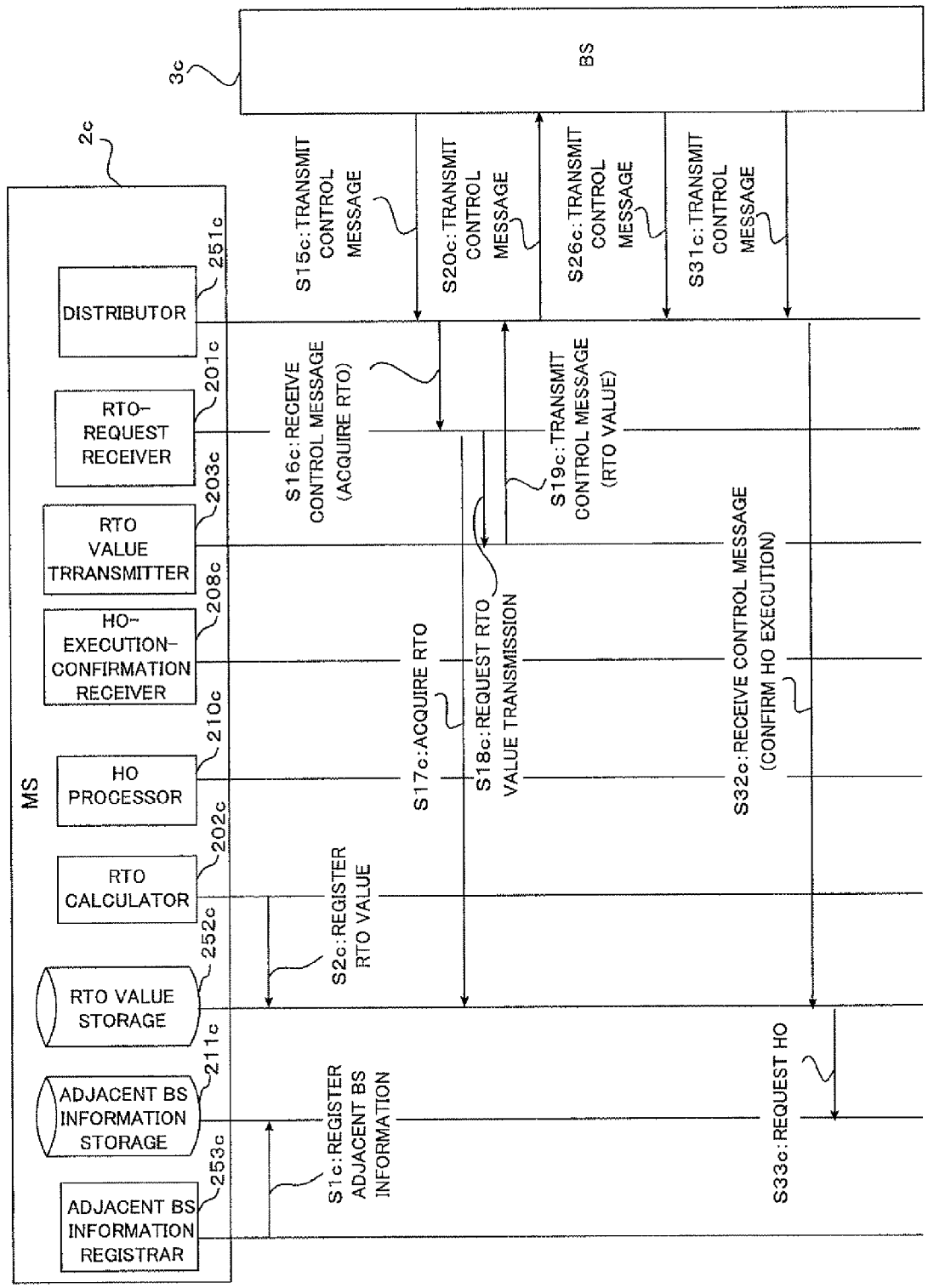
FIG. 17 is a sequence diagram illustrating an operation (handover process) of the wireless communication system depicted in FIG. 16.
Figure 18:
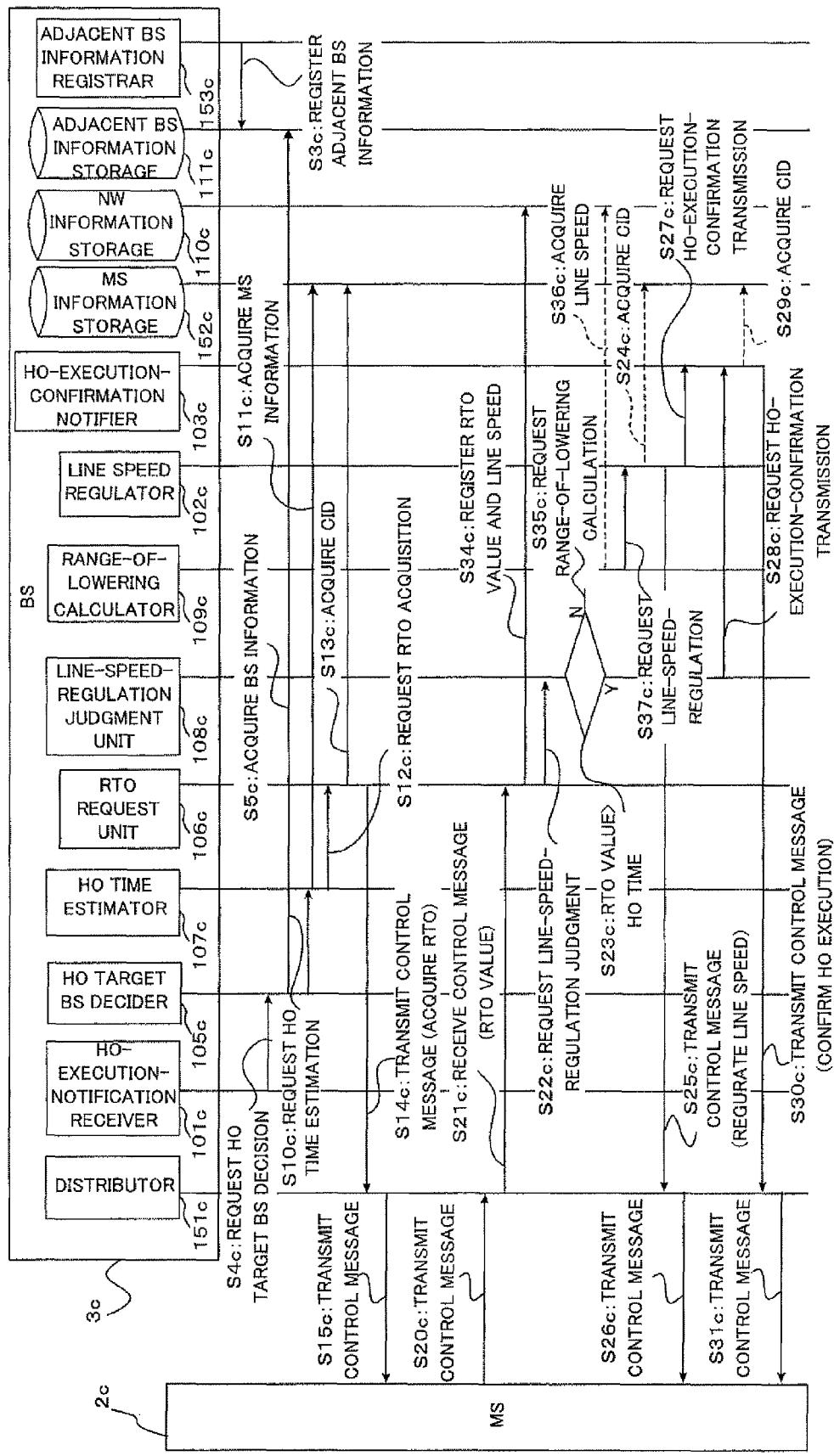
FIG. 18 is a sequence diagram illustrating an operation (handover process) of the wireless communication system depicted in FIG. 16.

FIG. 16 is a block diagram illustrating the construction of the substantial part of the wireless communication system according to the variation of the above-mentioned second embodiment. FIG. 17 is a sequence diagram illustrating an operation (handover process) of the wireless communication system (especially, the MS 2c) illustrated in FIG. 16. FIG. 18 is a sequence diagram illustrating an operation (handover process) of the wireless communication system (especially, the BS 3c) illustrated in FIG. 16.

Namely, in the wireless communication system 1c illustrated in FIG. 16, at least one MS 2c and a plurality of BSs 3c (including the HO-target BS 4c) are connected to each other via a wireless network, in the same way as the wireless communication system 1b of the second embodiment. However, it differs from the wireless communication system 1b of the first embodiment in that the BS 3c decides whether HO processes will be executed or not.

(Description of MS 2c)

Therefore, the MS 2c of the present example comprises an adjacent BS information storage 211c, an adjacent BS information registrar 253c, an RTO-request receiver 201c, an RTO calculator 202c, an RTO value storage 252c, an RTO value transmitter 203c, an HO-execution-confirmation receiver 208c, an HO processor 210c, and a distributor 251c, which are of the same or similar functions as or to each corresponding units 211b, 253b, 201b, 202b, 252b, 203b, 208b, 210b and 251b described earlier for FIG. 12 to FIG. 14, and it may not need the functions of the HO execution judgment unit 204b and the HO-target BS decider 206b, which were illustrated in FIG. 12.

(Description of BS 3c)

On the other hand, the BS 3c of the present example comprises, an RTO request unit 106c, an HO time estimator 107c, a line-speed-regulation judgment unit 108c, a range-of-lowering calculator 109c, an NW information storage 110c, an adjacent BS information registrar 153c, an adjacent BS information storage 111c, an MS information storage 152c, a line speed regulator 102c, an HO-execution-confirmation notifier 103c, and a distributor 151c, which are of the same or similar functions as or to each corresponding units described earlier for FIG. 12, and also comprises an HO execution judgment unit 104c and an HO-target BS decider 105c, in place of the above-mentioned HO-execution-notification receiver 101b described earlier for FIG. 12.

The HO execution judgment unit 104c of the BS 3c collects information about the execution condition of HO processes and judges whether the HO processes will be executed or not. When the HO is executed, the HO execution judgment unit 104c notifies the HO-target BS decider 105c of the HO execution and requests the HO-target BS decider 105c to decide the HO-target BS 4c. Namely, the HO execution judgment unit 104c performs one of the functions of the handover decision means which autonomously decides execution of HO of the communication with the MS 2c to another BS 3c (HO-target BS 4c).

The HO-target BS decider 105c decides the HO-target BS 4c on the basis of the adjacent BS information stored in the adjacent BS information storage 111c by selecting from the adjacent BSs 3c that are already registered, with the reception of the request for decision of the HO-target BS 4c from the HO execution judgment unit 104c as a trigger. Concerning the criterion of deciding (selecting) the BS, the BS 3c whose radio field strength is higher than those of the other BSs 3c can be selected (decided) as the HO-target BS 4c, for example, also in the present variation.

(Description of Entire Operation of Wireless Communication System 1c)

In the following, an example of the entire operation of the wireless communication system 1c of which construction is such as described above is illustrated in FIG. 17 and FIG. 18.

First, the MS 2c acquires the CID (for example, CID#01) of the connection to the serving BS 3c in advance. The CID (CID#01) is controlled by the distributor 251c.

In addition, in the MS 2c, the adjacent BS information registrar 253c acquires adjacent BS information about the BSs 3c (including the HO-target BS 4c) that are geographically neighboring on the serving BS 3c, and registers it in the adjacent BS information storage 211c (step S1c), as illustrated in FIG. 17. Moreover, in the MS 2c, the RTO calculator 202c measures the RTTs of the TCP data that are transmitted/received to/from the communication parties (namely, other MSs and Bss 3c) regularly or irregularly and calculates the RTO values from those RTTs so as to store them in the RTO value storage 252c (step S2c).

On the other hand, the BS 3c acquires information (MS information) about the MS 2c, such as the identifier of the MS 2c (for example, MS#01) and capability types supported by the MS 2c (typically including security function, packet retransmission function, MIMO function, etc.), and registers it in the MS information storage 152c. That MS information can be acquired by, for example, transmission of necessary information also from the MS 2c at the phase when the MS 2c starts to communicate with the BS 3c.

Next, in the BS 3c, the adjacent BS information registrar 153c acquires the adjacent BS information about the geographically neighboring BSs 3c (including the HO-target BS 4c) in advance, and registers it in the adjacent BS information storage 111c (step S3c). That adjacent BS information can be acquired by, for example, exchanging information with the neighboring BSs 3c (including the HO-target BS 4c) regularly or irregularly with the above-mentioned CIDs to be used for exchanging BS information.

After the above-mentioned preliminary processes such as registration of information in the MS 2c and the BS 3c, the BS 3c checks whether an HO should be executed or not by measuring the radio field strength of the MS 2c regularly or irregularly by the HO execution judgment unit 104c. When the radio field strength is lower than the value that was preset by the administrator with a command, the HO execution judgment unit 104c judges that an HO execution is necessary and requests the HO-target BS decider 106c[sic] to decide the HO-target BS 4c (step S4c).

The HO-target BS decider 106c[sic] refers to the adjacent BS information storage 111c, with the above-mentioned request from the HO execution judgment unit 104c as a trigger, and determines the HO-target BS 4c on the basis of the adjacent BS information (step S5c). For example, the BS 3c of which radio field strength is the highest of the neighboring BSs 3c is determined to be the HO-target BS 4c. Then, the HO-target BS decider 106c[sic] sends a request for estimation of the HO processing time to the HO time estimator 107c together with the BS identifier (BS#02) of the HO-target BS 4c (step S10c). In addition, the HO-target BS decider 106c[sic] notifies the HO time estimator 107c of the MS identifier (MS#01) corresponding to the MS 2c of which communication is going to be handed over.

The HO time estimator 107c acquires the MS information, from the MS information storage 152c, about the corresponding MS 2c on the basis of the above-mentioned MS identifier (MS#01) (step 11c), and transmits information about the functions supported by the MS 2c to the BS 3c (HO-target BS 4c) that possesses the above-mentioned BS identifier (BS#02). In addition, the HO time estimator 107c estimates time (Ho processing time) required for negotiation between the MS 2c and the BS 3c at the time of HO process on the basis of the information about the negotiation which is stored in the adjacent BS information storage 111c, and transmits the estimated HO processing time to the line speed regulator 108c.

The RTO request unit 106c creates a control message expressing "RTO acquisition" when the RTO request unit 106c receives the above-mentioned RTO-value acquisition request from the HO time estimator 107c (step S12c). For example, the RTO request unit 106c searches the MS information storage 152c using the above-mentioned MS identifier (MS#01) as a search key so as to acquire the CID (CID#01) of the corresponding MS 2c (step S13c), and specifies that CID at the header portion of the control message, as well as specifies the message type (TYPE#03) expressing "RTO acquisition" at the header portion. Then the RTO request unit 106c transmits the control message to the distributor 151c (step S14c).

Upon receiving it, the distributor 151c transmits that control message to the MS 2c via the wireless network (step S15c).

In the MS 2c, the RTO-requirement receiver 201c receives the above-mentioned control message expressing "RTO acquisition" from the BS 3c via the distributor 251c (step S16c), acquires the present RTO value from the RTO value storage 252c (step S17c), and requests the RTO value transmitter 203c to transmit the RTO value while notifying it of the RTO value (step S18c).

The RTO value transmitter 203c creates a control message by specifying the RTO value sent from the RTO-requirement receiver 201c at the data portion and specifying a message type (TYPE#04) expressing "RTO transmission" at the header portion, and transmits that control message to the distributor 251c (step S19c).

Upon receiving it, the distributor 251c adds the CID (CID#01) at the header portion of that control message and transmits that control message to the BS 3c via the wireless network (step S20c).

Next, in the BS 3c, the RTO request unit 106c receives the above-mentioned control message expressing "RTO transmission" (step S21c), acquires the RTO value specified at the data portion of the message, registers (stores) the acquired RTO value in the NW information storage 110c by associating it with the speed (channel capacity) of the communication with the MS 2c at the time of acquisition of it (step S34c), and transmits the acquired RTO value to the line-speed-regulation judgment unit 108c (step S22c).

The line-speed-regulation judgment unit 108c compares the RTO value acquired from the RTO request unit 106c with the HO processing time estimated by the HO time estimator 107c (step S23c). When the RTO value is larger than the HO processing time (see Y route of step S23c), the line-speed-regulation judgment unit 108c judges that the line speed regulation is not necessary and requests the HO-execution-confirmation notifier 103c to transmit an HO-execution-confirmation notification by notifying it of the above-mentioned MS identifier (MS#01) (step S28c).

On the other hand, when the RTO value is equal to or smaller than the HO processing time (see N route of step S23c), the line-speed-regulation judgment unit 108c judges that the line speed regulation (lowering control) is necessary, because the timer will exceed the RTO value during the HO process without it, and requests the range-of-lowering calculator 109c to calculate the regulation value (range of lowering) of the line speed by notifying it of the above-mentioned MS identifier (MS#01) (step S35c).

Upon receiving the above-mentioned request for calculation, the range-of-lowering calculator 109c acquires (or calculates) the symbol number and the channel number that correspond to the smallest RTO value of those larger than the HO processing time estimated by the HO time estimator 107c from the NW information storage 110c (step S36c). Then, the range-of-lowering calculator 109c requests the line speed regulator 102c to regulate (perform control to lower) the line speed by notifying it of the above-mentioned MS identifier (MS#01) and the above-mentioned symbol number and channel number (step S37c).

Upon the reception of the above-mentioned request for line speed regulation, the line speed regulator 102c creates a control message in which, as described earlier for FIG. 5, the symbol number and channel number (the symbol number and channel number sent from the range-of-lowering calculator 109c, in the present example) are specified at the data portion and a message type (TYPE#01) expressing "line speed regulation" and the CID (CID#01) of the corresponding MS 2c, which is acquired from the MS information storage 152c using the above-mentioned MS identifier (MS#01) as the search key, are specified at the header portion, and transmits that control message to the distributor 151c (steps S24c, S25c).

Upon receiving it, the distributor 151c transmits that control message to the MS 2c via the wireless network (step S26c).

Subsequently, the line speed regulator 102c requests the HO-execution-confirmation notifier 103c to transmit an HO-execution-confirmation notification by notifying it of the above-mentioned MS identifier (MS#01) (step S27c).

Upon the reception of the above-mentioned request for transmission of the HO-execution-confirmation notification from the line-speed-regulation judgment unit 108c or the line speed regulator 102c, the HO-execution-confirmation notifier 103c creates a control message in which, as described earlier for FIG. 5, the information expressing "HO execution enabling" is specified at the data portion and a message type (TYPE#02) expressing "HO execution confirmation" and the CID (CID#01) of the corresponding MS 2c, which is acquired from the MS information storage 152c, are specified at the header portion, and transmits that control message to the distributor 151c (steps S29c, S30c).

Upon receiving it, the distributor 151c transmits that control message to the MS 2c via the wireless network (step S31c).

Next, in the MS 2c, the HO-execution-confirmation receiver 208c receives the above-mentioned control message expressing "HO execution confirmation" via the distributor 251c (step S32c) and requests the HO processor 210c to perform HO process (step S33c), and thereby, HO process to the HO-target BS 4c is executed.

Incidentally, the line speed, which was controlled to be lowered by the aforementioned procedure before executing the HO, is reassigned to the MS 2c by the HO-target BS 4c independently of the state before the HO execution after completion of the HO. Concerning the reassignment method and the line speed, it is possible that, for example, the HO-target BS 4c determines the line speed to be reassigned to the MS 2c in accordance with the number of the currently-processed MSs and notifies the MS 2c of the determined line speed using a control message (TYPE#01) when the MS 2c communicates with the HO-target BS 4c.

In this way, the wireless communication system 1c of the present variation can also increase the RTO value so as to prevent the timer (retransmission timer) from exceeding the RTO value by performing control to lower the line speed of the communication with the MS 2c before executing the HO, in the same way as the wireless communication system 1b of the second embodiment. Therefore, it is possible to inhibit the throughput reduction caused by a slow-start algorithm originating from the above-mentioned time-out without inducing throughput reduction in normal times. In addition, it is possible to prevent the timer (retransmission timer) from exceeding the RTO value without enlarging the RTO value unnecessarily, because the RTO value is controlled to be the smallest of those larger than the time required for completion of the HO by calculating the range of lowering.

[B] Description of the Third Embodiment

Figure 19:
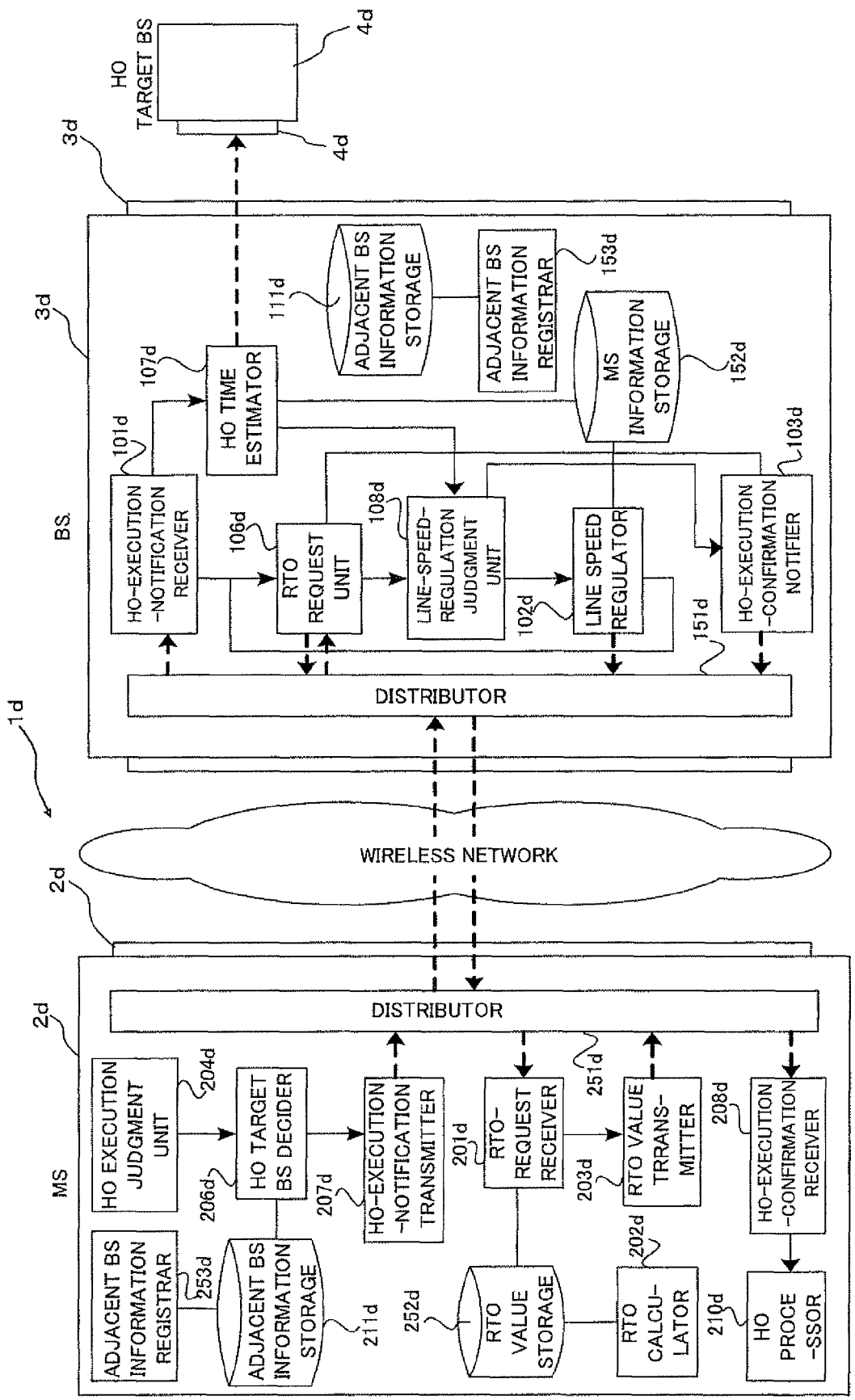
FIG. 19 is a block diagram illustrating the construction of the substantial part of the wireless communication system according to the third embodiment of the present invention.
Figure 20:
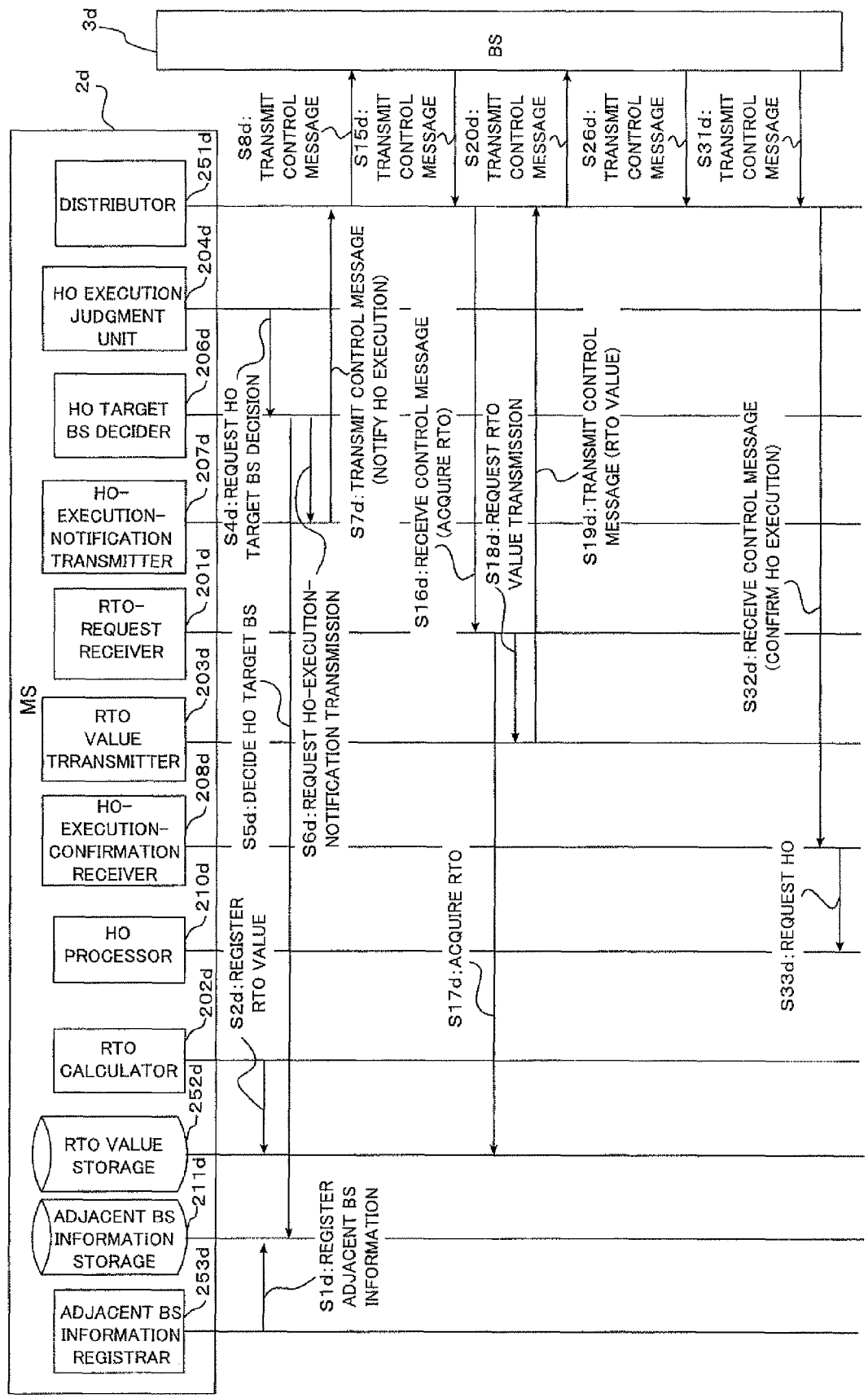
FIG. 20 is a sequence diagram illustrating an operation (handover process) of the wireless communication system depicted in FIG. 19.
Figure 21:
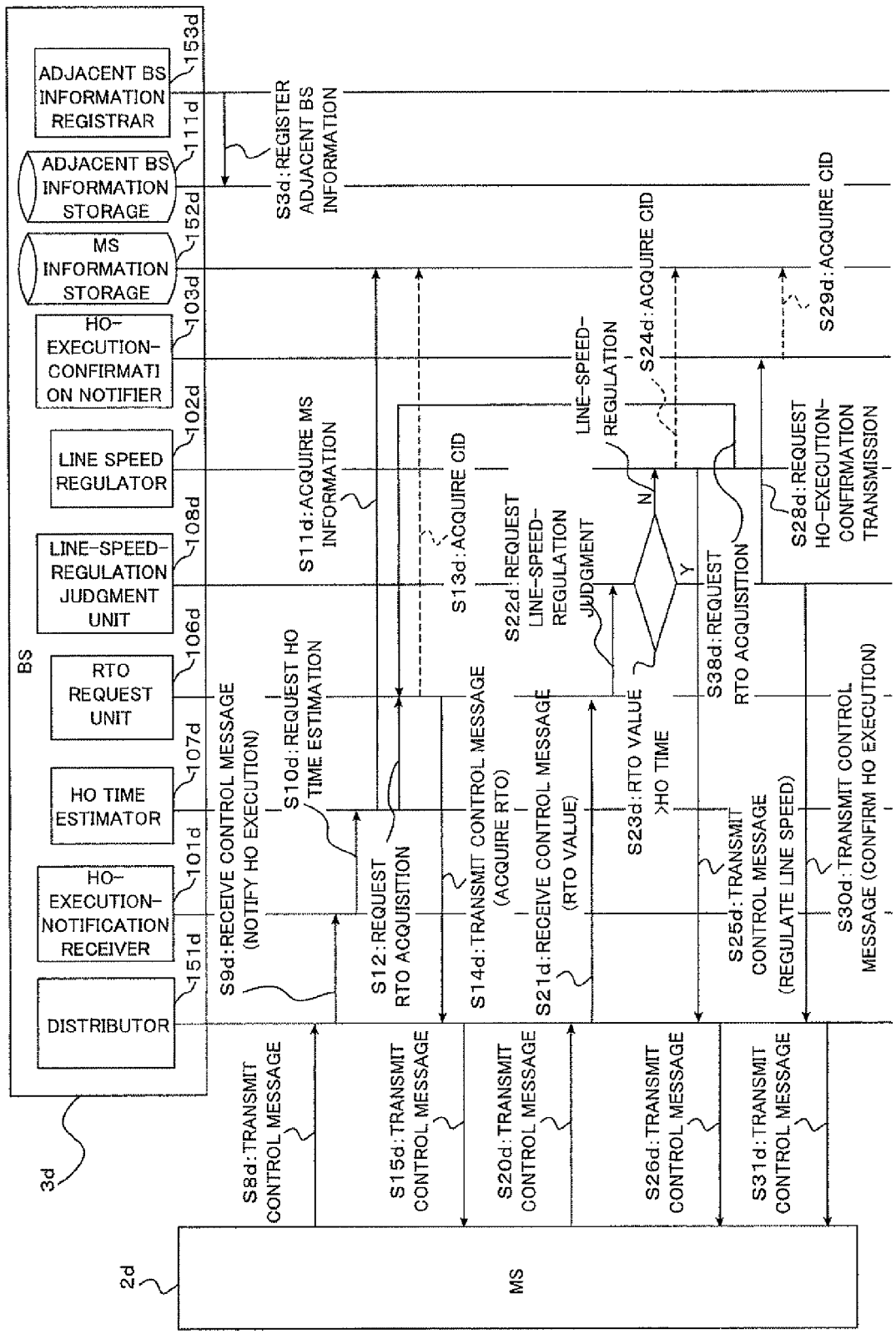
FIG. 21 is a sequence diagram illustrating an operation (handover process) of the wireless communication system depicted in FIG. 19.

FIG. 19 is a block diagram illustrating the construction of the substantial part of the wireless communication system according to the third embodiment of the present invention. FIG. 20 is a sequence diagram illustrating an operation (handover process) of the wireless communication system (especially, MS 2d) illustrated in FIG. 19. FIG. 21 is a sequence diagram illustrating an operation (handover process) of the wireless communication system (especially, BS 3d) illustrated in FIG. 19. All of these figures illustrate an embodiment in which the MS judges whether HO processes are executed or not, in the same way as the first and second embodiments.

Therefore, also in the wireless communication system 1d illustrated in FIG. 19, at least one MS 2d and a plurality of BSs 3d (including the HO-target BS 4d) are connected to each other via a wireless network. However, the present embodiment differs from the construction illustrated in FIG. 1 mainly in that the judgment and the regulation of the line speed are carried out repeatedly.

Therefore, the MS 2d comprises an HO execution judgment unit 204d, an HO-target BS decider 206d, an adjacent BS information storage 211d, an adjacent BS information registrar 253d, an HO-execution-notification transmitter 207d, an RTO-request receiver 201d, an RTO calculator 202d, an RTO value storage 252d, an RTO value transmitter 203d, an HO-execution-confirmation receiver 208d, an HO processor 210d, and a distributor 251d, which are of the same or similar functions as or to each corresponding units 204, 206, 211, 253, 207, 201, 202, 252, 203, 208, 210 and 251 described earlier for FIG. 1. The BS 3d comprises an HO-execution-notification receiver 101d, an HO time estimator 107d, an RTO request unit 106d, a line-speed-regulation judgment unit 108d, a line speed regulator 102d, an MS information storage 152d, an adjacent BS information registrar 153d, an adjacent BS information storage 111d, an HO-execution-confirmation notifier 103d, and a distributor 151d, which are of the same or similar functions as or to each corresponding units 101, 106, 107, 108, 102, 152, 153, 111, 103 and 151 described earlier for FIG. 1.

(Description of MS 2d)

In the MS 2d, the HO execution judgment unit 204d, the HO-target BS decider 206d, the adjacent BS information storage 211d, the adjacent BS information registrar 253d, the HO-execution-notification transmitter 207d, the RTO-request receiver 201d, the RTO calculator 202d, the RTO value storage 252d, the RTO value transmitter 203d, the HO-execution-confirmation receiver 208d, the HO processor 210d, and the distributor 251d are of the same or similar functions as or to each corresponding units described earlier for FIG. 1.

Therefore, the MS 2d according to the second[sic] embodiment can also decide HO execution and request the BS 3d to perform HO upon reception of a signal from the BS 3d, as well as transmit the RTO value which is calculated by the RTO calculator 202d to the BS 3d in accordance with a request from the BS 3d, in the same way as the MS 2. In addition, the MS 2d of the present example can also perform congestion control (communication speed control) to lower the line speed of the communication with the communication party upon time-out of the RTO value.

(Description of BS 3D)

On the other hand, in the BS 3d, the HO-execution-notification receiver 101d, the RTO request unit 106d, the HO time estimator 107d, the line-speed-regulation judgment unit 108d, the adjacent BS information registrar 153d, the adjacent BS information storage 111d, the MS information storage 152d, the line speed regulator 102d, the HO-execution-confirmation notifier 103d, and the distributor 151d are of the same or similar functions as or to each corresponding units described earlier for FIG. 1.

The line-speed-regulation judgment unit 108d of the present example also judges whether an HO can be executed or not on the basis of the information (information about the execution condition) stored in the adjacent BS information storage 111d, and the MS information storage 152d and judges whether an HO can be executed or not also on the basis of the RTO value sent by the RTO request unit 106d and the HO processing time estimated by the HO time estimator 107d. When the HO can be executed, the line-speed-regulation judgment unit 108d decides the HO execution and judges whether the line speed will be regulated or not.

On the other hand, the line speed regulator 102d of the present example regulates the speed of the communication with the MS 2d via the wireless network. The line speed regulator 102d performs control to lower the speed of the communication with the MS 2 via the wireless network at a preset rate (or by a specified range of lowering), with the reception of the speed-lowering-control request from the above-mentioned line-speed-regulation judgment unit 108d as a trigger, and subsequently, requests the RTO request unit 108d[sic] to reacquire the RTO value.

The RTO request unit (timer-value acquisition unit) 106d requests the MS 2d to send the RTO value again and acquires the present RTO value from the MS 2d, when the RTO request unit 106d receives the RTO-value acquisition request from the above-mentioned line speed regulator 102d. Namely, the RTO request unit 106d can request the MS 2d to send an RTO by creating a control message (refer to FIG. 5) expressing an "RTO request" and transmitting the control message to the distributor 151d. Also, the RTO request unit 106d can acquire the RTO value from the MS 2d by receiving a control message (refer to FIG. 5) expressing an "RTO transmission", which is the reply to the above-mentioned transmitted control message, from the MS 2d.

Then, the line-speed-regulation judgment unit 108d judges whether an HO can be executed or not on the basis of the present RTO value sent by the RTO request unit 106d and the HO processing time estimated by the HO time estimator 107d again. When the HO can be executed, the line-speed-regulation judgment unit 108d decides the HO execution and judges whether the line speed will be regulated or not.

Subsequently, the HO-execution-confirmation notifier 103d transmits an HO-execution-confirmation notification (enabling acknowledgement), which expresses an HO-execution enabling, to the MS 2d using a control message (refer to FIG. 5), with the notification (request) sent from the line speed regulator 102d as a trigger. Also in the present example, the HO-execution-confirmation notifier 103d creates a control message in which, as described earlier for FIG. 5, the CID acquired from the MS information storage 152d and the message type are specified at the header portion and the HO-execution enabling (OK) information is specified at the data portion, with the notification sent from the line speed regulator 102d as a trigger, and transmits it to the distributor 151d.

In this way, the BS 3d according to the third embodiment of the present invention can execute an HO process with the RTO value increased in order for the timer not to exceed the RTO value by creating simulated line congestion through repeated controls to lower the speed of the communication with the MS 2d, if it is necessary. This makes it possible to perform the above-mentioned control to lower the communication speed more minutely, and therefore, the RTO value can be controlled to be appropriate without being enlarged unnecessarily.

(Description of Entire Operation of Wireless Communication System 1d)

Next, an example of the entire operation of the wireless communication system 1d having the above-mentioned structure will be described with reference to FIG. 20 and FIG. 21.

First, the MS 2d acquires the CID (for example, CID#01) of the connection to the serving BS 3d in advance. The CID (CID#01) is controlled by the distributor 251d.

In addition, in the MS 2d, the adjacent BS information register 253d acquires information (adjacent BS information) about the BSs 3d (including the HO-target BS 4d) that are geographically neighboring on the serving BS 3d, such as their frequencies used, capability types supported (typically including security function, packet retransmission function, MIMO function, etc.), radio field strengths, and the number of MSs in charge, and registers it in the adjacent BS information storage 211d (step S1d). The MS 2d can acquire that adjacent BS information by, for example, receiving it when it is transmitted (reported) from the BS 3d.

Moreover, in the MS 2d, the RTO calculator 202d measures the RTTs of the TCP data that are transmitted/received to/from the communication parties (namely, other MSs and Bss 3d) regularly or irregularly and calculates the RTO values from those RTTs so as to store them in the RTO value storage 252d (step S2d).

On the other hand, the BS 3d acquires information (MS information) about the MS 2d such as MS 2d identifier (for example, MS#01) and capability types supported by the MS 2d (typically including security function, packet retransmission function, MIMO function, etc.), and registers it in the MS information storage 152d. That MS information can be acquired by, for example, transmission of necessary information also from the MS 2d at the phase when the MS 2d starts to communicate with the BS 3d.

Next, in the BS 3d, the adjacent BS information registrar 153d acquires information (adjacent BS information) about the geographically neighboring BSs 3d (including the HO-target BS 4d) in advance, such as the frequency used and the capability types supported, and registers it in the adjacent BS information storage 111d (step S3d). That adjacent BS information can be acquired by, for example, exchanging information with the neighboring BSs 3d (including the HO-target BS 4d) regularly or irregularly with the above-mentioned CIDs to be used for exchanging BS information.

After the above-mentioned preliminary processes such as registration of information in the MS 2d and the BS 3d, the MS 2d checks whether an HO should be executed or not by measuring the radio field strength of the serving BS 3d regularly or irregularly by the HO execution judgment unit 204d. When the radio field strength is lower than the value that was preset by the administrator with a command, the HO execution judgment unit 204d judges that an HO execution is necessary and requests the HO-target BS decider 206d to decide the HO-target BS 4d (step S4d).

The HO-target BS decider 206d refers to the adjacent BS information storage 211d, with the above-mentioned request from the HO execution judgment unit 204d as a trigger, and determines the HO-target BS 4d on the basis of the adjacent BS information (step S5d). For example, the BS 3d of which radio field strength is the highest of the neighboring BSs 3d is determined to be the HO-target BS 4d. Then, the HO-target BS decider 206d notifies the HO-execution-notification transmitter 207d of the BS identifier (for example, BS#02) of the determined HO-target BS 4d, and also, requests the HO-execution-notification transmitter 207d to transmit an HO execution notification (step S6d).

The HO-execution-notification transmitter 207d creates a control message, upon reception of the above-mentioned request from the HO-target BS decider 206d, in which the message type (TYPE#00) expressing an "HO execution notification" is specified at the header portion and the BS identifier (BS#02) of the HO-target BS 4d and the MS identifier (MS#01) of the MS 2d, of which communication process is going to be handed over, are specified at the data portion and transmits the control message to the distribution unit 251d (step S7d).

The distributor 251*d* specifies the CID (CID#01) at the header portion of that control message and transmits that control message to the BS 3*d* via the wireless network (step S8*d*).

In the BS 3*d*, the HO-execution-notification receiver 101*d* receives that control message (HO execution notification) via the distributor 151*d*, which is transmitted from the MS 2*d* (step S9*d*), acquires the MS identifier (MS#01) and the BS identifier (BS#02) contained in the data portion of that HO execution notification, and then sends a request for estimation of the HO processing time to the HO time estimator 107*d* together with the BS identifier (step S10*d*). In addition, the HO-execution-notification receiver 101*d* acquires the MS identifier (MS#01) from the data portion of that control message and notifies the HO time estimator 107*d* of the MS identifier (MS#01).

The HO time estimator 107*d* acquires the MS information, from the MS information storage 152*d*, about the MS 2*d* that transmitted the HO execution notification on the basis of the above-mentioned MS identifier (MS#01) (step S11*d*), and transmits information about the functions supported by the MS 2*d* to the BS 3*d* (HO-target BS 4*d*) of which identifier is the above-mentioned BS identifier (BS#02). In addition, the HO time estimator 107*d* estimates time (HO processing time) required for negotiation between the MS 2*d* and the BS 3*d* at the time of HO process on the basis of the information about the negotiation which is stored in the adjacent BS information storage 111*d*, and transmits the estimated HO processing time to the line speed regulator 108*d*. Moreover, the HO time estimator 107*d* notifies the RTO request unit 106*d* of an RTO acquisition request in order to acquire the RTO value of the MS 2*d* corresponding to the MS identifier that is acquired from the HO-execution-notification receiver 101*d* (step S12*d*).

The RTO request unit 106*d* creates a control message expressing "RTO acquisition" when the RTO request unit 106*d* receives the above-mentioned RTO-value acquisition request from the HO time estimator 107*d*. For example, the RTO request unit 106*d* searches the MS information storage 152*d* using the above-mentioned MS identifier (MS#01) as a search key so as to acquire the CID (CID#01) of the corresponding MS 2*d* (step S13*d*), and specifies that CID at the header portion of the control message, as well as specifies a message type (TYPE#03) expressing "RTO acquisition" at the header portion. Then the unit 106*d* transmits the control message to the distributor 151*d* (step S14*d*).

Upon receiving it, the distributor 151*d* transmits that control message to the MS 2*d* via the wireless network (step S15*d*).

In the MS 2*d*, the RTO-requirement receiver 201*d* receives the above-mentioned control message expressing "RTO acquisition" from the BS 3*d* via the distributor 251*d* (step S16*d*), acquires the present RTO value from the RTO value storage 252*d* (step S17*d*), and requests the RTO value transmitter 203*d* to transmit the RTO value while notifying it of the RTO value (step S18*d*).

The RTO value transmitter 203*d* creates a control message by specifying the RTO value sent from the RTO-request receiver 201*d* at the data portion and specifying a message type (TYPE#04) expressing "RTO transmission" at the header portion, and transmits that control message to the distributor 251*d* (step S19*d*).

Upon receiving it, the distributor 251*d* adds the CID (CID#01) at the header portion of that control message and transmits that control message to the BS 3*d* via the wireless network (step S20*d*).

Next, in the BS 3*d*, the RTO request unit 106*d* receives the above-mentioned control message expressing "RTO transmission" (step S21*d*), acquires the RTO value specified at the data portion of the message, and transmits the acquired RTO value to the line-speed-regulation judgment unit 108*d* (step S22*d*).

The line-speed-regulation judgment unit 108*d* compares the RTO value acquired from the RTO request unit 106*d* with the HO processing time estimated by the HO time estimator 107*d* (step S23*d*). When the RTO value is larger than the HO processing time (see Y route of step S23*d*), the line-speed-regulation judgment unit 108*d* judges that the line speed regulation is not necessary and requests the HO-execution-confirmation notifier 103*d* to transmit an HO-execution-confirmation notification by notifying it of the above-mentioned MS identifier (MS#01) (step S28*d*).

On the other hand, when the RTO value is equal to or smaller than the HO processing time (see N route of step S23*d*), the line-speed-regulation judgment unit 108*d* judges that the line speed regulation (lowering control) is necessary, because the timer will exceed the RTO value during the HO process without it, and requests the line speed regulator 102*d* to regulate (perform control to lower) the line speed by notifying it of the above-mentioned MS identifier (MS#01).

Upon the reception of the above-mentioned request for line speed regulation, the line speed regulator 102*d* creates a control message in which, as described earlier for FIG. 5, the symbol number and the channel number (in the present example, the symbol number and the channel number lowered at a preset rate (or lowered by a specified range of lowering), for example) are specified at the data portion and a message type (TYPE#01) expressing "line speed regulation" and the CID (CID#01) of the corresponding MS 2*d*, which is acquired from the MS information storage 152*d* using the above-mentioned MS identifier (MS#01) as the search key, are specified at the header portion, and transmits that control message to the distributor 151*d* (steps S24*d*, S25*d*). Upon receiving it, the distributor 151*d* transmits that control message to the MS 2*d* via the wireless network (step S26*d*).

Subsequently, the line speed regulator 102*d* notifies the RTO request unit 106*d* of a request for RTO acquisition again (step S38*d*).

Then, in the MS 2*d* and the BS 3*d*, the above-mentioned steps S13*d* to S26*d* and step S38*d* are carried out repeatedly until the line-speed-regulation judgment unit 108*d* of the BS 3*d* judges that the RTO value is larger than the HO processing time (see Y route of step S23*d*) and the regulation of the line speed is not necessary any more. Upon such a judgment, the line-speed-regulation judgment unit 108*d* requests the HO-execution-confirmation notifier 103*d* to transmit the HO-execution-confirmation notification while notifying it of the above-mentioned MS identifier (MS#01) (step S28*d*).

Upon the reception of the above-mentioned request for transmission of the HO-execution-confirmation notification from the line-speed-regulation judgment unit 108*d* or the line speed regulator 102*d*, the HO-execution-confirmation notifier 103*d* creates a control message in which, as described earlier for FIG. 5, the information expressing "HO execution enabling" is specified at the data portion and a message type (TYPE#02) expressing "HO execution confirmation" and the CID (CID#01) of the corresponding MS 2*d*, which is acquired from the MS information storage 152*d*, are specified at the header portion, and transmits that control message to the distributor 151*d* (steps S29*d*, S30*d*).

Upon receiving it, the distributor 151*d* transmits that control message to the MS 2*d* via the wireless network (step S31*d*).

Next, in the MS 2*d*, the HO-execution-confirmation receiver 208*d* receives the above-mentioned control message expressing "HO execution confirmation" via the distributor 251*d* (step S32*d*) and requests the HO processor 210*d* to perform HO process (step S33*d*), and thereby, HO process to the HO-target BS 4*d* is executed.

Incidentally, the line speed, which was controlled to be lowered by the aforementioned procedure before executing the HO, is reassigned to the MS 2*d* by the HO-target BS 4*d* independently of the state before the HO execution after completion of the HO. Concerning the reassignment method and the line speed, it is possible that, for example, the HO-target BS 4*d* determines the line speed to be reassigned to the MS 2*d* in accordance with the number of the currently-processed MSs and notifies the MS 2*d* of the determined line speed using a control message (TYPE#01) when the MS 2*d* communicates with the HO-target BS 4*d*.

As described above, according to the third embodiment of the present invention, when an HO execution is decided by the MS 2*d* and the requirement for it is sent to the BS 3*d*, the BS 3*d* performs control to lower the line speed of the communication with the MS 2*d* repeatedly before executing the HO, which creates a simulated congestion of the line. This can increase the RTO value to the degree that the RTO value is longer than the time that is necessary for completion of the HO process.

Therefore, in addition to the operation and effect of the aforementioned embodiments, it is possible in the present embodiment that the RTO value is increased efficiently and appropriately in accordance with the present communication situation, because the communication speed at which the BS 3*d* communicates with the MS 2*d* via the wireless network is controlled to be lowered repeatedly until the RTO value becomes longer than the time required for completion of the HO process at a preset rate (or by a specified range of lowering).

[C1] Description of the Variation of the Third Embodiment

In the above-mentioned third embodiment, explanation was given on the case where the necessities of HO processes are checked and decided by the MS 2*d*, in other words, the MS 2*d* takes the initiative to execute HO processes. However, the BS 3*d* may take the initiative to execute HO processes. Such an embodiment will be described in the explanation of the present variation example with reference to FIG. 22 to FIG. 24.

Figure 22:
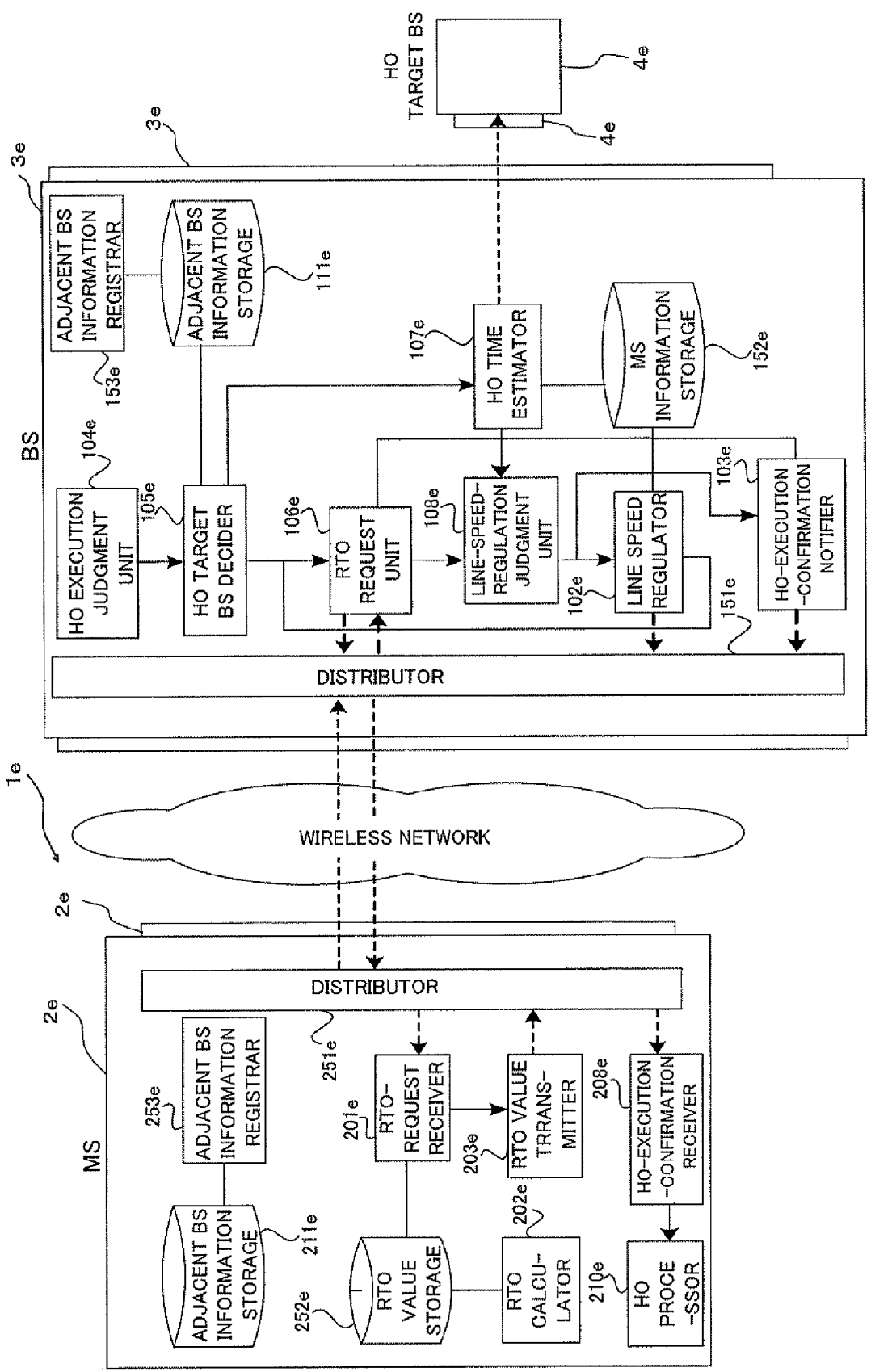
FIG. 22 is a block diagram illustrating the construction of the substantial part of the wireless communication system according to the variation of the third embodiment.
Figure 23:
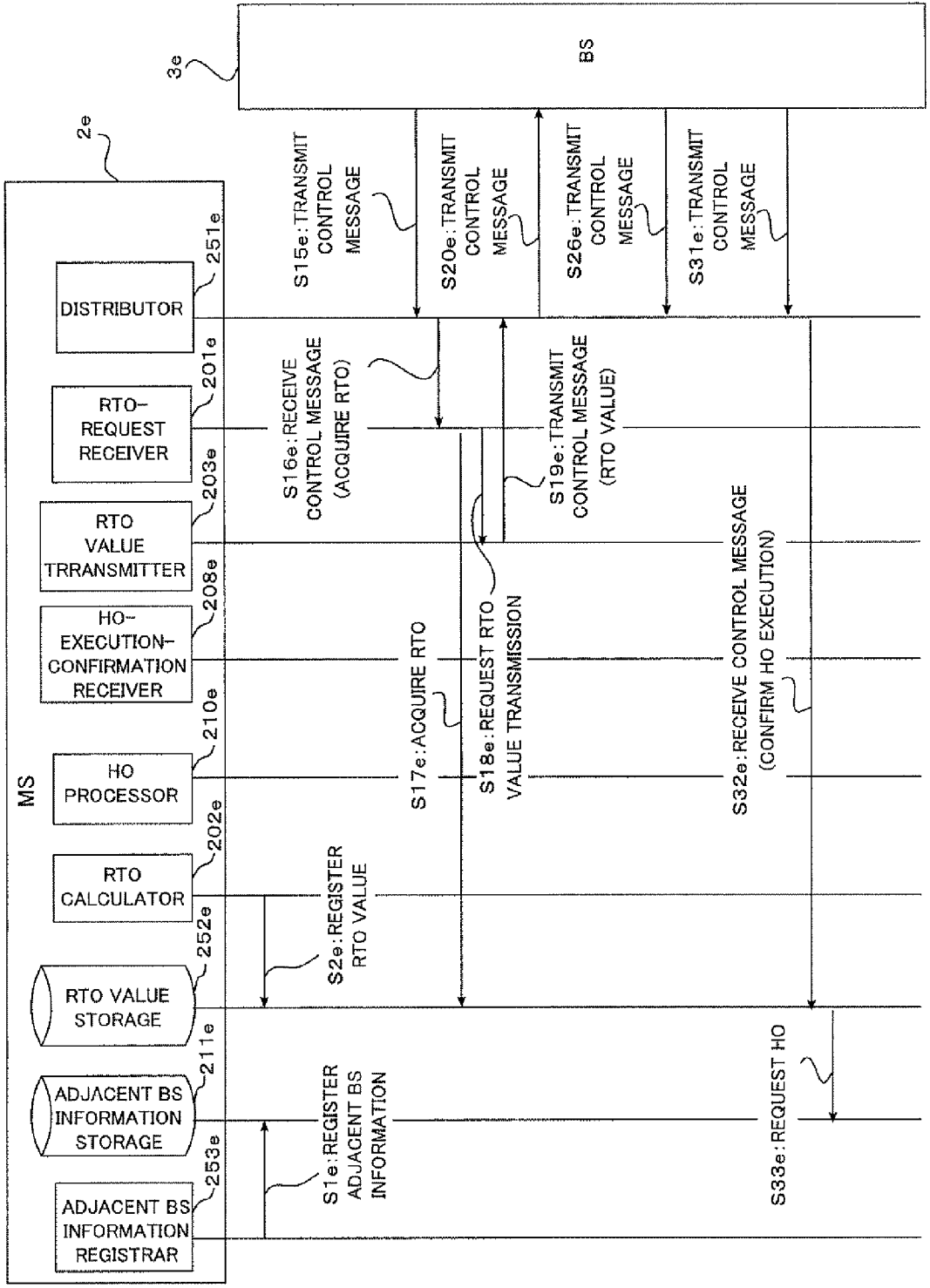
FIG. 23 is a sequence diagram illustrating an operation (handover process) of the wireless communication system depicted in FIG. 22.
Figure 24:
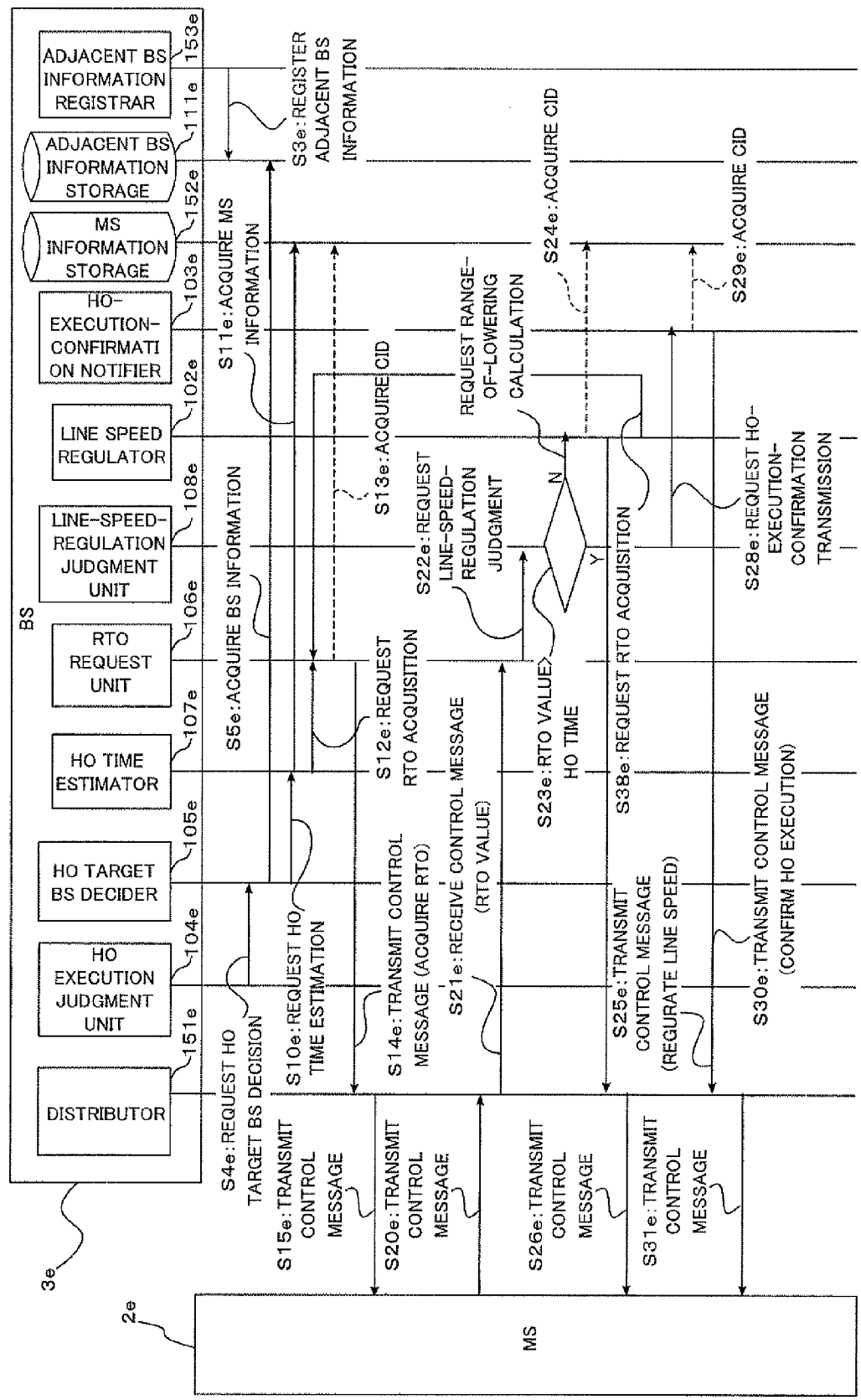
FIG. 24 is a sequence diagram illustrating an operation (handover process) of the wireless communication system depicted in FIG. 22.

FIG. 22 is a block diagram illustrating the construction of the substantial part of the wireless communication system according to the variation of the above-mentioned third embodiment. FIG. 23 is a sequence diagram illustrating an operation (handover process) of the wireless communication system (especially, the MS 2*e*) illustrated in FIG. 22. FIG. 24 is a sequence diagram illustrating an operation (handover process) of the wireless communication system (especially, the BS 3*e*) illustrated in FIG. 22.

Namely, in the wireless communication system 1*e* illustrated in FIG. 22, at least one MS 2*e* and a plurality of BSs 3*e* (including the HO-target BS 4*e*) are connected to each other via a wireless network, in the same way as the wireless communication system 1*d* of the third embodiment. However, it differs from the wireless communication system 1*d* of the third embodiment in that the BS 3*e* decides whether HO processes will be executed or not.

(Description of MS 2E)

Therefore, the MS 2*e* of the present example comprises an adjacent BS information storage 211*e*, an adjacent BS information registrar 253*e*, an RTO-request receiver 201*e*, an RTO calculator 202*e*, an RTO value storage 252*e*, an RTO value transmitter 203*e*, an HO-execution-confirmation receiver 208*e*, an HO processor 210*e*, and a distributor 251*e*, which are of the same or similar functions as or to each corresponding units 211*d*, 253*d*, 201*d*, 202*d*, 252*d*, 203*d*, 208*d*, 210*d* and 251*d* described earlier for FIG. 19 to FIG. 21, and it may not need the functions of the HO execution judgment unit 204*d* and the HO-target BS decider 206*d*, which were illustrated in FIG. 19.

(Description of BS 3E)

On the other hand, the BS 3*e* of the present example comprises an RTO request unit 106*e*, an HO time estimator 107*e*, a line-speed-regulation judgment unit 108*e*, an adjacent BS information registrar 153*e*, an adjacent BS information storage 111*e*, an MS information storage 152*e*, a line speed regulator 102*e*, an HO-execution-confirmation notifier 103*e*, and a distributor 151*e*, which are of the same or similar functions as or to each corresponding units described earlier for FIG. 19, and also comprises an HO execution judgment unit 104*e* and an HO-target BS decider 105*e*, in place of the above-mentioned HO-execution-notification receiver 101*d* described earlier for FIG. 19.

The HO execution judgment unit 104*e* of the BS 3*e* collects information about the execution condition of HO processes and judges whether the HO processes will be executed or not. When the HO is executed, the HO execution judgment unit 104*e* notifies the HO-target BS decider 105*e* of the HO execution and requests the HO-target BS decider 105*e* to decide the HO-target BS 4*e*. Namely, the HO execution judgment unit 104*e* performs one of the functions of the handover decision means which autonomously decides execution of HO of the communication with the MS 2*e* to another BS 3*e* (HO-target BS 4*e*).

The HO-target BS decider 105*e* decides the HO-target BS 4*e* on the basis of the adjacent BS information stored in the adjacent BS information storage 111*e* by selecting from the adjacent BSs 3*e* that are already registered, with the reception of the request for decision of the HO-target BS 4*e* from the HO execution judgment unit 104*e* as a trigger. Concerning the criterion of deciding (selecting) the BS, the BS 3*e* whose radio field strength is higher than those of the other BSs 3*e* can be selected (decided) as the HO-target BS 4*e*, for example, also in the present variation.

(Description of Entire Operation of Wireless Communication System 1*e*)

In the following, an example of the entire operation of the wireless communication system 1*e* of which construction is such as described above is illustrated in FIG. 23 and FIG. 24.

First, the MS 2*e* acquires the CID (for example, CID#01) of the connection to the serving BS 3*e* in advance. The CID (CID#01) is controlled by the distributor 251*e*.

In addition, in the MS 2*e*, the adjacent BS information registrar 253*e* acquires adjacent BS information about the BSs 3*e* (including the HO-target BS 4*e*) that are geographically neighboring on the serving BS 3*e*, and registers it in the adjacent BS information storage 211*e* (step S1*e*), as illustrated in FIG. 23. Moreover, in the MS 2*e*, the RTO calculator 202*e* measures the RTTs of the TCP data that are transmitted/received to/from the communication parties (namely, other MSs and Bss 3*e*) regularly or irregularly and calculates the RTO values from those RTTs so as to store them in the RTO value storage 252*e* (step S2*e*).

On the other hand, the BS 3e acquires information (MS information) about the MS 2e, such as the identifier of the MS 2e (for example, MS#01) and capability types supported by the MS 2e (typically including security function, packet retransmission function, MIMO function, etc.), and registers it in the MS information storage 152e. That MS information can be acquired by, for example, transmission of necessary information also from the MS 2e at the phase when the MS 2e starts to communicate with the BS 3e.

Next, in the BS 3e, the adjacent BS information registrar 153e acquires the adjacent BS information about the geographically neighboring BSs 3e (including the HO-target BS 4e) in advance, and registers it in the adjacent BS information storage 111e (step S3e). That adjacent BS information can be acquired by, for example, exchanging information with the neighboring BSs 3e (including the HO-target BS 4e) regularly or irregularly with the above-mentioned CIDs to be used for exchanging BS information.

After the above-mentioned preliminary processes such as registration of information in the MS 2e and the BS 3e, the BS 3e checks whether an HO should be executed or not by measuring the radio field strength of the MS 2e regularly or irregularly by the HO execution judgment unit 104e. When the radio field strength is lower than the value that was preset by the administrator with a command, the HO execution judgment unit 104e judges that an HO execution is necessary and requests the HO-target BS decider 106e[sic] to decide the HO-target BS 4e (step S4e).

The HO-target BS decider 106e[sic] refers to the adjacent BS information storage 111e, with the above-mentioned request from the HO execution judgment unit 104e as a trigger, and determines the HO-target BS 4e on the basis of the adjacent BS information (step S5e). For example, the BS 3e of which radio field strength is the highest of the neighboring BSs 3e is determined to be the HO-target BS 4e. Then, the HO-target BS decider 106e[sic] sends a request for estimation of the HO processing time to the HO time estimator 107e together with the BS identifier (BS#02) of the HO-target BS 4e (step S10e). In addition, the HO-target BS decider 106e [sic] notifies the HO time estimator 107e of the MS identifier (MS#01) corresponding to the MS 2e of which communication is going to be handed over.

The HO time estimator 107e acquires the MS information, from the MS information storage 152e, about the corresponding MS 2e on the basis of the above-mentioned MS identifier (MS#01) (step 11e), and transmits information about the functions supported by the MS 2e to the BS 3e (HO-target BS 4e) that possesses the above-mentioned BS identifier (BS#02). In addition, the HO time estimator 107e estimates time (HO processing time) required for negotiation between the MS 2e and the BS 3e at the time of HO process on the basis of the information about the negotiation which is stored in the adjacent BS information storage 111e, and transmits the estimated HO processing time to the line speed regulator 108e.

The RTO request unit 106a creates a control message expressing "RTO acquisition" when the RTO request unit 106a receives the above-mentioned RTO-value acquisition request from the HO time estimator 107a (step S12a). For example, the RTO request unit 106a searches the MS information storage 152e using the above-mentioned MS identifier (MS#01) as a search key so as to acquire the CID (CID#01) of the corresponding MS 2a (step S13a), and specifies that CID at the header portion of the control message, as well as specifies the message type (TYPE#03) expressing "RTO acquisition" at the header portion. Then the RTO request unit 106a transmits the control message to the distributor 151a (step S14a).

Upon receiving it, the distributor 151e transmits that control message to the MS 2e via the wireless network (step S15e).

In the MS 2e, the RTO-requirement receiver 201e receives the above-mentioned control message expressing "RTO acquisition" from the BS 3e via the distributor 251e (step S16e), acquires the present RTO value from the RTO value storage 252e (step S17e), and requests the RTO value transmitter 203e to transmit the RTO value while notifying it of the RTO value (step S18e).

The RTO value transmitter 203e creates a control message by specifying the RTO value sent from the RTO-request receiver 201e at the data portion and specifying a message type (TYPE#04) expressing "RTO transmission" at the header portion, and transmits that control message to the distributor 251e (step S19e).

Upon receiving it, the distributor 251e adds the CID (CID#01) at the header portion of that control message and transmits that control message to the BS 3e via the wireless network (step S20e).

Next, in the BS 3e, the RTO request unit 106e receives the above-mentioned control message expressing "RTO transmission" (step S21e), acquires the RTO value specified at the data portion of the message, and transmits the acquired RTO value to the line-speed-regulation judgment unit 108e (step S22e).

The line-speed-regulation judgment unit 108e compares the RTO value acquired from the RTO request unit 106e with the HO processing time estimated by the HO time estimator 107e (step S23e). When the RTO value is larger than the HO processing time (refer to Y route of step S23e), the line-speed-regulation judgment unit 108e judges that the line speed regulation is not necessary and requests the HO-execution-confirmation notifier 103e to transmit an HO-execution-confirmation notification by notifying it of the above-mentioned MS identifier (MS#01) (step S28e).

On the other hand, when the RTO value is equal to or smaller than the HO processing time (see N route of step S23e), the line-speed-regulation judgment unit 108e judges that the line speed regulation (lowering control) is necessary, because the timer will exceed the RTO value during the HO process without it, and requests the line speed regulator 102e to regulate (perform control to lower) the line speed by notifying it of the above-mentioned MS identifier (MS#01).

Upon the reception of the above-mentioned request for line speed regulation, the line speed regulator 102e creates a control message in which, as described earlier for FIG. 5, the symbol number and the channel number (in the present example, the symbol number and the channel number lowered at a preset rate (or lowered by a specified range of lowering), for example) are specified at the data portion and a message type (TYPE#01) expressing "line speed regulation" and the CID (CID#01) of the corresponding MS 2e, which is acquired from the MS information storage 152e using the above-mentioned MS identifier (MS#01) as the search key, are specified at the header portion, and transmits that control message to the distributor 151e (steps S24e, S25e).

Upon receiving it, the distributor 151e transmits that control message to the MS 2e via the wireless network (step S26e).

Subsequently, the line speed regulator 102e notifies the RTO request unit 106e of a request for RTO acquisition again (step S38e).

Then, in the MS 2e and the BS 3e, the above-mentioned steps S13e to S26e and step S38e are carried out repeatedly until the line-speed-regulation judgment unit 108e of the BS 3e judges that the RTO value is larger than the HO processing time (see Y route of step S23e) and the regulation of the line speed is not necessary any more. Upon such a judgment, the line-speed-regulation judgment unit 108e requests the HO-execution-confirmation notifier 103e to transmit the HO-execution-confirmation notification while notifying it of the above-mentioned MS identifier (MS#01) (step S28e).

Upon the reception of the above-mentioned request for transmission of the HO-execution-confirmation notification from the line-speed-regulation judgment unit 108e or the line speed regulation unit 102e, the HO-execution-confirmation notifier 103e creates a control message in which, as described earlier for FIG. 5, the information expressing "HO execution enabling" is specified at the data portion and a message type (TYPE#02) expressing "HO execution confirmation" and the CID (CID#01) of the corresponding MS 2e, which is acquired from the MS information storage 152e, are specified at the header portion, and transmits that control message to the distributor 151e (steps S29e, S30e).

Upon receiving it, the distributor 151e transmits that control message to the MS 2e via the wireless network (step S31e).

Next, in the MS 2e, the HO-execution-confirmation receiver 208e receives the above-mentioned control message expressing "HO execution confirmation" via the distributor 251e (step S32e) and requests the HO processor 210e to perform HO process (step S33e), and thereby, HO process to the HO-target BS 4e is executed.

Incidentally, the line speed, which was controlled to be lowered by the aforementioned procedure before executing the HO, is reassigned to the MS 2e by the HO-target BS 4e after completion of the HO independently of the state before the HO execution. Concerning the reassignment method and the line speed, it is possible that, for example, the HO-target BS 4e determines the line speed to be reassigned to the MS 2e in accordance with the number of the currently-processed MSs and notifies the MS 2e of the determined line speed using a control message (TYPE#01) when the MS 2e communicates with the HO-target BS 4e.

In this way, the wireless communication system 1e of the present variation can also increase the RTO value so as to prevent the timer (retransmission timer) from exceeding the RTO value during the HO process by performing control to lower the line speed of the communication with the MS 2e until the RTO value becomes longer than the time required for completion of the HO process at a preset rate (or by a specified range of lowering) before executing the HO, in the same way as the wireless communication system 1d of the third embodiment. Therefore, it is possible to inhibit the throughput reduction caused by a slow-start algorithm originating from the above-mentioned time-out.

[D] Description of the Fourth Embodiment

Figure 25:
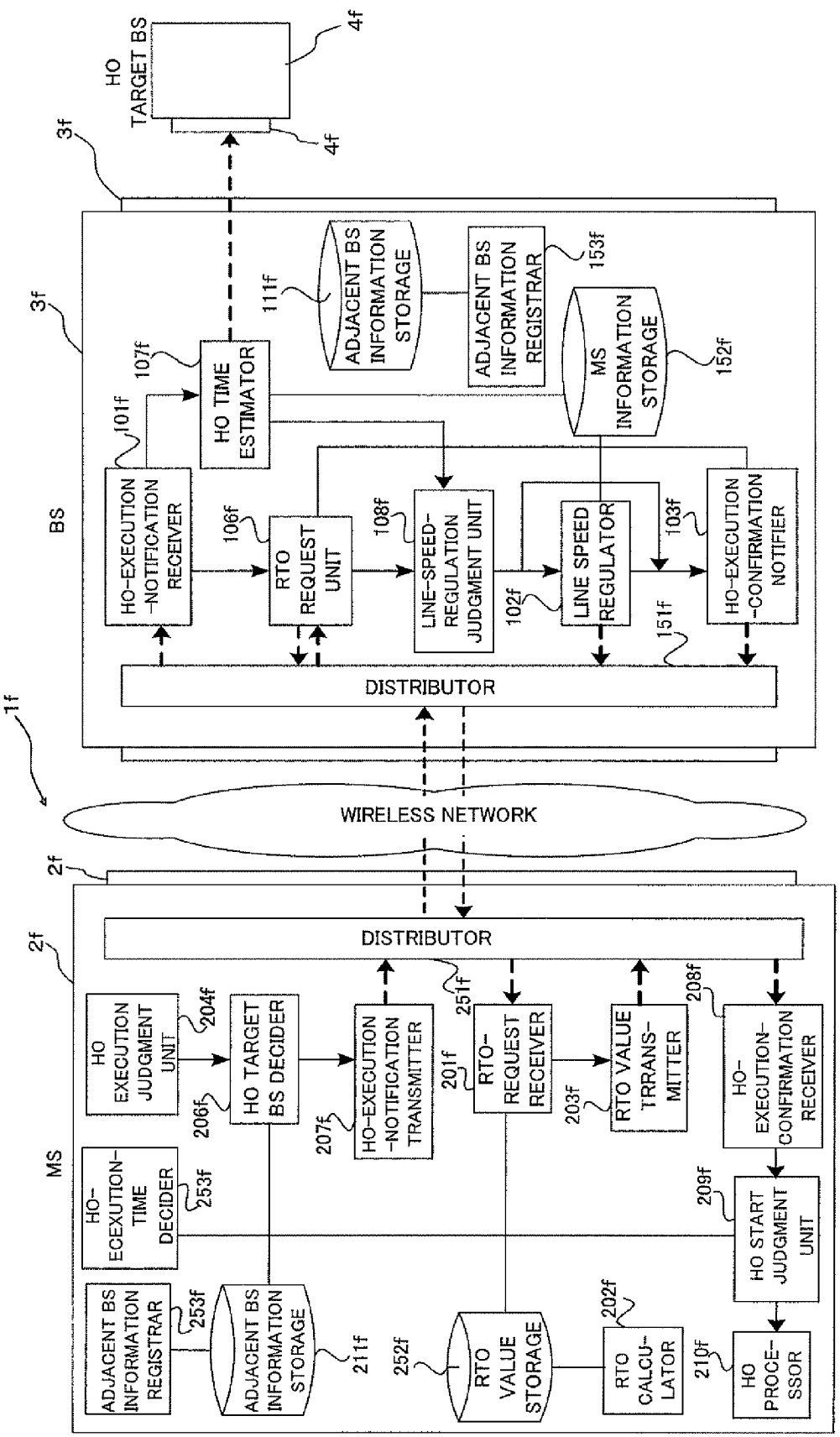
FIG. 25 is a block diagram illustrating the construction of the substantial part of the wireless communication system according to the fourth embodiment of the present invention.
Figure 26:
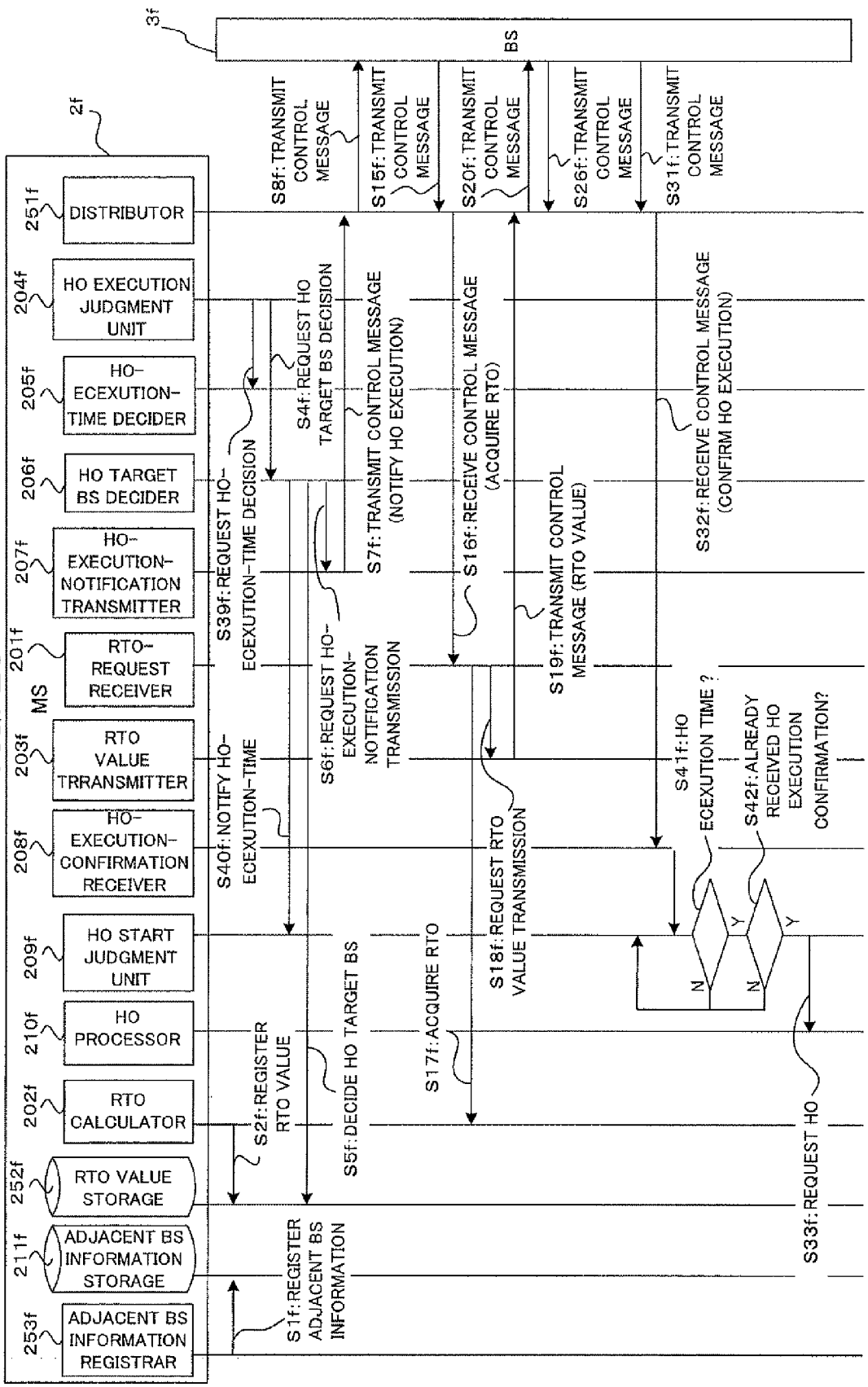
FIG. 26 is a sequence diagram illustrating an operation (handover process) of the wireless communication system depicted in FIG. 25.
Figure 27:
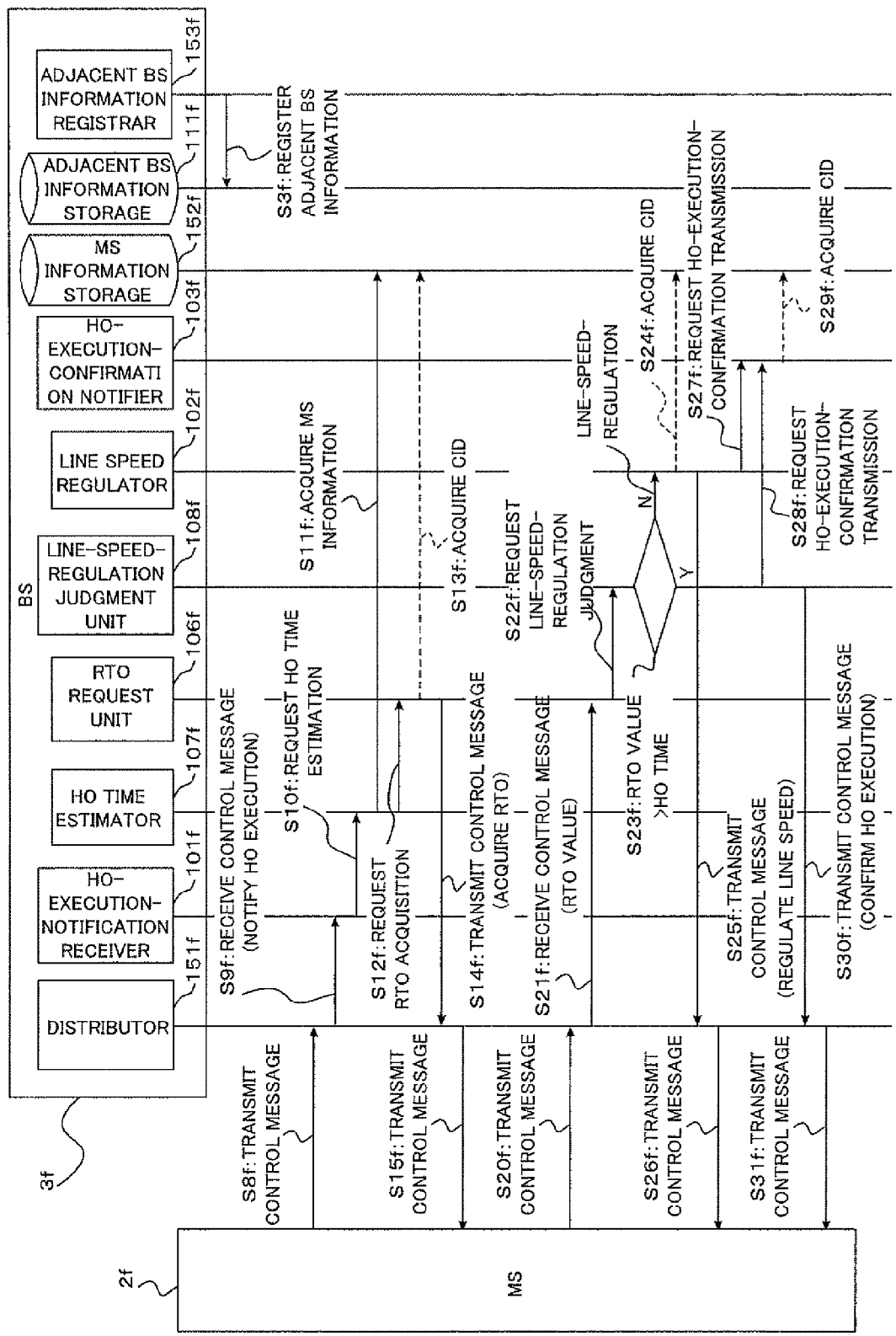
FIG. 27 is a sequence diagram illustrating an operation (handover process) of the wireless communication system depicted in FIG. 25.

FIG. 25 is a block diagram illustrating the construction of the substantial part of the wireless communication system according to the fourth embodiment of the present invention. FIG. 26 is a sequence diagram illustrating an operation (handover process) of the wireless communication system (especially, MS 2f) illustrated in FIG. 25. FIG. 27 is a sequence diagram illustrating an operation (handover process) of the wireless communication system (especially, BS 3f) illustrated in FIG. 25. All of these figures illustrate an embodiment in which the MS judges whether HO processes are executed or not, in the same way as the first to third embodiments.

Therefore, also in the wireless communication system 1f illustrated in FIG. 25, at least one MS 2f and a plurality of BSs 3f (including the HO-target BS 4f) are connected to each other via a wireless network. However, the present embodiment differs from the construction illustrated in FIG. 1 mainly in that an HO-execution-time decider 205f and an HO start judgment unit 209f are added to the MS 2f.

Therefore, the MS 2f comprises an HO execution judgment unit 204f, an HO-target BS decider 206f, an adjacent BS information storage 211f, an adjacent BS information registrar 253f, an HO-execution-notification transmitter 207f, an RTO-request receiver 201f, an RTO calculator 202f, an RTO value storage 252f, an RTO value transmitter 203f, an HO-execution-confirmation receiver 208f, an HO processor 210f, and a distributor 251f, which are of the same or similar functions as or to each corresponding units 204, 206, 211, 253, 207, 201, 202, 252, 203, 208, 210 and 251 described earlier for FIG. 1, and also comprises an HO-execution-time decider 205f and an HO start judgment unit 209f.

On the other hand, the BS 3f comprises an HO-execution-notification receiver 101f, an HO time estimator 107f, an RTO request unit 106f, a line-speed-regulation judgment unit 108f, a line speed regulator 102f, an MS information storage 152f, an adjacent BS information registrar 153f, an adjacent BS information storage 111f, an HO-execution-confirmation notifier 103f, and a distributor 151f, which are of the same or similar functions as or to each corresponding units 101, 106, 107, 108, 102, 152, 153, 111, 103 and 151 described earlier for FIG. 1.

(Description of MS 2F)

In the MS 2f, the HO execution judgment unit 204f, the HO-target BS decider 206f, the adjacent BS information storage 211f, the adjacent BS information registrar 253f, the HO-execution-notification transmitter 207f, the RTO-request receiver 201f, the RTO calculator 202f, the RTO value storage 252f, the RTO value transmitter 203f, the HO-execution-confirmation receiver 208f, the HO processor 210f, and the distributor 251b[sic] are of the same or similar functions as or to each corresponding units described earlier for FIG. 1.

The HO execution judgment unit 204f collects information about the execution condition of HO processes and judges whether the HO will be executed or not, in the same way as the HO execution judgment unit 204. In the present example, the HO execution judgment unit 204f notifies the HO-execution-time decider 205f of the HO execution.

The HO-execution-time decider 205f decides the HO execution time on the basis of the information about the HO execution time preset by the user, with the reception of the notification of the HO execution from the HO execution judgment unit 204f as a trigger, and notifies the HO start judgment unit 209f of that HO execution time. Therefore, the HO-execution-time decider 205f performs the function of the handover-execution-time decision means which decides the execution time of the HO process when the above-mentioned HO execution judgment unit 204f judges that an HO process will be executed.

The HO-execution-confirmation receiver (enabling-acknowledgement reception means) 208f receives, from the BS 3f, an HO-execution-confirmation notification (enabling acknowledgement) with respect to the HO execution notification (execution request) sent from the HO-execution-notification transmitter 207f. In the present example, the HO-execution-confirmation receiver 208f notifies the HO start judgment unit 209f of the HO execution confirmation, with the reception of the above-mentioned HO-execution-confirmation notification as a trigger.

The HO start judgment unit 209f requests the HO processor 210f to execute the HO process when the HO-execution-confirmation notification is sent from the HO-execution-confirmation receiver 208f by the HO execution time, which was reported by the HO-execution-time decider 205f. On the other hand, when the HO-execution-confirmation notification is not sent from the HO-execution-confirmation receiver 208f by the HO execution time, the HO start judgment unit 209f does not request the HO processor 210f to execute the HO process. Namely, the HO start judgment unit 209f postpones or quits the HO execution when the HO-execution-confirmation notification is not sent from the HO-execution-confirmation receiver 208f by the above-mentioned HO execution time.

Therefore, the HO start judgment unit 209f performs the function of the handover-execution control means which postpones the handover execution until after the HO execution time decided by the HO-execution-time decider 205f when the HO-execution-confirmation notification (enabling acknowledgement) is not received by the HO-execution-confirmation receiver 208f within a predetermined period of time (the HO execution time reported by the HO-execution-time decider 205f) after the transmission of the HO execution request by the HO-execution-notification transmitter 207f.

The HO processor 210f executes an HO process, with which the communication process is handed over from the serving BS 3f to the HO-target BS 4f, upon reception of the HO execution request from the HO start judgment unit 209f.

With the above-mentioned structure, the MS 2f according to the fourth embodiment of the present invention can decide an HO execution and request the BS 3f to perform an HO process upon reception of a signal from the BS 3f, as well as can transmit the RTO value which is calculated by the RTO calculator 202f to the BS 3 in accordance with a request from the BS 3f.

In addition, the MS 2f can perform congestion control (communication speed control) to lower the line speed of the communication with the communication party upon time-out of the RTO value. Moreover, in the present example, the HO start judgment unit 209f of the MS 2f can quit or postpone the HO execution when the HO-execution-confirmation notification can not be received by the predetermined time specified by the HO-execution-time decider 205f.

(Description of BS 3F)

On the other hand, in the BS 3f, the HO-execution-notification receiver 101f, the RTO request unit 106f, the HO time estimator 107f, the line-speed-regulation judgment unit 108f, the adjacent BS information registrar 153f, the adjacent BS information storage 111f, the MS information storage 152f, the line speed regulator 102f, the HO-execution-confirmation notifier 103f, and the distributor 151f are of the same or similar functions as or to each corresponding units described earlier for FIG. 1.

Therefore, the BS 3f according to the fourth embodiment of the present invention estimates time required for an HO process upon receiving an HO execution notification from the MS 2f, compares the estimated result and the present RTO value which was acquired by sending a request to the MS 2f, regulates (performs control to lower) the line speed on the basis of the comparison result, and then executes the HO, in the same way as the BS 2[sic] of the first embodiment. In this way, the BS 3f can execute an HO process with the RTO value increased in order for the timer not to exceed the RTO value by creating simulated line congestion through a control to lower the speed of the communication with the MS 2f, if it is necessary.

(Description of Entire Operation of Wireless Communication System 1f)

Next, an example of the entire operation of the wireless communication system 1f having the above-mentioned structure will be described with reference to FIG. 26 and FIG. 27.

First, the MS 2f acquires the CID (for example, CID#01) of the connection to the serving BS 3f in advance. The CID (CID#01) is controlled by the distributor 251f.

In addition, in the MS 2f, the adjacent BS information registrar 253f acquires information (adjacent BS information) about the BSs 3f (including the HO-target BS 4f) that are geographically neighboring on the serving BS 3f, such as their frequencies used, capability types supported (typically including security function, packet retransmission function, MIMO function, etc.), radio field strengths, and the number of MSs in charge, and registers it in the adjacent BS information storage 211f (step S1f). The MS 2f can acquire that adjacent BS information by, for example, receiving it when it is transmitted (reported) from the BS 3f.

Moreover, in the MS 2f, the RTO calculator 202f measures the RTTs of the TCP data that are transmitted/received to/from the communication parties (namely, other MSs and Bss 3f) regularly or irregularly and calculates the RTO values from those RTTs so as to store them in the RTO value storage 252f (step S2f).

On the other hand, the BS 3f acquires information (MS information) about the MS 2f such as the identifier of the MS 2f (for example, MS#01) and capability types supported by the MS 2f (typically including security function, packet retransmission function, MIMO function, etc.), and registers it in the MS information storage 152f. That MS information can be acquired by, for example, transmission of necessary information also from the MS 2f at the phase when the MS 2f starts to communicate with the BS 3f.

Next, in the BS 3f, the adjacent BS information registrar 153f acquires information (adjacent BS information) about the geographically neighboring BSs 3f (including the HO-target BS 4f) in advance, such as the frequency used and the capability types supported, and registers it in the adjacent BS information storage 111f (step S3f). That adjacent BS information can be acquired by, for example, exchanging information with the neighboring BSs 3f (including the HO-target BS 4f) regularly or irregularly with the above-mentioned CIDs to be used for exchanging BS information.

After the above-mentioned preliminary processes such as registration of information in the MS 2f and the BS 3f, the MS 2f checks whether an HO should be executed or not by measuring the radio field strength of the serving BS 3f regularly or irregularly by the HO execution judgment unit 204f. When the radio field strength is lower than the value that was preset by the administrator with a command, the HO execution judgment unit 204f judges that an HO execution is necessary and requests the HO-target BS decider 206f to decide the HO-target BS 4f (step S4f), as well as request the HO-execution-time decider 205f to decide the HO execution time (step S39f).

Then, in the MS 2f, the HO-execution-time decider 205f decides the HO execution time on the basis of the information about the HO execution time preset by the user, upon reception of the notification of the HO execution from the HO execution judgment unit 204f, and notifies the HO start judgment unit 209f of that HO execution time (step S40f).

The HO-target BS decider 206f refers to the adjacent BS information storage 211f, with the above-mentioned request from the HO execution judgment unit 204f as a trigger, and determines the HO-target BS 4f on the basis of the adjacent BS information (step S5f). For example, the BS 3f of which radio field strength is the highest of the neighboring BSs 3f is determined to be the HO-target BS 4f. Then, the HO-target BS decider 206f notifies the HO-execution-notification transmitter 207f of the BS identifier (for example, BS#02) of the determined HO-target BS 4f, and also, requests the HO-execution-notification transmitter 207f to transmit an HO execution notification (step S6f).

The HO-execution-notification transmitter 207f creates a control message, upon reception of the above-mentioned request from the HO-target BS decider 206f, in which the message type (TYPE#00) expressing an "HO execution notification" is specified at the header portion and the BS identifier (BS#02) of the HO-target BS 4f and the MS identifier (MS#01) of the MS 2f, of which communication process is going to be handed over, are specified at the data portion and transmits the control message to the distributor 251f (step S7f).

The distributor 251f specifies the CID (CID#01) at the header portion of that control message and transmits that control message to the BS 3f via the wireless network (step S8f).

In the BS 3[sic], the HO-execution-notification receiver 101f receives that control message (HO execution notification) via the distributor 151f, which is transmitted from the MS 2f (step S9f), acquires the MS identifier (MS#01) and the BS identifier (BS#02) contained in the data portion of that HO execution notification, and then sends a request for estimation of the HO processing time to the HO time estimator 107f together with the BS identifier (step S10f). In addition, the HO-execution-notification receiver 101f acquires the MS identifier (MS#01) from the data portion of that control message and notifies the HO time estimator 107f of the MS identifier (MS#01).

The HO time estimator 107f acquires the MS information, from the MS information storage 152f, about the MS 2f that transmitted the HO execution notification on the basis of the above-mentioned MS identifier (MS#01) (step S11f), and transmits information about the functions supported by the MS 2f to the BS 3f (HO-target BS 4f) of which identifier is the above-mentioned BS identifier (BS#02). In addition, the HO time estimator 107f estimates time (HO processing time) required for negotiation between the MS 2f and the BS 3f at the time of HO process on the basis of the information about the negotiation which is stored in the adjacent BS information storage 111f, and transmits the estimated HO processing time to the line speed regulator 108f. Moreover, the HO time estimator 107f notifies the RTO request unit 106f of an RTO acquisition request in order to acquire the RTO value of the MS 2f corresponding to the MS identifier that is acquired from the HO-execution-notification receiver 101f (step S12f).

The RTO request unit 106f creates a control message expressing "RTO acquisition" when the RTO request unit 106f receives the above-mentioned RTO-value acquisition request from the HO time estimator 107f. For example, the RTO request unit 106f searches the MS information storage 152f using the above-mentioned MS identifier (MS#01) as a search key so as to acquire the CID (CID#01) of the corresponding MS 2f (step S13f), and specifies that CID at the header portion of the control message, as well as specifies a message type (TYPE#03) expressing "RTO acquisition" at the header portion. Then the RTO request unit 106f transmits the control message to the distributor 151f (step S14f).

Upon receiving it, the distributor 151f transmits that control message to the MS 2f via the wireless network (step S15f).

In the MS 2f, the RTO-requirement receiver 201f receives the above-mentioned control message expressing "RTO acquisition" from the BS 3f via the distributor 251f (step S16f), acquires the present RTO value from the RTO value storage 252f (step S17f), and requests the RTO value transmitter 203f to transmit the RTO value while notifying it of the RTO value (step S18f).

The RTO value transmitter 203f creates a control message by specifying the RTO value sent from the RTO-requirement receiver 201f at the data portion and specifying a message type (TYPE#04) expressing "RTO transmission" at the header portion, and transmits that control message to the distributor 251f (step S19f).

Upon receiving it, the distributor 251f adds the CID (CID#01) at the header portion of that control message and transmits that control message to the BS 3f via the wireless network (step S20f).

Next, in the BS 3f, the RTO request unit 106f receives the above-mentioned control message expressing "RTO transmission" (step S21f), acquires the RTO value specified at the data portion of the message, and transmits the acquired RTO value to the line-speed-regulation judgment unit 108f (step S22f).

The line-speed-regulation judgment unit 108f compares the RTO value acquired from the RTO request unit 106f with the HO processing time estimated by the HO time estimator 107f (step S23f). When the RTO value is larger than the HO processing time (see Y route of step S23f), the line-speed-regulation judgment unit 108f judges that the line speed regulation is not necessary and requests the HO-execution-confirmation notifier 103f to transmit an HO-execution-confirmation notification by notifying it of the above-mentioned MS identifier (MS#01) (step S28f).

On the other hand, when the RTO value is equal to or smaller than the HO processing time (see N route of step S23f), the line-speed-regulation judgment unit 108f judges that the line speed regulation (lowering control) is necessary, because the timer will exceed the RTO value during the HO process without it, and requests the line speed regulator 102f to regulate (perform control to lower) the line speed by notifying it of the above-mentioned MS identifier (MS#01).

Upon the reception of the above-mentioned request for line speed regulation, the line speed regulator 102f creates a control message in which, as described earlier for FIG. 5, the symbol number and channel number (both of which are "1" in the present example, for example) are specified at the data portion and a message type (TYPE#01) expressing "line speed regulation" and the CID (CID#01) of the corresponding MS 2f, which is acquired from the MS information storage 152f using the above-mentioned MS identifier (MS#01) as the search key, are specified at the header portion, and transmits that control message to the distributor 151f (step S24f, S25f).

Upon receiving it, the distributor 151f transmits that control message to the MS 2f via the wireless network (step S26f).

Subsequently, the line speed regulator 102f requests the HO-execution-confirmation notifier 103f to transmit an HO-execution-confirmation notification by notifying it of the above-mentioned MS identifier (MS#01) (step S27f).

Upon the reception of the above-mentioned request for transmission of the HO-execution-confirmation notification from the line-speed-regulation judgment unit 108f or the line speed regulator 102f, the HO-execution-confirmation notifier 103f creates a control message in which, as described earlier for FIG. 5, the information expressing "HO execution enabling" is specified at the data portion and a message type (TYPE#02) expressing "HO execution confirmation" and the CID (CID#01) of the corresponding MS 2f, which is acquired from the MS information storage 152f, are specified at the header portion, and transmits that control message to the distributor 151f (steps S29f, S30f).

Upon receiving it, the distributor 151f transmits that control message to the MS 2f via the wireless network (step S31f).

Next, in the MS 2f, the HO-execution-confirmation receiver 208f receives the above-mentioned control message expressing "HO execution confirmation" via the distributor 251f (step S32f), and then the HO start judgment unit 209f judges whether the current time is the HO execution time reported by the HO-execution-time decider 205f or not (step S41f). When judged that the current time is the HO execution time (see Y route of step S41f), the HO start judgment unit 209f then judges whether the above-mentioned control message expressing "HO execution confirmation" is received or not (step S42f). When judged that the control message is received (see Y route of step S42f), the HO start judgment unit 209f requests the HO processor 210f to perform HO process (step S33f), and thereby, the HO process to the HO-target BS 4f is executed.

On the other hand, when judged, by the HO start judgment unit 209f, that the current time is not the HO execution time reported by the HO-execution-time decider 205f (see N route of step S41f), or that the above-mentioned control message expressing "HO execution confirmation" is not received (see N route of step S42f), the HO execution will be quitted (or postponed).

Incidentally, the line speed, which was controlled to be lowered by the aforementioned procedure before executing the HO, is reassigned to the MS 2f by the HO-target BS 4f independently of the state before the HO execution after completion of the HO. Concerning the reassignment method and the line speed, it is possible that, for example, the HO-target BS 4f determines the line speed to be reassigned to the MS 2f in accordance with the number of the currently-processed MSs and notifies the MS 2f of the determined line speed using a control message (TYPE#01) when the MS 2f communicates with the HO-target BS 4f.

As described above, according to the fourth embodiment of the present invention, when an HO execution is decided by the MS 2f and the requirement for it is sent to the BS 3f, the BS 3f performs control to lower the line speed of the communication with the MS 2f before executing the HO, which causes simulated congestion of the line. This can achieve the same operation and effect as those of the aforementioned embodiments. In addition, when the MS 2f can not receive the HO enabling acknowledgement from the BS 3f with respect to the HO execution request within a predetermined period of time, the HO process will be quitted or postponed. Therefore, it is possible to prevent the MS 2f from executing an HO process with the above-mentioned timer value remaining small, even when the BS 3f can not increase the above-mentioned timer value sufficiently within a predetermined period of time, namely when the BS 3f can not create simulated line congestion. This can inhibit the above-mentioned throughput reduction.

[E] Others

The embodiments and the respective variations of the present invention have been explained in detail above. However, it is to be understood that the embodiments and the respective variations illustrated above are by no means restrictive and any modifications can be added thereto insofar as they do not depart from the scope of the present invention.

Figure 28:
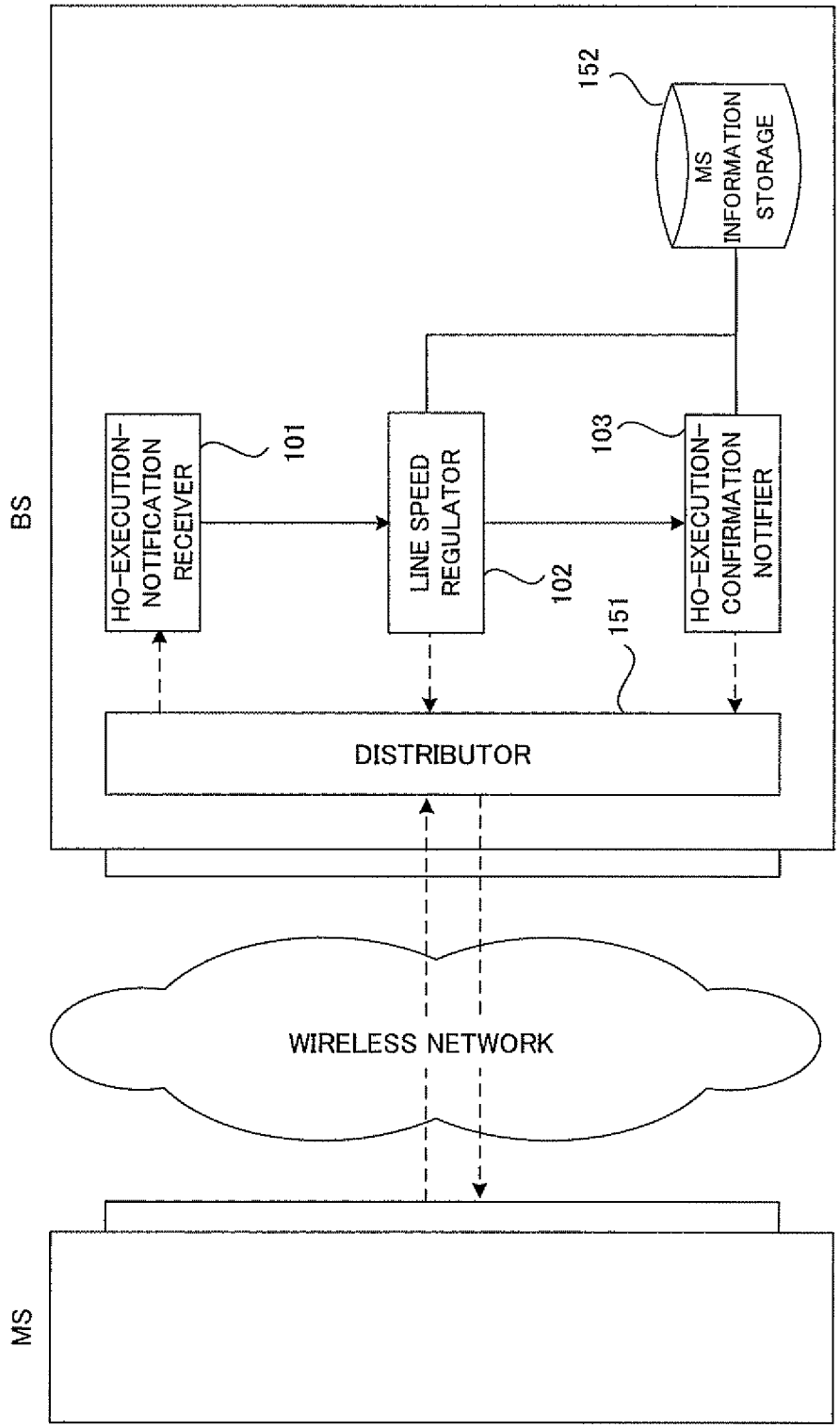
FIG. 28 is a block diagram illustrating the construction of the substantial part of the wireless communication system, which is used for describing the principle of the present invention.

For example, in a wireless communication system whose MS judges whether HO processes will be executed or not, the BS may include at least the aforementioned HO-execution-notification receiver 101, line speed regulator 102, HO-execution-confirmation notifier 103, MS information storage 152, and distributor 151, as illustrated in FIG. 28. With such a construction, the RTO value can be increased in order to inhibit the time-out of the retransmission timer by performing control to lower the line speed (communication speed) at which the BS communicates with the MS so as to create a simulated line congestion, with the HO execution requirement sent to the BS as a trigger.

Figure 29:
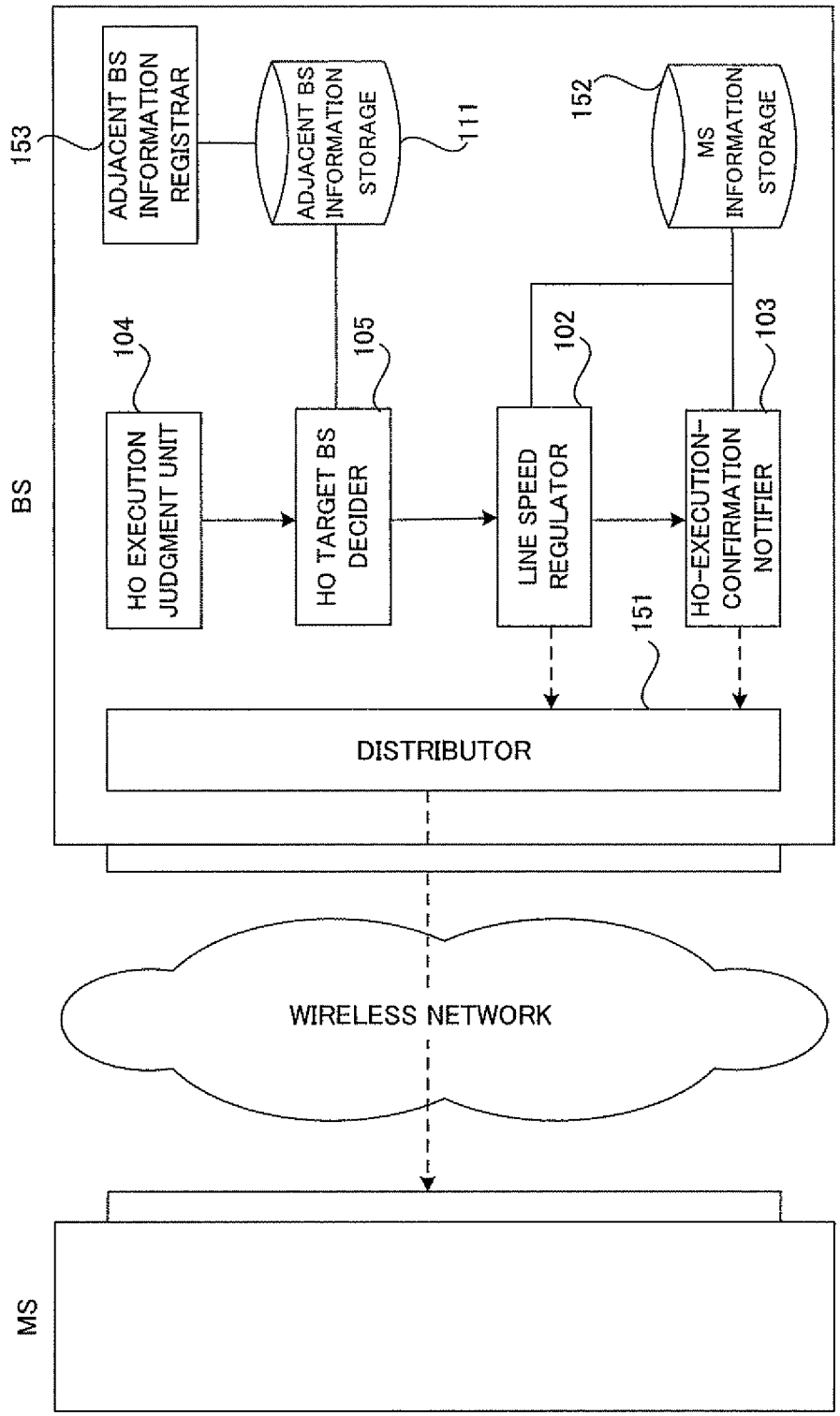
FIG. 29 is a block diagram illustrating the construction of the substantial part of the wireless communication system, which is used for describing the principle of the present invention.

In addition, in a mobile communication system whose BS judges whether HO processes will be executed or not, the BS may include at least the aforementioned HO execution judgment unit 104, HO-target BS decider 105, adjacent BS information registrar 153, adjacent BS information storage 111, line speed regulator 102, HO-execution-confirmation notifier 103, MS information storage 152, and distributor 151, as illustrated in FIG. 29. Such a construction can also achieve the same operation and effect as those described above.

According to the above-mentioned embodiments, at least one of the following effects and advantages can be achieved.

(1) When an execution of a handover process is decided, the line speed (communication speed) at which the wireless base station communicates with the wireless terminal is controlled to be lowered so as to cause a simulated congestion of the line. This can increase the above-mentioned timer value to the degree that it is longer than the time that is necessary for completion of the handover process. Therefore, the time-out of the above-mentioned timer value at the time of a handover process can be prevented, which makes it possible to inhibit the throughput reduction caused by the above-mentioned slow-start algorithm without inducing throughput reduction in normal times.

(2) In addition, in the case where the wireless base station receives the handover-execution request transmitted from the wireless terminal, decides the handover execution, and transmits the enabling acknowledgement of the handover to the wireless terminal so as to execute the handover, the throughput reduction caused by the above-mentioned slow-start algorithm can be inhibited even when the wireless terminal takes the initiative to execute handover processes.

(3) Moreover, in the case where the wireless base station judges whether the handover can be executed or not on the basis of the information about the execution condition of the handover, decides the handover execution when judging that it can be executed, and transmits the enabling acknowledgement of the handover to the wireless terminal, it is possible that the handover process is carried out just when it is necessary.

(4) Moreover, in the case where the wireless base station acquires the present timer value from the wireless terminal, estimates the time required for the handover, and performs control to lower the communication speed on the condition that the present timer value is smaller than the estimated time at the time of the handover-execution decision, it is possible that the lowering control can be performed just when it is necessary, which makes it possible to inhibit the throughput reduction efficiently.

(5) Moreover, in the case where the wireless base station records history information about the communication speed at the time of generation of the timer value or acquisition thereof from the wireless terminal, calculates the lowering value of the communication-speed lowering control on the basis of the history information, and performs control to lower the communication speed by the lowering value, it is possible that the lowering control is performed on the basis of the history information, which makes it possible to increase the timer value necessarily and sufficiently.

(6) Moreover, in the case where the wireless base station reacquires the present timer value from the wireless terminal while performing control to lower the communication speed, and performs control to lower the communication speed until the estimated time falls below the reacquired, present timer value, it is possible that the lowering control is performed efficiently in accordance with the present communication situation, which makes it possible to increase the timer value more appropriately.

(7) Moreover, in the case where the wireless terminal postpones the handover when the wireless terminal does not receive the enabling acknowledgement of the handover from the wireless base station with respect to the handover-execution request within a predetermined period of time, it is possible to prevent the handover execution with the timer value remaining small when the wireless base station can not increase the timer value sufficiently within a predetermined period of time, which makes it possible to inhibit the throughput reduction.

INDUSTRIAL APPLICABILITY

As described above in detail, according to the present invention, it is possible to prevent the timer from exceeding the timer value during a handover process by performing, before the handover process, control to lower the line speed (communication speed) at which the wireless base station communicates with the wireless terminal so as to create a simulated line congestion. This makes it possible to control the throughput reduction caused by the above-mentioned slow-start algorithm. Therefore, the present invention can be applied to the area of wireless communication technology, and particularly to the area of mobile wireless communication technology having a handover function highly effectively.

The invention claimed is:

1. A handover method of a wireless communication system, the wireless communication system including a wireless terminal and a plurality of wireless base stations, the handover method comprising:
by one wireless base station of the plurality of the wireless base stations communicating with the wireless terminal,
deciding execution of a handover of the communication with the wireless terminal to another wireless base station autonomously or in response to a request from the wireless terminal;
increasing a timer value, which is generated in accordance with a time required for transmission and reception of a signal between the wireless terminal and the one wireless base station, by lowering a communication speed at which the wireless terminal communicates with the one wireless base station; and
executing the handover, wherein
the communication speed of the wireless terminal is controlled to be lowered upon time-out of the timer value, and
the one wireless base station
acquires a present value of the timer value from the wireless terminal,
estimates a time required for the handover, and
increases the timer value by lowering a communication speed at which the wireless terminal communicates with the one wireless base station on the condition that the present value of the timer value is smaller than the estimated time at the time of the handover-execution decision.

2. The handover method according to claim 1, wherein the wireless terminal transmits the request for handover execution, and,
when the one wireless base station receives the request, the one wireless base station decides the handover execution and transmits an enabling acknowledgement of the handover to the wireless terminal.

3. The handover method according to claim 1, wherein the one wireless base station
judges whether the handover can be executed or not based on information about a execution condition of the handover, and,
when judging that the handover can be executed, decides the handover execution and transmits an enabling acknowledgement of the handover to the wireless terminal.

4. The handover method according to claim 1, wherein the one wireless base station
records history information about the communication speed at the time of generation of the timer value or acquisition thereof from the wireless terminal,
calculates a lowering value of the communication-speed lowering control based on the history information, and
performs control to lower the communication speed by the lowering value.

5. The handover method according to claim 1, wherein the one wireless base station
reacquires the present value of the timer value from the wireless terminal while performing control to lower the communication speed, and
performs control to lower the communication speed until the estimated time falls below the reacquired present value.

6. The handover method according to claim 2, wherein the wireless terminal postpones the handover when the wireless terminal does not receive the enabling acknowledgement of the handover from the one wireless base station with respect to the request for handover execution within a predetermined period of time.

7. A wireless base station of a wireless communication system, the wireless communication system including a wireless terminal and a plurality of the wireless base stations, the wireless base station comprising:
a deciding unit which decides execution of a handover of the communication with the wireless terminal to another wireless base station autonomously or in response to a request from the wireless terminal;
a controller which increases a timer value, which is generated in accordance with a time required for transmission and reception of a signal between the wireless terminal and the wireless base station, by lowering a communication speed, at which the wireless terminal communicates with the wireless base station, when the deciding unit decides execution of the handover; and
a processor which executes the handover after the control to lower the communication speed performed by the controller, wherein
the communication speed of the wireless terminal is controlled to be lowered upon time-out of the timer value, the controller comprises:
a timer-value acquisition unit which acquires a present value of the timer value from the wireless terminal;
a handover-time estimator which estimates handover time, which is time required for the handover; and
a handover-time judgment unit which judges whether the present value of the timer value is smaller than the handover time estimated by the handover-time estimator at the time of the handover-execution decision performed by the deciding unit, and
the controller increases the timer value by lowering a communication speed at which the wireless terminal communicates with the one wireless base station on the condition that the handover-time judgment unit judges that the present value of the timer value is smaller than the handover time estimated by the handover-time estimator.

8. The wireless base station of the wireless communication system, according to claim 7, wherein the deciding unit comprises a handover-execution-request receiver which receives the request for handover execution from the wireless terminal and decides execution of the handover when the handover-execution-request receiver receives the request.

9. The wireless base station of the wireless communication system, according to claim 7, wherein the deciding unit comprises an execution-condition storage which stores information about a execution condition of the handover and a handover judgment unit which judges whether the handover can be executed or not based on the information stored in the execution-condition storage, and decides execution of the handover when the handover judgment unit judges that the handover can be executed.

10. The wireless base station of the wireless communication system, according to claim 7, wherein the controller comprises:

a history record unit which records history information about the communication speed at the time of generation of the timer value or acquisition thereof from the wireless terminal; and a lowering-value calculator which calculates a lowering value of the communication-speed lowering control based on the history information recorded in the history record unit, and performs control to lower the communication speed by the lowering value calculated by the lowering-value calculator.

11. The wireless base station of the wireless communication system, according to claim 7, wherein the controller comprises a repeat controller which repeatedly performs, while performing control to lower the communication speed, acquisition of the present value of the timer value by the timer-value acquisition unit, estimation by the handover-time estimator, and judgment by the handover-time judgment unit, until the handover-time judgment unit judges that the handover time falls below the present value.

12. A wireless terminal of a wireless communication system, the wireless communication system including the wireless terminal and a plurality of wireless base stations, the wireless terminal comprising:

a calculator which calculates a present value of a timer value which is generated in accordance with a time required for transmission and reception of a signal between the wireless terminal and one wireless base station;

a receiver which receives a transmission request about the present value of the timer value, the transmission request being transmitted from the one wireless base station which decides execution of a handover of the communication with the wireless terminal to another wireless base station, the decision being made autonomously or in response to a request from the wireless terminal, the base station increases the timer value by lowering a communication speed at which the wireless terminal communicates with the one wireless base station, and executes the handover;

a notifying unit which notifies the one wireless base station of the present value of the timer value calculated by the calculator when the transmission request is received by the receiver, wherein the communication speed of the wireless terminal is controlled to be lowered upon time-out of the timer value.

13. The wireless terminal of the wireless communication system, according to claim 12, wherein the wireless terminal comprises:

a judgment unit which judges whether a handover will be executed or not based on a signal received from the plurality of wireless base stations;

a deciding unit which decides a execution time of the handover when the judgment unit judges that the handover will be executed; and a transmitter which transmits a handover execution request to the one wireless base station, the receiver receives an enabling acknowledgement with respect to the handover execution request from the one wireless base station, and the wireless terminal comprises a controller which postpones the handover execution until after the execution time decided by the deciding unit when the enabling acknowledgement is not received by the receiver within a predetermined period of time after the transmission of the handover execution request by the transmitter.

* * * * *